US007657753B2

(12) United States Patent
Sawada

(10) Patent No.: US 7,657,753 B2
(45) Date of Patent: Feb. 2, 2010

(54) IMAGE FORMING APPARATUS, INFORMATION PROCESSING APPARATUS, INFORMATION PROCESSING SYSTEM, AUTHENTICATION METHOD AND COMPUTER-READABLE STORAGE MEDIUM

(75) Inventor: Nozomi Sawada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 872 days.

(21) Appl. No.: 11/059,431

(22) Filed: Feb. 16, 2005

(65) Prior Publication Data

US 2005/0183141 A1 Aug. 18, 2005

(30) Foreign Application Priority Data

Feb. 18, 2004 (JP) ............................. 2004-041800
Oct. 5, 2004 (JP) ............................. 2004-292327

(51) Int. Cl.
*G06F 21/00* (2006.01)
(52) U.S. Cl. ........................................ 713/183; 326/30
(58) Field of Classification Search .................. 399/12, 399/8; 709/203; 358/1; 368/107; 713/107, 713/183; 326/30
See application file for complete search history.

(56) References Cited

U.S. PATENT DOCUMENTS

| 5,402,250 | A | | 3/1995 | Ishida et al. |
| 5,633,730 | A | | 5/1997 | Sawada et al. |
| 6,625,402 | B2 | * | 9/2003 | Takemoto ...................... 399/8 |
| 6,775,488 | B2 | | 8/2004 | Sawada |
| 7,130,069 | B1 | * | 10/2006 | Honma ....................... 358/1.15 |
| 7,274,484 | B2 | * | 9/2007 | Kuribayashi ................ 358/1.17 |
| 7,302,580 | B2 | * | 11/2007 | Koizumi ..................... 713/183 |
| 7,313,699 | B2 | * | 12/2007 | Koga .......................... 713/170 |
| 2002/0131784 | A1 | * | 9/2002 | Takemoto ..................... 399/12 |
| 2003/0069915 | A1 | * | 4/2003 | Clough et al. ............... 709/100 |
| 2003/0107756 | A1 | | 6/2003 | Dan et al. |
| 2003/0195926 | A1 | * | 10/2003 | Miyazaki .................... 709/203 |
| 2003/0231343 | A1 | * | 12/2003 | Kobayashi et al. ......... 358/1.16 |
| 2004/0145779 | A1 | * | 7/2004 | Kuribayashi ................ 358/1.16 |
| 2004/0145973 | A1 | * | 7/2004 | Nagashima ................. 368/107 |
| 2004/0156056 | A1 | | 8/2004 | Sawada |
| 2004/0184064 | A1 | | 9/2004 | TaKeda et al. |

FOREIGN PATENT DOCUMENTS

JP 2001-111743 4/2001

* cited by examiner

*Primary Examiner*—Kambiz Zand
*Assistant Examiner*—Monjour Rahim
(74) *Attorney, Agent, or Firm*—Cooper & Dunham, LLP

(57) ABSTRACT

An image forming apparatus includes an input part to input authentication information for authenticating a predetermined operation with respect to a registered printing job, an input part to input log-in authentication information for authenticating the predetermined operation from an operation part, an image forming part to form an image of the printing job, and a control part to request input of the authentication information for authenticating the predetermined operation with respect to a printing job that is being executed by the image forming part when the predetermined operation is made from the operation part in a logged in state, and authenticating the predetermined operation with respect to the printing job when authentication of the authentication information input by the input part is successful.

78 Claims, 29 Drawing Sheets

```
•%-12345X                                              ···(1)
@PJL  JOB  NAME=" "                                    ···(2)
@PJL  SET  AUTHENTICATIONUSERNAME="xxxx"               ···(3)
@PJL  SET  AUTHENTICATIONPASSWORD="xxxx"               ···(3)
@PJL  SET  ···

<<<<PRINTING  DATA  IN  PDL  LANGUAGE>>>>             ···(4)

•%-12345X@PJL  EOJ  NAME=" "                           ···(5)
```

FIG.7

| USER ID | PASSWORD | PRINTING | COPYING | FAX | SCANNING |
|---------|----------|----------|---------|-----|----------|
| 0001 | xxxx1 | ○ | ○ | ○ | ○ |
| 0002 | xxxx2 | ○ | ○ | × | × |
| 0003 | xxxx3 | × | ○ | × | ○ |
| ...... | ...... | ...... | ...... | ...... | ...... |

FIG.8

| USER NAME | USER ID | STORED DATE | NUMBER OF PRINTS |
|---|---|---|---|
| TARO YAMADA | 0001 | 2003/12/10 12:00 | 3 |
| TARO YAMADA | 0001 | 2003/12/10 12:11 | 3 |
| TARO YAMADA | 0001 | 2003/12/10 14:34 | 3 |
| TARO YAMADA | 0001 | 2003/12/11 9:04 | 4 |
| HANAKO YAMAMOTO | 0003 | 2003/12/10 12:01 | 10 |
| HANAKO YAMAMOTO | 0003 | 2003/12/10 12:10 | 12 |

FIG.25

| FUNCTION CANCEL FOR ELIMINATING ERROR | 3 |
|---|---|
| FORCED PRINTING | 1 |
| JOB RESET | 1 |
| JOB RESET WHILE ERROR GENERATED | 2 |

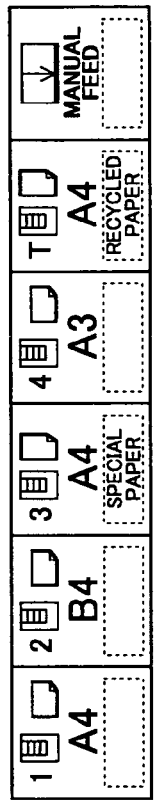

FIG.26

THE KIND OF PAPER IN SPECIFIED PAPER SUPPLY TRAY IS DIFFERENT. PLEASE CHANGE TRAY 1 TO ONE OF THE FOLLOWING KINDS OF PAPER OR, SELECT TRAY FOR FORCED PRINTING AND PUSH "EXECUTE" KEY.
A4 (RECYCLED PAPER)

1: A4
2: B4
3: A4 SPECIAL PAPER
4: A3
T: A4 RECYCLED PAPER
MANUAL FEED

JOB RESET   EXECUTE

FIG.27

THERE ARE NO NEEDLES IN THE STAPLE.
PLEASE SUPPLY NEEDLES.
RECOVERY BOX IS FULL OF PUNCHED OUT PAPER WASTE.
PLEASE REMOVE PAPER WASTE.

PRINTING WILL BE CARRIED OUT BY CANCELING THE FOLLOWING FUNCTIONS IF "CANCEL" KEY IS PUSHED.

STAPLE · PUNCH

JOB RESET   CANCEL

IMAGE FORMING APPARATUS, INFORMATION PROCESSING APPARATUS, INFORMATION PROCESSING SYSTEM, AUTHENTICATION METHOD AND COMPUTER-READABLE STORAGE MEDIUM

BACKGROUND

This application claims the benefit of Japanese Patent Applications No.2004-041800 filed Feb. 18, 2004 and No.2004-292327 filed Oct. 5, 2004, in the Japanese Patent Office, the entire disclosures of which are incorporated herein by reference.

1. Technical Field

This disclosure generally relates to, and more particularly to image forming apparatuses, information processing apparatuses, information processing systems, authentication methods and computer-readable storage media, and more particularly to an image forming apparatus, an information processing apparatus, an information processing system, an authentication method and a computer-readable storage medium for carrying out a job authentication.

2. Description of the Related Art

Recently, image forming apparatuses having a plurality of functions, such as printing, copying, facsimile and scanning functions, have been developed. Such image forming apparatuses are often referred to as composite apparatuses or multi-function apparatuses which can function as a printer, a copying machine, a facsimile machine and a scanner. Among such composite apparatuses, there are apparatuses that require user authentication when using the printing, copying, facsimile and scanning functions, so that the use of the functions of the composite apparatus is permitted only with respect to one or a plurality of registered users. For example, the user inputs a user ID and a password from an operation part, such as a touch panel, provided on the composite apparatus, and the user is permitted to use the functions of the composite apparatus only if the input user ID and password match those registered in the composite apparatus.

For example, a Japanese Laid-Open Patent Application No. 2001-111743 proposes a composite apparatus which requires user authentication based on a password input in order for the user to use the functions of the composite apparatus. This composite apparatus authenticates the password input by the user, and permits only the authenticated user to change a priority order or clear reserved jobs within the composite apparatus. Hence, only the user who reserved the jobs within the composite apparatus can change the priority order or clear the reserved jobs.

On the other hand, some composite apparatuses are connected to a host computer via one or more networks, and carry out a printing process upon receipt of print data transmitted from the host computer. In such a system configuration, while the composite apparatus is carrying out a printing process in response to a print request made by a first user and received from the host computer, a second user different from the first user may log in to the composite apparatus from the operation part of the composite apparatus. In this case, if the right to use the functions of the composite apparatus is given to the second user who logged in, there is a possibility that the reserved jobs within the composite apparatus, including the printing process in progress requested by the first user, may be changed by the second user. For example, the second user may make changes such as canceling the reserved job, releasing the function in use (or canceling the job in progress), and changing the number of copies to be made.

In addition, in the composite apparatus proposed in the Japanese Laid-Open Patent Application No. 2001-111743, the user inputs authentication information including the user ID and password in order to use the functions of the composite apparatus to perform a job, and the authenticated user is permitted to use the functions and to make changes to the settings made with respect to the functions, such as changing the priority order or clearing the reserved jobs.

However, the Japanese Laid-Open Patent Application No. 2001-111743 does not take into consideration the authentication required to use the functions of the composite apparatus from an external apparatus such as the host computer. In other words, no consideration is given as to the relationship between the authentication required to use the functions of the composite apparatus directly and the authentication required to use the functions of the composite apparatus indirectly such as from the external apparatus.

Furthermore, if an error is generated in the composite apparatus while performing a job requested by the user and the composite apparatus stops, for example, this composite apparatus cannot be used until the error is corrected. However, if the user having the right to make changes to the job in progress is not near the composite apparatus and does not attend to the correction of the error, the composite apparatus will not be usable by other users.

SUMMARY

In an aspect of this disclosure, there is provided an image forming apparatus, an information processing apparatus, an information processing system, an authentication method and a computer-readable storage medium, which can provide a highly reliable security environment with respect to a job that is input from an external apparatus. In another aspect of this disclosure, there is provided an image forming apparatus comprising an authentication information input part configured to input authentication information for authenticating a predetermined operation with respect to a registered printing job; a log-in authentication information input part configured to input log-in authentication information for authenticating the predetermined operation from an operation part; an image forming part configured to form an image of the printing job; and a control part configured to request input of the authentication information for authenticating the predetermined operation with respect to a printing job that is being executed by the image forming part when the predetermined operation is made from the operation part in a logged in state, and authenticating the predetermined operation with respect to the printing job when authentication of the authentication information input by the authentication information input part is successful. According to the image forming apparatus of the present invention, it is possible to improve the reliability of the security environment with respect to a job that is input from an external apparatus.

In another aspect of this disclosure, there is provided an information processing apparatus connectable to an external apparatus via a communication network, comprising a log-in authentication information input part configured to input log-in authentication information for authenticating an input operation in the information processing apparatus; a log-in authenticating part configured to determine whether or not to authenticate the input operation in the information processing apparatus, based on the log-in authentication information that is input; a receiving part configured to receive image data for which a printing request is received from the external apparatus; an execution right judging part configured to judge whether or not the image data has an executable right in the information processing apparatus, based on the image data that is received; a process executing part configured to execute a process of the image data if the execution right judging part judges that the image data has the executable right in the information processing apparatus; an authentication information input part configured to input an access authentication information for authenticating an access to the image data; and an authenticating part configured to determine whether or not to approve issuing an access right to the image data for which the process is being executed by the process executing part, based on the access authentication information that is input. According to the information processing apparatus of the present invention, it is possible to improve the reliability of the security environment with respect to a job that is input from an external apparatus.

In another aspect of this disclosure, there is provided an information processing system comprising an external apparatus configured to transmit image data for which execution is requested; and an information processing apparatus configured to execute a process of the image data received from the external apparatus, where the information processing apparatus comprises a log-in authentication information input part configured to input log-in authentication information for authenticating an input operation in the information processing apparatus; a log-in authenticating part configured to determine whether or not to authenticate the input operation in the information processing apparatus, based on the log-in authentication information that is input; a receiving part configured to receive image data for which a printing request is received from the external apparatus; an execution right judging part configured to judge whether or not the image data has an executable right in the information processing apparatus, based on the image data that is received; a process executing part configured to execute a process of the image data if the execution right judging part judges that the image data has the executable right in the information processing apparatus; an authentication information input part configured to input an access authentication information for authenticating an access to the image data; and an authenticating pan configured to determine whether or not to approve issuing an access right to the image data for which the process is being executed by the process executing part, based on the access authentication information that is input. According to the information processing system of the present invention, it is possible to improve the reliability of the security environment with respect to a job that is input from an external apparatus.

In another aspect of this disclosure, there is provided an authentication method for an image forming apparatus comprising an authentication information input part configured to input authentication information for authenticating a predetermined operation with respect to a printing job that is registered, a log-in authentication information input part configured to input a log-in authentication information for authenticating the predetermined operation from an operation part, an image forming part configured to form an image of the printing job, and a control part, where the authentication method comprises requesting, by the control part, input of the authentication information for authenticating the predetermined operation with respect to a printing job that is being executed by the image forming part when the predetermined operation is made from the operation part in a logged in state; and authenticating, by the control part, the predetermined operation with respect to the printing job when authentication of the authentication information input by the authentication information input part is successful. According to the authentication method of the present invention, it is possible to improve the reliability of the security environment with respect to a job that is input from an external apparatus.

In another aspect of this disclosure, there is provided an authentication method for an information processing apparatus comprising a receiving part configured to receive image data for which a printing request is received from an external apparatus, an authentication information input part configured to input an access authentication information for authenticating an access to the image data, a log-in authentication information input part configured to input a log-in authentication information for authenticating a predetermined operation from an operation part, and an authenticating part, where the authentication method comprises judging, by the authenticating part, whether or not the image data received by the image data receiving part has an executable right, based on the image data, and executing a process of the image data if the image data is judged as having the executable right; and determining, by the authenticating part, whether or not to approve issuing an access right to the image data with respect to which the process is being executed, based on the access authentication information that is input, when the access authentication information is input by the authentication information input part in a logged in state where the information processing apparatus. According to the authentication method of the present invention, it is possible to improve the reliability of the security environment with respect to a job that is input from an external apparatus.

In another aspect of this disclosure, there is provided a computer-readable storage medium which stores an authentication program for causing a computer to carry out an authentication in an image forming apparatus comprising an authentication information input part configured to input authentication information for authenticating a predetermined operation with respect to a printing job that is registered, a log-in authentication information input part configured to input a log-in authentication information for authenticating the predetermined operation from an operation part, an image forming part configured to form an image of the printing job, and a control part, where the authentication program comprises a procedure causing the computer to request, by the control part, input of the authentication information for authenticating the predetermined operation with respect to a printing job that is being executed by the image forming part when the predetermined operation is made from the operation part in a logged in state; and a procedure causing the computer to authenticate, by the control part, the predetermined operation with respect to the printing job when authentication of the authentication information input by the authentication information input part is successful. According to the computer-readable storage medium of the present invention, it is possible to improve the reliability of the security environment with respect to a job that is input from an external apparatus.

In another aspect of this disclosure, there is provided a computer-readable storage medium which stores an authentication program for causing a computer to carry out an authentication in an information processing apparatus comprising a receiving part configured to receive image data for which a printing request is received from an external apparatus, an authentication information input part configured to input an access authentication information for authenticating an access to the image data, a log-in authentication information input part configured to input a log-in authentication information for authenticating a predetermined operation from an operation part, and an authenticating part, where the authentication program comprises a procedure causing the computer to judge, by the authenticating part, whether or not the image data received by the image data receiving part has an executable right, based on the image data, and to execute a process of the image data if the image data is judged as having the executable right; and a procedure causing the computer to determine, by the authenticating part, whether or not to approve issuing an access right to the image data with respect to which the process is being executed, based on the access authentication information that is input, when the access authentication information is input by the authentication information input part in a logged in state where the information processing apparatus. According to the computer-readable storage medium of the present invention, it is possible to improve the reliability of the security environment with respect to a job that is input from an external apparatus.

Other aspects and further features in this disclosure will be apparent from the following detailed description when read in conjunction with the accompanying drawings.

BRIEF DESCRIPTION OF THE DRAWINGS

FIG. 7 is a diagram showing user management information stored in the data storage part of the first embodiment of the present invention;

FIG. 8 is a diagram showing a job list screen indicating jobs accessible by a user in the first embodiment of the present invention;

FIG. 25 is a diagram showing a table that stores authentication check levels related to a job operation in progress;

FIG. 26 is a diagram showing a display screen for a case where the kinds of paper of paper supply trays specified in a seventh embodiment of the present invention differ;

FIG. 27 is a diagram showing a display screen for a case where no staple needles exist in the seventh embodiment of the present invention;

DESCRIPTION OF THE PREFERRED EMBODIMENTS

First Embodiment

[Structure of Image Processing System]

Figure 1:
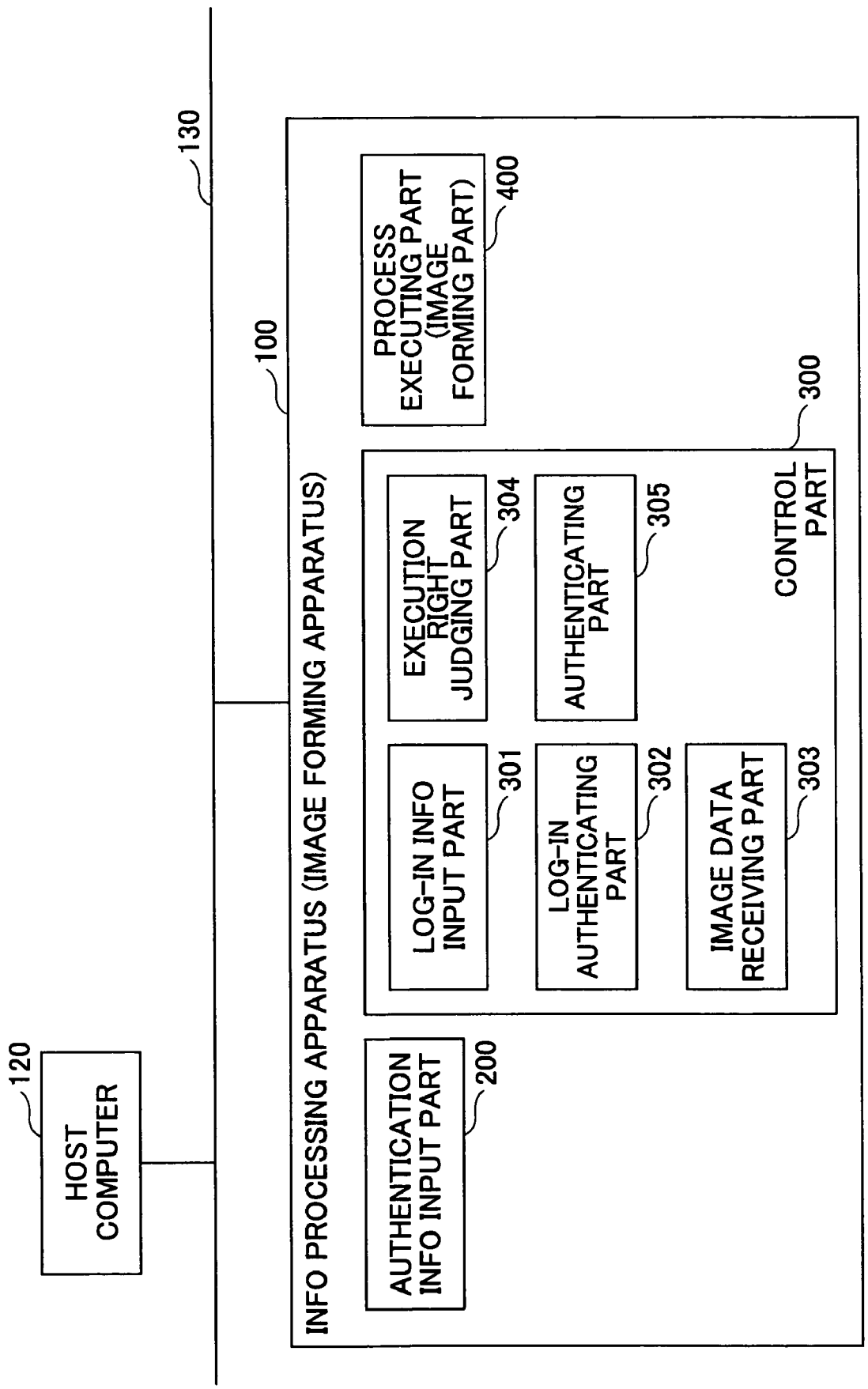
FIG. 1 is a system block diagram showing a general structure of an information processing system according to the present invention.
Figure 2:
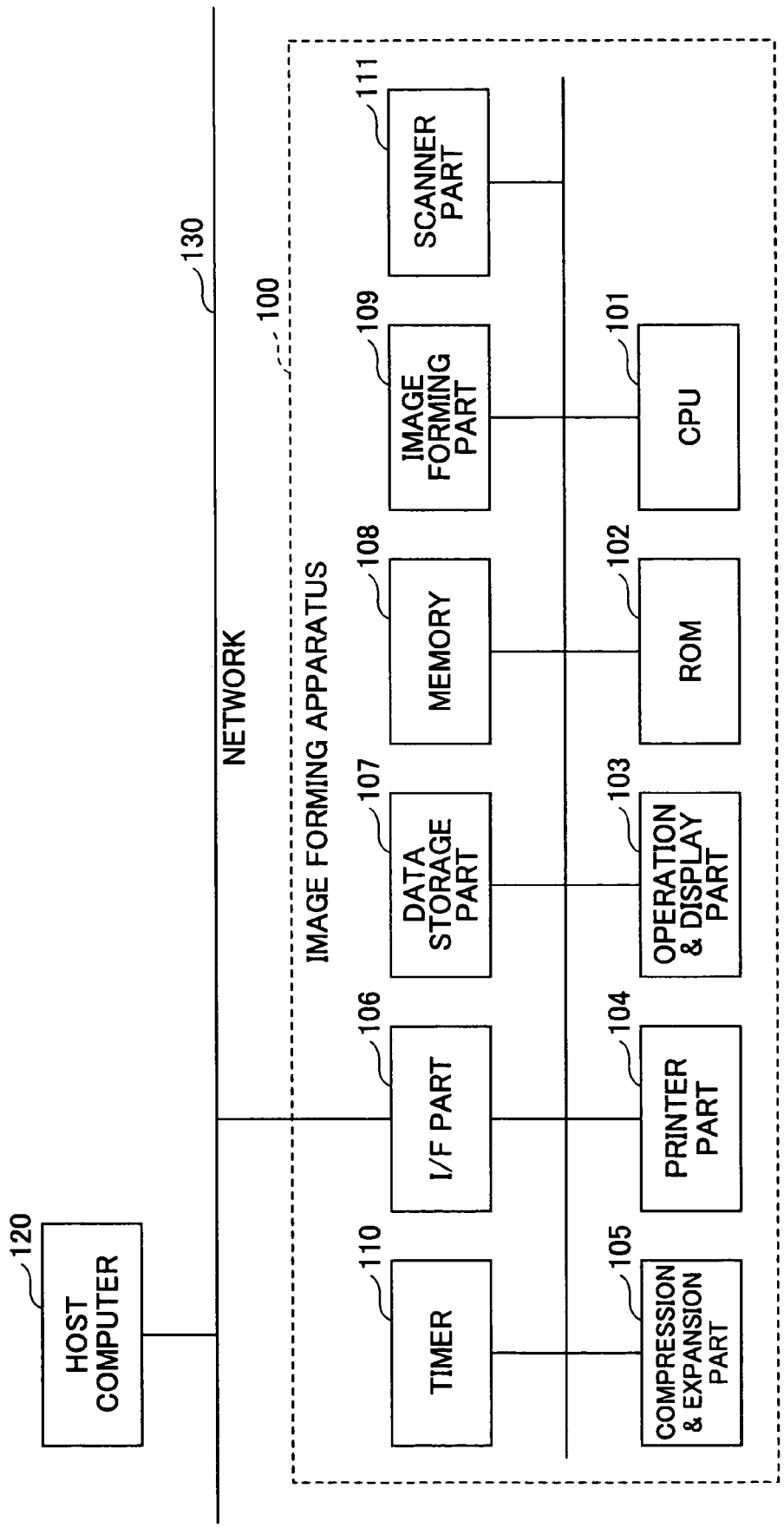
FIG. 2 is a system block diagram showing a first embodiment of the information processing system according to the present invention.

FIG. 1 is a system block diagram showing a general structure of an information processing system according to the present invention, and FIG. 2 is a system block diagram showing a first embodiment of the information processing system according to the present invention. A description will be given of the structure and operation of this first embodiment of the information processing system, by referring particularly to FIG. 2. In this embodiment, an information processing apparatus is formed by an image forming apparatus, but the information processing apparatus may be formed by any information processing apparatus having a similar authentication function and the like. In this embodiment, it is assumed for the sake of convenience that a job is specified by electronic data including print data and a print request, but the data is not limited to print data and the process request is not limited to the print request.

As shown in FIG. 1, the information processing system (or an image processing system) includes an information processing apparatus (image forming apparatus) 100 and a host computer 120 that are connected via one or more communication networks 130. The image forming apparatus 100 includes an authentication information input part 200, a control part 300 and a process executing part (or image forming part) 400. The control part 300 includes a log-in information input part 301 for inputting a log-in authentication information for permitting an input operation, a log-in authenticating part 302 for determining whether or not to permit the input operation in the image forming apparatus 100 based on the input log-in authentication information, an image data receiving part 303 for receiving image data for which the print request is made from the host computer 120, an execution right judging part 304 for judging whether or not the received image data has an executable right in the image forming apparatus 100 based on the image data, and an authenticating part 305 for determining whether or not to approve issuing an access right with respect to the image data that are being processed based on job authentication information.

In a normal state, the operation of the image forming apparatus 100 is restricted by performing a log-in authentication and permitting the operation of the image forming apparatus 100 only to the authenticated user. The log-in authentication for permitting the operation of the image forming apparatus 100 and the job authentication for permitting the operation with respect to the job in progress in the image forming apparatus 100 are mutually independent. Hence, the user who is permitted to operate the image forming apparatus 100 as a result of the log-in authentication cannot perform the operation with respect to the job in progress in the image forming apparatus 100 unless permitted as a result of the job authentication.

The host computer 120 transmits a job requesting a printing process to the image forming apparatus 100 in response to an operation made by an "execution instructing user". Of the jobs received from the host computer 120, the image forming apparatus 100 carries out the printing process only with respect to the job having the printing right within the image forming apparatus 100.

In this embodiment, the "job" is formed by electronic data including the printing data, the job authentication information and the print request that are externally input with respect to the image forming apparatus 100. The job authentication information is formed by electronic data including a user ID and a password of the execution instructing user who operates the host computer 120 and makes the print request. The user who logs in to the image forming apparatus 100 and operates the image forming apparatus 100 will be referred to as an "operating user". In addition, a "job operation" refers to an operation that is independently carried out with respect to the job in progress (that is, the job that is being executed), and includes a function cancel operation to avoid a job error, a reset (or cancel) operation, a forced printing and the like.

The image forming apparatus 100 is connected to one or more host computers 120 via one or more networks 130. The image forming apparatus 100 can carry out various processes to function as a printer, a copying machine, a facsimile machine and a scanner, depending on a direct operation that is made by the operating user or depending on a print instruction or the like that is input by the execution instructing user and input to the image forming apparatus 100 indirectly from the host computer 120 via the network 130.

As shown in FIG. 2, the image forming apparatus 100 includes a CPU 101, a ROM 102, an operation and display part 103, a printer part 104, a compression and expansion part 105, an interface (I/F) part 106, a data storage part 107, a memory 108, an image forming part 109, a timer 110 and a scanner part 111, so as to realize the functions shown in FIG. 1. The timer 110 may be omitted, and in this case, the time may be counted or measured by an internal timer within the CPU 101.

The ROM 102 stores an Operating System (OS) that manages the system environment and the like of the image forming apparatus 100, various middleware, and applications (application programs) for executing a printing process and/or an image reading process to operate the image forming apparatus 100 as a printer, a copying machine, a facsimile machine and a scanner.

The CPU 101 reads the middleware and the software within the ROM 102, and controls the entire operation of the image forming apparatus.

The operation and display part 103 includes an input part (or an operation part) for inputting various information and a display part for displaying various information such as an operating state of the image forming apparatus 100. For example, the input part may be formed by a keyboard, and the display part may be formed by a Liquid Crystal Display (LCD). It is also possible to form the input part and the display part of the operation and display part 103 by a touch panel which integrally includes a display and keys (or buttons) displayed on a screen of the display.

The printer part 104 carries out the printing operation to print images on recording media such as printing paper by a known means.

The compression and expansion part 105 compresses and expands the printing data.

The I/F part 106 exchanges data via the network 130. For example, the I/F part 106 receives the job from the host computer 120. The job includes the execution instruction with respect to the process to be executed by the CPU 101, and the data used when executing the process. In this embodiment, the job includes the printing data and the print execution instruction therefor, for example.

The data storage part 107 stores various data as will be described later.

Figures 3, 4:
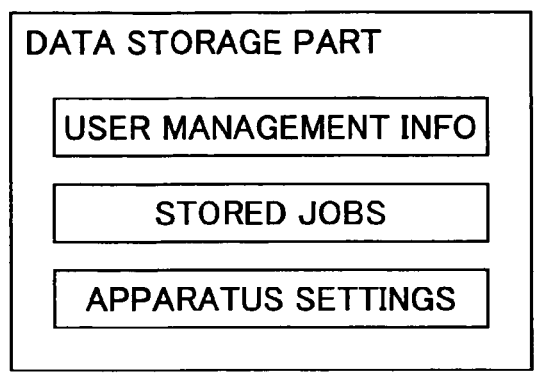
FIG. 3 is a diagram showing a data structure within a data storage part of the first embodiment of the present invention.
FIG. 4 is a diagram showing a job structure of a job transmitted from a host computer to an image forming apparatus in the first embodiment of the present invention.

FIG. 3 is a diagram showing a data structure within the data storage part 107 of the first embodiment of the present invention. As shown in FIG. 3, the data storage part 107 stores user management information and stored jobs. The user management information indicates a correspondence of the user ID permitted to make a log-in to the image forming apparatus 100 or to carry out the printing process in the image forming apparatus 100, and the password. The stored jobs include the jobs that are transmitted from the host computer 120 and stored (spooled) in the data storage part 107.

As shown in FIG. 3, the data storage part 107 also stores an apparatus setting, that is, information indicating an authentication environment of the image forming apparatus 100. For example, if the authentication information is not added to the printing data received by the I/F part 106, the data storage part 107 stores information indicating whether or not to permit execution of the printing process for the printing data. In this embodiment, with respect to the printing data not added with the authentication information, the authentication environment will be referred to as being "simple" when permitting the execution of the printing process, and as being "all" when prohibiting the execution of the printing process.

The memory 108 temporarily stores various data as will be described later.

The image forming part 109 forms an image by analyzing the printing data by a known means.

When the I/F part 106 receives the printing data from the host computer 120 via the network 130, the image forming part 109 analyzes the received printing data and forms the image of the printing data. When forming the image in this manner, the image forming part 109 obtains the authentication information added to the printing data.

The timer 110 counts or measures time.

The scanner part 111 reads an image from a document or the like, by scanning the image.

The CPU 101 compares the authentication information obtained by the image forming part 109 from the printing data and the user management information stored in the data storage part 107, so as to make a user authentication. Based on a result of the user authentication, if the CPU 101 judges that the user who made the print request for the printing data has the right to use the image forming apparatus 100, the CPU 101 controls the printer part 104 to execute the printing process.

The host computer 120 is formed by an information processing apparatus which is operated by the user who makes the print request, and causes the image forming apparatus 100 to execute the printing process by transmitting the job to the image forming apparatus 100. The host computer 120 may be formed by a tower, desk-top, or lap-top type general purpose personal computer, or a mobile communication terminal or apparatus including portable telephones, Personal Handy Phones (PHSs), and Personal Digital Assistants (PDAs).

The network 130 may be formed by one or more cable networks such as a Local Area Network (LAN), Wide Area Network (WAN) and the Internet or, one or more wireless networks such as a wireless LAN. In addition, the network 130 may be formed by a combination of cable and wireless networks. For example, in the case where the host computer 102 is formed by a portable telephone or PHS, the network 130 may include a base station, a switching station, a switching station control apparatus, a Home Location Register (HLR) and the like.

[Operation to Transmit Printing Data]

Next, a description will be given of the operation to transmit the printing data in the image processing system shown in FIG. 2.

First, the host computer 120 transmits a job to the image forming apparatus 100 in response to an operation made by the execution instructing user who instructs the execution of a printing process, so as to request the printing process of the job to the image forming apparatus 100.

FIG. 4 is a diagram showing a job structure of the job transmitted from the host computer 120 to the image forming apparatus 100 in the first embodiment of the present invention. As shown in FIG. 4, the job transmitted to the image forming apparatus 100 is made up of (1) a UEL command, (2) a JOB command, (3) a SET command, (4) printing data in PDL, and (5) an EOJ command.

(1) The UEL command is used to shift the control to the PJL, and specifies a start position and an end position of the PJL job.

(2) The JOB command indicates a start of the printing job.

(3) The SET command makes various settings, and includes "AUTHENTICATIONUSERNAME" and "AUTHENTICATIONPASSWORD". The "AUTHENTICATIONUSERNAME" is the user ID for job authentication. The "AUTHENTICATIONPASSWORD" is the password for job authentication.

(4) The printing data in PDL includes printing data to be developed into an image by an Internet printer.

(5) The EOJ command specifies an end of the job.

The host computer 120 inputs the job authentication information (user ID and password) to be transmitted by (3) the SET command, in response to an operation made by the execution instructing user.

For example, (3) the SET command includes the user ID and the password of the execution instructing user himself. In addition, when permitting access to all users, the host computer 120 sets a "public attribute" in (3) the SET command.

[Log-In Process]

Next, a description will be given of a log-in process of the operating user, by referring to FIG. 5.

Figure 5:
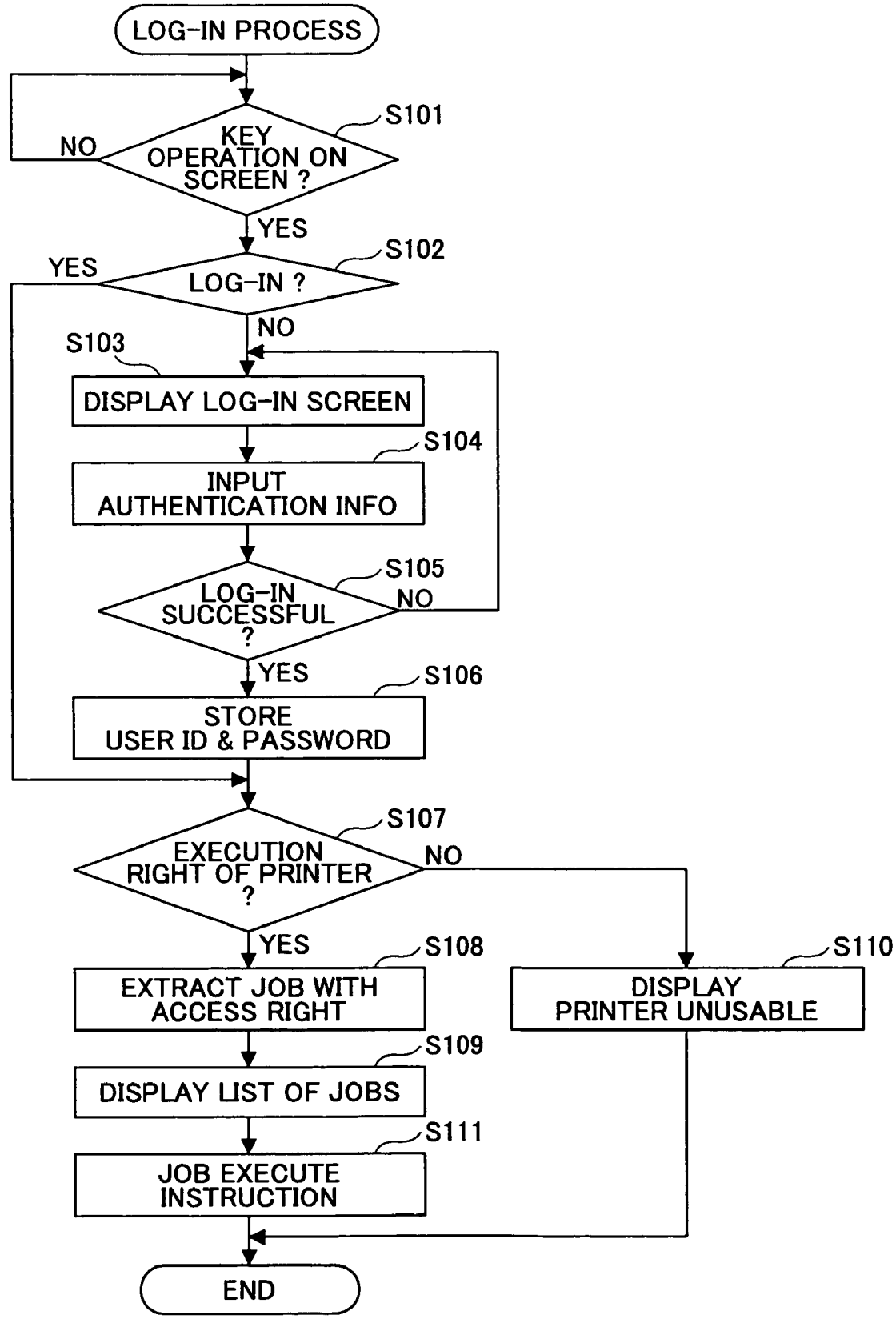
FIG. 5 is a flow chart for explaining a log-in process when carrying out a stored document printing in the first embodiment of the present invention.

FIG. 5 is a flow chart for explaining the log-in process when carrying out a stored document printing in the first embodiment of the present invention. The stored document printing may print classified documents, test documents or any stored documents.

First, the CPU 101 judges whether or not a predetermined key of the operation and display part 103 has been selected by the operating user (step S101).

If the CPU 101 judges that the predetermined key of the operation and display part 103 has not been selected (NO in step S101), the CPU 101 repeats the process of the step S101 until it is judged that the predetermined key of the operation and display part 103 has been selected.

If the CPU 101 judges that the predetermined key of the operation and display part 103 has been selected (YES in step S101), the CPU 101 judges whether or not the log-in by the operating user has already been made to the image forming apparatus 100 and that the image forming apparatus 100 is presently in a log-in state (step S102). If the CPU 101 judges that the image forming apparatus 100 is presently in the log-in state (YES in step S102), the CPU 101 judges whether or not the operating user presently making the log-in has the right to use the printer or printer function (step S107).

Figure 6:
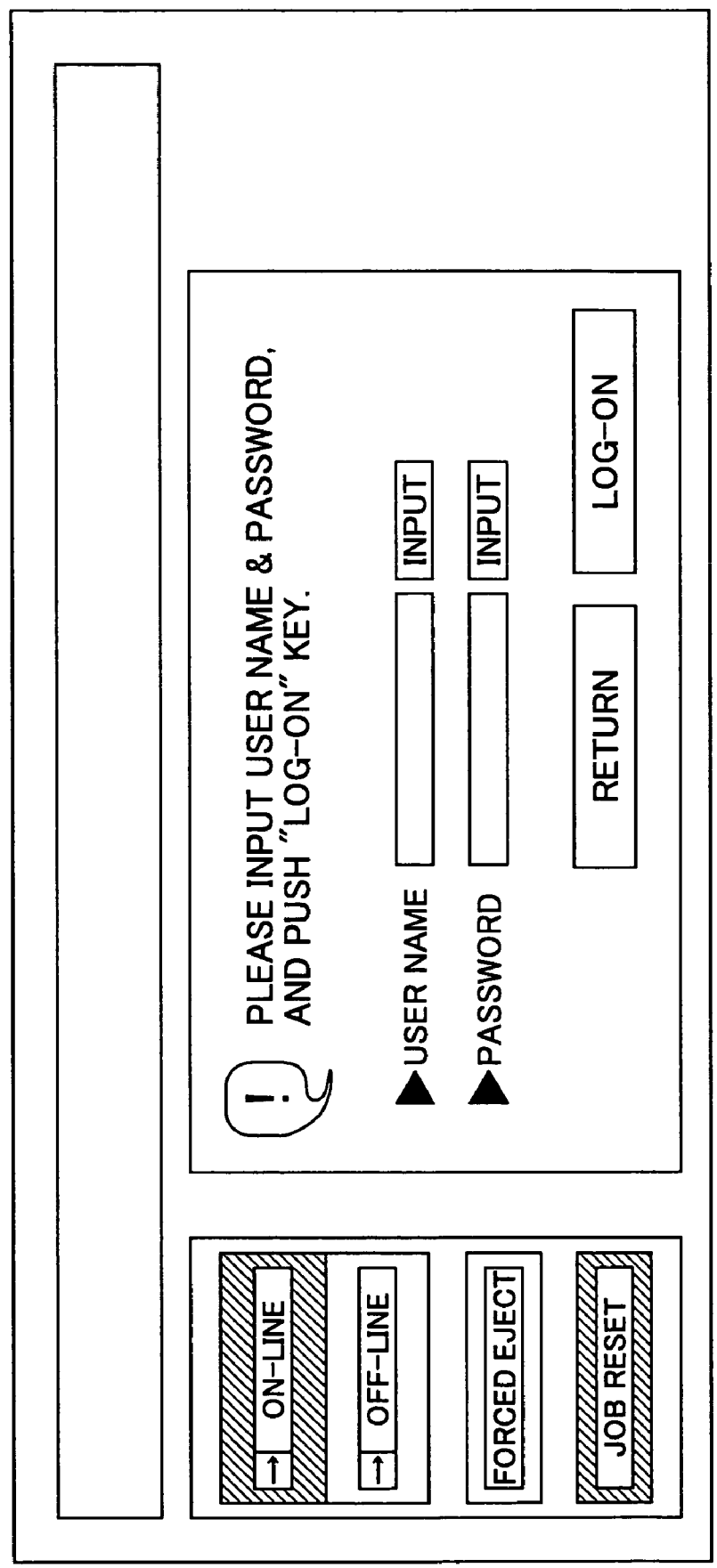
FIG. 6 is a diagram showing a log-in screen of the first embodiment of the present invention.

If the CPU 101 judges that the operating user has not already made the log-in to the image forming apparatus 100 and the image forming apparatus 100 is presently not in the log-in state (NO in step S102), the CPU 101 displays a log-in screen on the operation and display part 103 (step S103). FIG. 6 is a diagram showing the log-in screen that is displayed on the operation and display part 103 of the first embodiment of the present invention. The operating user inputs the user ID and the password in a user name field and a password field on the log-in screen shown in FIG. 6, and the user ID and the password are input to the CPU 101 when the operating user selects a "log-on" key on the log-in screen.

When the authentication information including the user ID and the password are input to the CPU 101 from the log-in screen displayed on the operation and display part 103 (step S104), the CPU 101 judges whether or not the input user ID and password exist in the user management information that is stored in the data storage part 107 (step S105).

FIG. 7 is a diagram showing the user management information stored in the data storage part 107 of the first embodiment of the present invention. As shown in FIG. 7, the user management information includes the user ID of each user, the password, the right to use the various functions (printing, copying facsimile and scanning functions) of the image forming apparatus 100, that are stored in the data storage part 107 in correspondence with each other. In FIG. 7, the right to use each function (or execution right) is indicated by a symbol "O", while no right to use each function (or no-execution right) is indicated by a symbol "X".

If a combination of the user ID "0001" and the password "xxxx1" is input from the log-in screen, for example, this combination matches the user management information that is shown in FIG. 7 and stored in the data storage part 107. Hence, the CPU 101 in this case judges that the log-in is successful. On the other hand, if a combination of the user ID "0002" and the password "xxxx1" is input from the log-in screen, there is no matching user management information that is shown in FIG. 7 and stored in the data storage part 107. For this reason, the CPU 101 in this case judges that the log-in was unsuccessful.

Next, if the CPU 101 judges that the log-in was unsuccessful based on the user ID and the password input from the log-in screen (NO in step S105), the CPU 101 displays a log-in failure screen on the operation and display part 103 to indicate that the log-in failed, and the process advances to the step S103. On the other hand, if the CPU 101 judges that the log-in was successful (YES in step S105), the CPU 101 temporarily stores in the memory 108 the user ID and the password with respect to which the log-in was permitted (step S106), and the key operation of the operation and display part 103 is permitted by the CPU 101. The user ID and the password that are temporarily stored in the memory 108 are erased at the time of a log-out. When the CPU 101 judges that the log-in was successful, the CPU 101 refers to the user management information stored in the data storage part 107 and judges whether or not the operating user who made the successful log-in has the right to use the printer or printer function, that is, has the execution right of the printer (step S107).

Then, if the CPU 101 judges that the operating user who made the log-in does not have the execution right of the printer (NO in step S107), the CPU 101 displays a screen on the operation and display part 103 to inform the operating user by a message or the like that the operating user does not have the execution right of the printer (step S110). In this case, no process is carried out to execute the stored document printing. On the other hand, if the CPU 101 judges that the operating user who made the log-in has the execution right of the printer (YES in step S107), the CPU 101 refers to the user management information and the jobs stored in the data storage part 107, and extracts the job for which the operating user who made the log-in has acquired or can acquire the access right (step S108).

Next, the CPU 101 displays a job list screen shown in FIG. 8 on the operation and display part 103 (step S109). FIG. 8 is a diagram showing the job list screen indicating the jobs accessible by the operating user who made the log-in in the first embodiment of the present invention. Here, the jobs accessible by the operating user refer to the jobs for which the operating user who made the log-in has acquired or can acquire the access right. The operating user selects a job on the job list screen that is displayed on the operation and display part 103, and inputs a print instruction or a delete instruction, so that the CPU 101 carries out a printing process or a delete process with respect to the job selected from the operation and display part 103 (step S111).

Accordingly, a judgement is made to determine whether or not a log-in has been made to the image forming apparatus 100 in order to give the operating right of the image forming apparatus 100 to the user, and if the log-in has not been made, the screen for making the log-in is displayed on the operation and display part 103 of the image forming apparatus 100 so as to request the log-in to the operating user. If it is judged that the log-in has been made, a judgement is made to determine whether or not the operating user who made the log-in has the execution right of the printer. If it is judged that the operating user has the execution right of the printer, the jobs for which the operating user has acquired or can acquire the access right are extracted, and the list of extracted jobs is displayed on the operation and display part 103. The printing process or the delete process is carried out with respect to the job that selected from the displayed list.

When the image forming apparatus 100 executes the printing process with respect to the printing data received via the network 130, there are cases where the host computer 120 cannot input all of the printing conditions for executing the job from a printer driver or the like, depending on the kind of job such as classified printing and test printing. In such cases, the image forming apparatus 100 is constructed to temporarily store the received printing data within the image forming apparatus, and to execute the printing process with respect to the temporarily stored printing data when a print instruction is input from the operation and display part 103 of the image forming apparatus 100. In this state, when setting the printing conditions and operations such as changing the number of prints to be made and specifying stapling by a stapler or punching by a puncher, for example, the operating user inputs the authentication information from the operation and display part 103 so as to enable the operating user to make such settings. If the authentication is successful (or certified) with respect to the authentication information input from the operation and display part 103, the operating user is allowed to operate the image forming apparatus 100.

[Authentication Process When Printing Printing Data Received From Host Computer]

Figure 9:
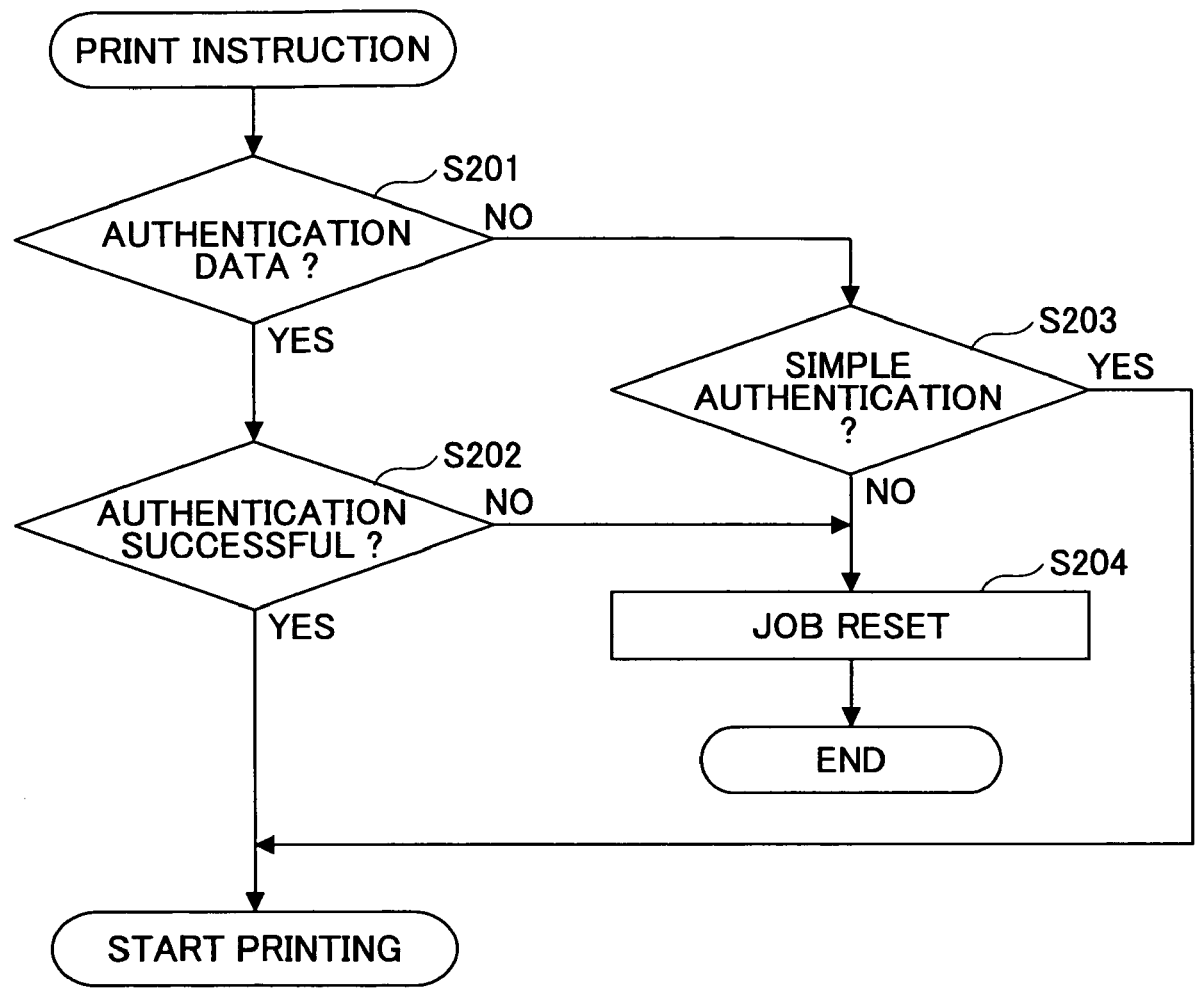
FIG. 9 is a flow chart for explaining an authentication process when a printing job is received by the image forming apparatus of the first embodiment of the present invention.

Next, a description will be given of an authentication process when printing the printing data received from the host computer 120 in the image forming apparatus 100, by referring to FIG. 9. FIG. 9 is a flow chart for explaining the authentication process when a printing job is received from the host computer 120 by the image forming apparatus 100 of the first embodiment of the present invention.

First, when the I/F part 106 receives the printing data from the host computer 120, the received printing data is transmitted to the image forming part 109. The image forming part 109 analyzes the received printing data, and judges whether or not the authentication information is added to the printing data (step S201).

If the image forming apparatus 109 judges that the authentication information is added to the printing data (YES in step S201), the image forming apparatus 109 extracts the authentication information added to the printing data. Then, the CPU 101 performs a user authentication based on the authentication information that is extracted from the printing data by the image forming part 109, and judges whether or not the authentication is successful (step S202).

More particularly, the CPU 101 compares the authentication information (user ID and password) that is added to the printing data transmitted from the host computer 120 and the user management information stored in the data storage part 107, and judges whether or not the authentication information (user ID and password) that is added to the printing data is stored in the data storage part 107. The CPU 101 temporarily stores the printing data and the authentication information (user ID and password) that is added to the printing data, in the memory 108 in correspondence with each other, until the printing of the printing data is completed.

If the CPU 101 judges that the user authentication is successful, that is, if authentication information (user ID and password) that is added to the printing data is stored in the data storage part 107 in correspondence with the printing data, and the CPU 101 judges that the authenticated user has the execution right of the printer (YES in step S202), the CPU 101 controls the printer part 104 to execute a printing process with respect to the printing data that is temporarily stored in the memory 108.

On the other hand, if the CPU 101 judges that the user authentication is unsuccessful, that is, if the authentication information (user ID and password) that is added to the printing data is not stored in the data storage part 107 in correspondence with the printing data or, the authentication information (user ID and password) that is added to the printing data is stored in the data storage part 107 in correspondence with the printing data but the user does not have the execution right of the printer (NO in step S202), the CPU 101 notifies the user that the user authentication was unsuccessful (or not certified), and deletes (or resets) the job of the printing data temporarily stored in the memory 108 (step S204), and the process of the image forming apparatus 100 ends.

If the image forming part 109 judges that the authentication information is not added to the printing data (NO in step S201), the CPU 101 refers to the data storage part 107 and judges whether or not the authentication environment of the image forming apparatus 100 is set to "simple" (step S203).

If the CPU 101 judges that the authentication environment of the image forming apparatus 100 is set to "simple" (YES in step S203), the CPU 101 adds a public attribute with respect to the printing data that is not added with the authentication information and controls the printer part 104 to execute a printing process. The public attribute indicates that the printing data that is added with this public attribute as the authentication information does not require authentication. Hence, when the printing data is added with the public attribute as the authentication information, the printing data does not require authentication and the printing process may be executed by the printer part 104 of the image forming apparatus 100.

On the other hand, if the CPU 101 judges that the authentication environment of the image forming apparatus 100 is set to "all" (NO in step S203), the CPU 101 judges that the user authentication with respect to the user who made the print request for the printing data was unsuccessful, notifies the user that the user authentication was unsuccessful, and deletes (or resets) the job of the printing data temporarily stored in the memory 108 (step S204).

Therefore, when the image forming apparatus 100 receives the printing data, the image forming apparatus 100 compares the authentication information (user ID and password) that is added to the received printing data and the user management information stored in the data storage part 107. If the image forming apparatus 100 judges that the authentication information that is added to the received printing data is stored in the data storage part 107 or, that the public attribute is added as the authentication information to the received printing data, the image forming apparatus 100 carries out the printing process.

[User Authentication Process Upon Generation of Error]

Figure 10:
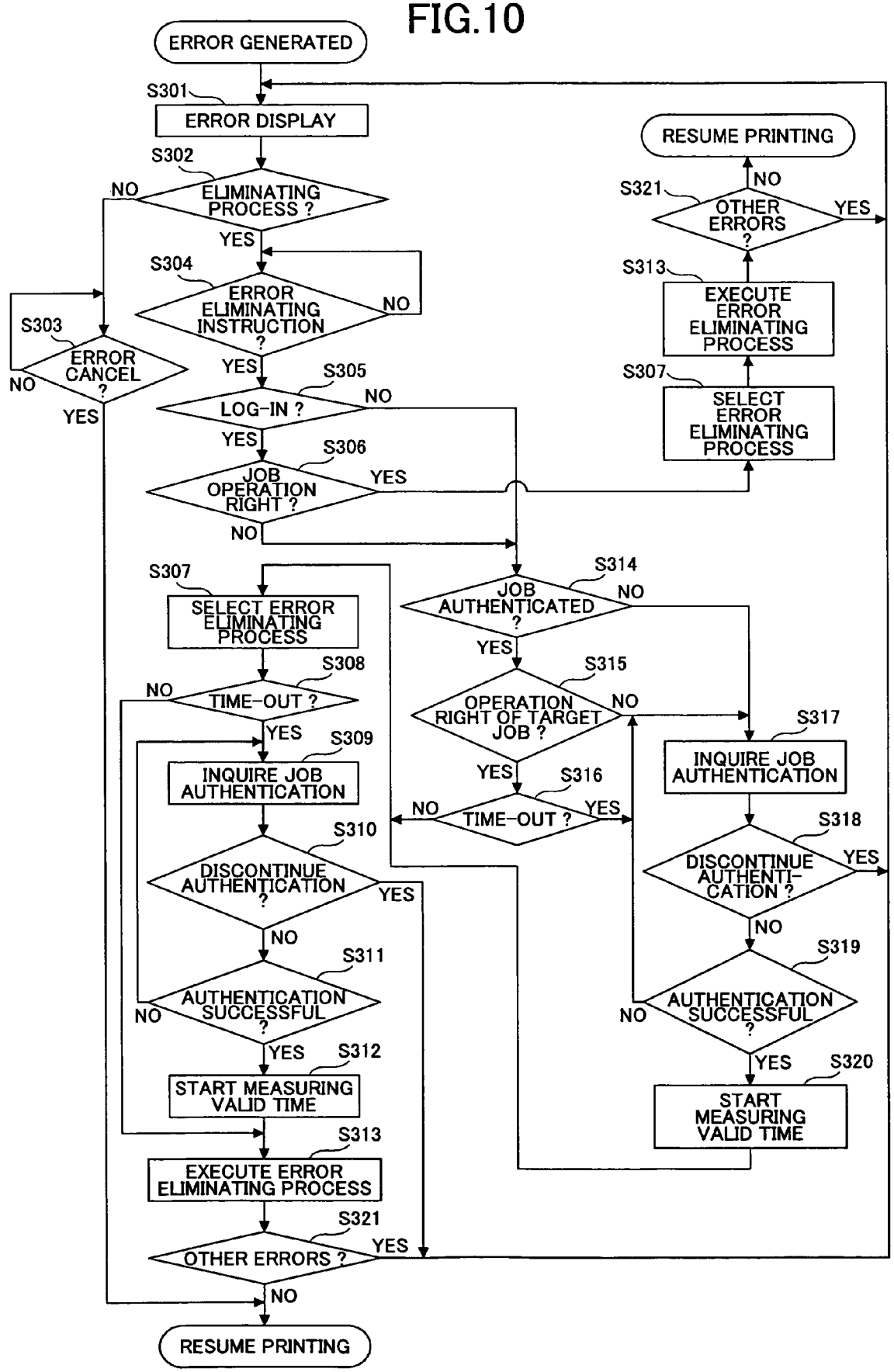
FIG. 10 is a flow chart for explaining a process when an error is generated in the image forming apparatus of the first embodiment of the present invention.

Next, a description will be given of the authentication process of the image forming apparatus 100 when an error which makes it impossible to continue the printing process is generated, by referring to FIG. 10. FIG. 10 is a flow chart for explaining the authentication process of the image forming apparatus 100 when the error is generated in the image forming apparatus 100 of the first embodiment of the present invention.

Suppose that the CPU 101 judges that an error is generated in the job while the I/F part 106 successively receives the printing data from the host computer 120 and the printer part 104 executes the printing process with respect to the received printing data. In this case, the CPU 101 displays an error message, that is, an error display screen, on the operation and display part 103 (step S301).

The CPU 101 specifies the cause of the generated error, and judges whether or not the generated error can be eliminated based on information that is input from the operation and display part 103 (step S302).

For example, if the CPU 101 judges that the generated error is an error, such as a paper jam and a lack of printing paper, that cannot be eliminated by a user operation made from the operation and display part 103, the CPU 101 judges that it is impossible to eliminate the generated error based on the information input from the operation and display part 103 (NO in step S302), and the CPU 101 judges whether or not the generated error has been eliminated by a user operation that has been made, such as an operation to remove the paper jam and an operation to supply the insufficient printing paper (step S303). If the CPU 101 judges that the generated error has not been eliminated (NO in step S303), the process of the step S303 is repeated at predetermined time intervals, for example. If the CPU 101 judges that the generated error has been eliminated (YES in step S303), the CPU 101 resumes the printing process of the image forming apparatus 100.

If the CPU 101 judges that it is possible to eliminate (or avoid) the generated error by a user operation made from the operation and display part 103 (YES in step S302), the CPU 101 judges whether or not an error elimination instructing operation has been made from the operation and display part 103 (step S304). For example, the error elimination instructing operation that is made by the user includes inputting an instruction to carry out a forced printing, stapling cancellation, sorting cancellation, duplex cancellation or other function cancellations from the operation and display part 103 when the error is generated.

Next, if the CPU 101 judges that the error elimination instructing operation is not made from the operation and display part 103 (NO in step S304), the CPU 101 repeats the process of the step S304 until the judgement result becomes YES. If the CPU 101 judges that the error elimination instructing operation has been made from the operation and display part 103 (YES in step S304), the CPU 101 judges whether or not the image forming apparatus 100 is presently in a logged in state (step S305).

If the CPU 101 judges that the image forming apparatus 100 is presently in the logged in state (YES in step S305), the CPU 101 judges whether or not the operating user who is presently logged in to the image forming apparatus 100 has an access right with respect to the job that is the target of the error eliminating process (step S306). The job that is the target of the error eliminating process will hereinafter be referred to as an error eliminating target job. More particularly, the following process is carried out in the step S306.

First, the CPU 101 judges whether or not the user ID and password of the operating user who is presently logged in to the image forming apparatus 100, that are temporarily stored in the memory 108, match the job authentication information (user ID and password) that is added to the printing data. If the CPU 101 judges that the compared user ID and password match, the CPU 101 judges that the operating user who is presently logged in to the image forming apparatus 100 has the access right with respect to the error eliminating target job. On the other hand, if the CPU 101 judges that the compared user ID and password do not match, the CPU 101 judges that the operating user who is presently logged in to the image forming apparatus 100 does not have the access right with respect to the error eliminating target job. In a case where the CPU 101 recognizes that the public attribute is set with respect to the error eliminating target job, the CPU 101 judges that all operating users have the access right with respect to the error eliminating target job.

Next, if the CPU 101 judges that the operating user who is presently logged in to the image forming apparatus 100 has the access right with respect to the error eliminating target job (YES in step S306), the CPU 101 displays on the operation and display part 103 a screen for urging the operating user to select the error eliminating process (step S307).

When an execution request for the error eliminating process is made from the operation and display part 103 by the operating user on the screen that is displayed on the operation and display part 103 in the step S307, the CPU 101 executes the error eliminating process (step S313), and judges whether or not one or more other errors are generated in the image forming apparatus 100 (step S321). If the CPU 101 judges that one or more other errors are generated in the image forming apparatus 100 (YES in step S321), the CPU 101 returns to the process of the step S301, so as to again display the error display screen on the operation and display part 103. In addition, if the CPU 101 judges that one or more other errors are not generated in the image forming apparatus 100 (NO in step S321), the CPU 101 resumes the printing operation of the image forming apparatus 100.

If the CPU 101 judges that the image forming apparatus 100 is presently not in the logged in state (NO in step S305) or, judges that the operating user who is presently logged in to the image forming apparatus 100 does not have the access right with respect to the error eliminating target job (NO in step S306), the CPU 101 judges whether or not the operating user has an access right with respect to some kind of job operation (step S314). The following process is carried out in the step S314.

First, the CPU 101 judges whether or not an access right with respect to some kind of job operation is issued to and stored with respect to the user ID and password of the operating user that are temporarily stored in the memory 108. If the CPU 101 judges that the access right with respect to some kind of job operation is issued to and stored with respect to the user ID and password of the operating user that are temporarily stored in the memory 108, the CPU 101 judges that the operating user has the access right with respect to some kind of job operation. On the other hand, if the CPU judges that the access right with respect to some kind of job operation is not issued to and stored with respect to the user ID and password of the operating user that are temporarily stored in the memory 108, the CPU 101 judges that the operating user does not have the access right with respect to some kind of job operation.

If the CPU 101 judges that the operating user does not have the access right with respect to some kind of job operation (NO in step S314), the CPU 101 displays an authentication information input screen on the operation and display part 103 (step S317).

Figure 11:
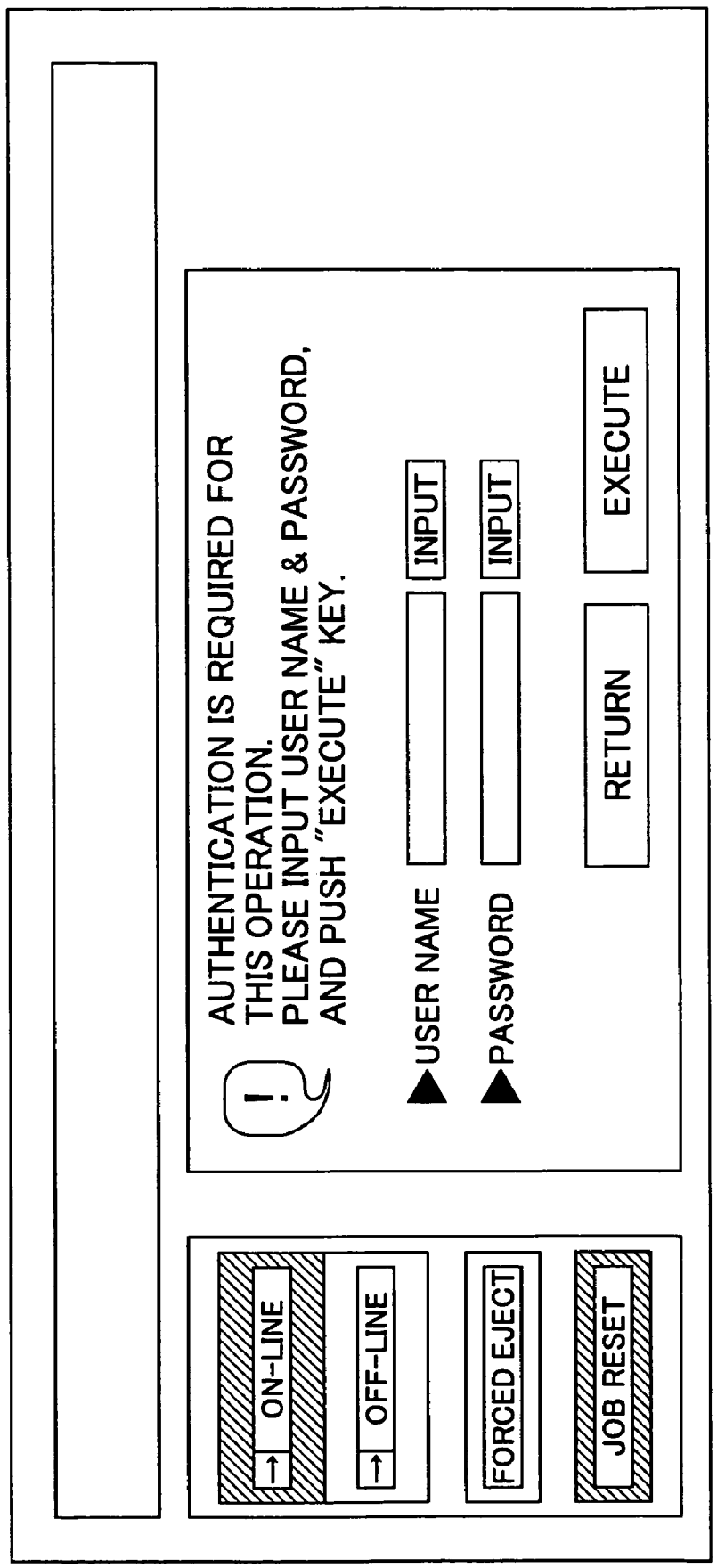
FIG. 11 is a diagram showing an authentication information input screen of the first and seventh embodiments of the present invention.
Figure 12:
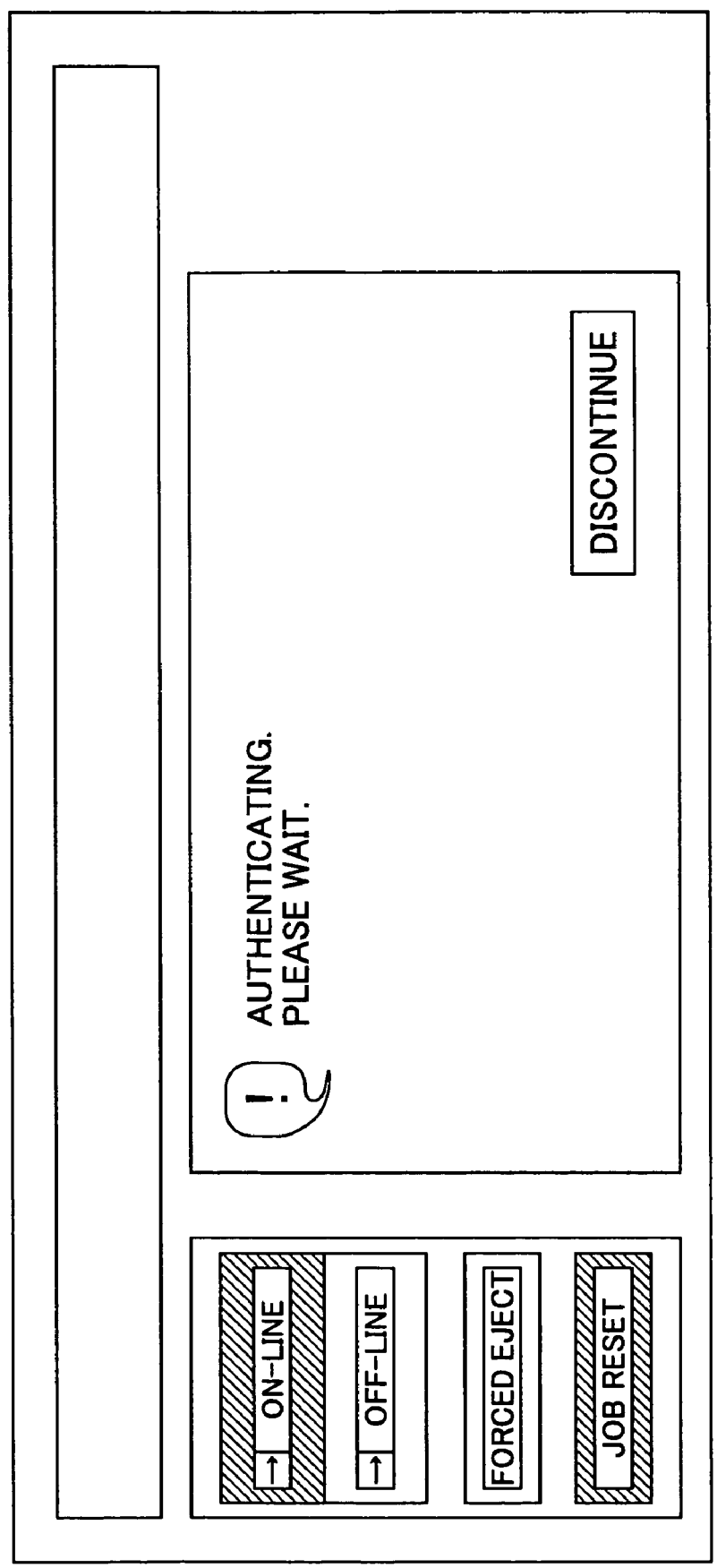
FIG. 12 is a diagram showing a screen indicating an access right issuing process that is in progress in the first embodiment of the present invention.

FIG. 11 is a diagram showing the authentication information input screen that is displayed on the operation and display part 103 of the first embodiment of the present invention. As shown in FIG. 11, the authentication information input screen that is displayed on the operation and display part 103 includes a user name field and a password field. The operating user inputs the user ID and the password in the user name field and the password field on the authentication information input screen shown in FIG. 11, and the user ID and the password are input to the CPU 101 and temporarily stored in the memory 108 when the operating user selects an "execute (or enter)"-key on the authentication information input screen. Then, the CPU 101 displays on the operation and display part 103 a screen shown in FIG. 12 indicating that an access right issuing process is in progress. FIG. 12 is a diagram showing the screen indicating the access right issuing process that is in progress in the first embodiment of the present invention.

While the screen shown in FIG. 12 indicating that the access right issuing process is in progress is displayed on the operation and display part 103, the CPU 101 judges whether or not a "discontinue" key on the screen has been selected and a discontinue instruction has been made to discontinue the user authentication process (step S318). If the CPU 101 judges that the discontinue instruction with respect to the user authentication process has been made (YES in step S318), the process returns to the step S301 to again display the error display screen on the operation and display part 103. If the CPU 101 judges that the discontinue instruction with respect to the user authentication process has not been made (NO in step S318), the CPU 101 judges whether or not the operating user can acquire the access right with respect to the error eliminating target job (step S319). More particularly, the following process is carried out in the step S319.

First, the CPU 101 compares the user ID and password that are input from the authentication information input screen displayed on the operation and display part 103 and the user management information stored in the data storage part 107, and judges whether or not the user ID and password that are input from the authentication information input screen are stored in the data storage part 107 in correspondence with each other. If the CPU 101 judges that the user ID and password that are input from the authentication information input screen are stored in the data storage part 107 in correspondence with each other, the CPU 101 collates the user ID and password that are input from the authentication information input screen and the job authentication information included in the job that is transmitted from the host computer 120. If the CPU 101 judges that the collated user ID and password match, the CPU 101 judges that the operating user can acquire the access right with respect to the error eliminating target job, and temporarily stores the user ID and password that are input from the authentication information input screen in the memory 108. Moreover, if the CPU 101 judges that the user ID and password that are input from the authentication information input screen are not stored in the data storage part 107 in correspondence with each other or, judges that the user ID and password that are input from the authentication information input screen are stored in the data storage part 107 in correspondence with each other but do not match the hob authentication information included in the job that is transmitted from the host computer 120, the CPU 101 judges that the operating user cannot acquire the access right with respect to the error eliminating target job.

Next, if the CPU 101 judges that the operating error cannot acquire the access right with respect to the error eliminating target job (NO in step S319), the CPU 101 displays on the operation and display part 103 a screen indicating that the operating user cannot acquire the access right with respect to the error eliminating target job, and the process returns to the step S317 to again display the authentication information input screen shown in FIG. 11 on the operation and display part 103. If the CPU 101 judges that the operating user can acquire the access right with respect to the error eliminating target job (YES in step S319), the CPU 101 controls the timer 110 to start measuring a valid (or effective) time (step S320). After the CPU 101 starts the timer 110 to measure the valid time, the CPU 101 displays on the operation and display part 103 the screen for urging the operating user to select the error eliminating process (step S307). If the CPU 101 judges that the operating error cannot acquire the access right with respect to the error eliminating target job (NO in step S319), the process may instead return to the step S301 so as to again display the error display screen on the operation and display part 103.

If the CPU 101 judges that the access right with respect to some kind of job operation is issued to the operating user (YES in step S314), the CPU 101 judges whether or not the access right with respect to some kind of job operation issued to the operating user concerns an access right with respect to the error eliminating target job (step S315). The following process is carried out in the step S315.

If the CPU 101 judges that the user ID and password of the operating user temporarily stored in the memory 108 match the authentication information (user ID and password) that is added to the error eliminating target job or, the public attribute is added to the error eliminating target job, the CPU 101 judges that the access right with respect to the job operation issued to the operating user is an access right with respect to the error eliminating target job. In addition, if the CPU 101 judges the user ID and password of the operating user temporarily stored in the memory 108 do not match the authentication information (user ID and password) that is added to the error eliminating target job, the CPU 101 judges that the access right with respect to the job operation issued to the operating user is not an access right with respect to the error eliminating target job.

If the CPU 101 judges that the access right with respect to the job operation issued to the operating user is not an access right with respect to the error eliminating target job (NO in step S315), the CPU 101 displays the authentication information input screen shown in FIG. 11 on the operation and display part 103 (step S317). If the CPU judges that the access right with respect to the job operation issued to the operating user is an access right with respect to the error eliminating target job (YES in step S315), the CPU 101 judges whether or not the valid time measured by the timer 110 from the start of the measurement exceeds a preset valid time of the authentication with respect to the job operation that is preset in the data storage part 107 (step S316).

If the CPU 101 judges that the valid time measured by the timer 110 from the start of the measurement exceeds the preset valid time of the authentication with respect to the job operation that is preset in the data storage part 107 (YES in step S316), the CPU 101 erases the user ID and password that are temporarily stored in the memory 108 to cancel the access right with respect to the job operation issued to the operating user, and displays the authentication information input screen shown in FIG. 11 on the operation and display part 103 (step S317). On the other hand, if the CPU 101 judges that the valid time measured by the timer 110 from the start of the measurement does not exceed the preset valid time of the authentication with respect to the job operation that is preset in the data storage part 107 (NO in step S316), the CPU 101 displays on the operation and display part 103 the screen for urging the operating user to select the error eliminating process (step S307).

Next, other than the case where the CPU 101 judges that the image forming apparatus 100 is presently in the logged in state (YES in step S305) and also judges that the operating user who is presently logged in has the access right with respect to the error eliminating process (YES in step S306), the process advances to the step S307 when a predetermined operation is made. In this case, when the execution request for the error eliminating process is made from the screen that is displayed on the operation and display part 103 for urging the operating user to select the error eliminating process (step S307), the CPU 101 judges whether or not the valid time measured by the timer 110 from the start of the measurement exceeds the valid time of the authentication with respect to the job operation that is preset in the data storage part 107 (step S308).

If the CPU 101 judges that the valid time measured by the timer 110 from the start of the measurement does not exceed the valid time of the authentication with respect to the job operation that is preset in the data storage part 107 (NO in step S308), the selected error eliminating process is executed (step S313). On the other hand, if the CPU 101 judges that the valid time measured by the timer 110 from the start of the measurement exceeds the valid time of the authentication with respect to the job operation that is preset in the data storage part 107 (YES in step S308), the CPU 101 erases the user ID and password that are temporarily stored in the memory 108 to cancel the access right with respect to the job operation issued to the operating user, and displays the authentication information input screen shown in FIG. 11 on the operation and display part 103 so as to inquire the job authentication to the user (step S309).

Next, after the CPU 101 judges that the authentication information is input to the input fields and the "execute" key is selected on the authentication information input screen shown in FIG. 11 that is displayed on the operation and display part 103, the CPU 101 displays on the operation and display part 103 a screen shown FIG. 12 indicating that the access right issuing process is in progress. The CPU 101 then judges whether or not the "discontinue" key is selected on the screen shown in FIG. 12 indicating that the access right issuing process is in progress and that a discontinue instruction has been made with respect to the user authentication process (step S310). If the CPU 101 judges that the discontinue instruction with respect to the user authentication process has been made (YES in step S310), the CPU 101 again displays the error display screen on the operation and display part 103 (step S301).

On the other hand, if the CPU 101 judges that the discontinue instruction with respect to the user authentication process has not been made (NO in step S310), the CPU 101 judges whether or not the operating user can acquire the access right with respect to the error eliminating target job (step S311). More particularly, the following process is carried out in the step S311.

First, the CPU 101 compares the user ID and password that are input from the authentication information input screen displayed on the operation and display part 103 and the user management information stored in the data storage part 107, and judges whether or not the user ID and password that are input from the authentication information input screen are stored in the data storage part 107 in correspondence with each other. If the CPU 101 judges that the user ID and password that are input from the authentication information input screen are stored in the data storage part 107 in correspondence with each other, the CPU 101 collates the user ID and password that are input from the authentication information input screen and the job authentication information included in the job that is transmitted from the host computer 120. If the CPU 101 judges that the collated user ID and password match, the CPU 101 judges that the operating user can acquire the access right with respect to the error eliminating target job, and temporarily stores the user ID and password that are input from the authentication information input screen in the memory 108. Moreover, if the CPU 101 judges that the user ID and password that are input from the authentication information input screen are not stored in the data storage part 107 in correspondence with each other or, judges that the user ID and password that are input from the authentication information input screen are stored in the data storage part 107 in correspondence with each other but do not match the hob authentication information included in the job that is transmitted from the host computer 120, the CPU 101 judges that the operating user cannot acquire the access right with respect to the error eliminating target job.

Next, if the CPU 101 judges that the operating user cannot acquire the access right with respect to the error eliminating target job (NO in step S311), the CPU 101 displays on the operation and display part 103 a screen indicating that the operating user cannot acquire the access right with respect to the error eliminating target job, and the process returns to the step S309 to again display the authentication information input screen shown in FIG. 11 on the operation and display part 103. If the CPU 101 judges that the operating user cannot acquire the access right with respect to the error eliminating target job (NO in step S311), the process may instead return to the step S301 to again display the error display screen on the operation and display part 103.

If the CPU 101 judges that the operating user can acquire the access right with respect to the error eliminating target job (YES in step S311), the CPU 101 controls the timer 110 to start measuring an effective time (step S312).

Thereafter, the CPU 101 executes the error eliminating process (step S313), and judges whether or not one or more other errors are generated in the image forming apparatus 100 (step S321). If the CPU 101 judges that one or more other errors are generated in the image forming apparatus (YES in step S321), the CPU 101 again displays the error display screen on the operation and display part 103 (step S301). In addition, if the CPU 101 judges that one or more other errors are not generated in the image forming apparatus 100 (NO in step S321), the CPU 101 resumes the printing operation of the image forming apparatus 100.

[First User Authentication Operation Upon Error Generation in FIG. 10]

Next, a description will be given of a first user authentication operation upon error generation in FIG. 10.

It is assumed for the sake of convenience that the first user authentication operation upon error generation is carried out in a state where the image forming apparatus 100 is presently logged in (YES in step S305) and the operating user who is presently logged in to the image forming apparatus 100 has the access right with respect to the error eliminating target job (YES in step S306). In this case, when the error is generated, the process shown in FIG. 10 does not advance to the step S314, and always advances via the steps S305 (YES) and S306 (YES) to the step S307 to select of the error eliminating process.

[Second User Authentication Operation Upon Error Generation in FIG. 10]

Next, a description will be given of a second user authentication operation upon error generation in FIG. 10.

It is assumed for the sake of convenience that the second user authentication operation upon error generation is carried out in a state where the image forming apparatus 100 is presently logged in (NO in step S305). In this case, when the error is generated, the process advances to the step S314 to judge whether or not the access right with respect to some kind of job operation is issued to the operating user. At this stage, the access right with respect to some kind of job operation is not yet issued to the operating user (NO in step S314), and thus, the operation advances to the step S317 to display the authentication information input screen on the operation and display part 103 and to inquire the job authentication.

Next, the user ID and password are input from the authentication information input screen, and if the authentication is successful and it is judged that the operating user can acquire the access right with respect to the error eliminating target job (YES in step S319), the measurement of the valid time by the timer 110 is started (step S320), and the screen for selecting the error eliminating process is displayed on the operation and display part 103 (step S307). Then, the error eliminating process is executed, and the error eliminating process is completed for the first time (step S313). Thereafter, if it is judged that one or more other errors are generated (YES in step S321), the process advances to the step S301 to again display the error display screen on the operation and display part 103. The step S305 then judges whether or not the image forming apparatus 100 is presently in the logged in state.

In this case, the image forming apparatus 100 is presently not in the logged in state (NO in step S305), and the step S314 judges whether or not the access right with respect to some kind of job operation is issued to the operating user. In this state, since the step S319 has judged when the error eliminating process is completed for the first time that the operating user has acquired the access right with respect to the error eliminating target job, it is judged that the access right with respect to some kind of job operation is issued to the operating user (YES in step S314). Next, the step S315 judges whether or not the access right with respect to some kind of job operation issued to the operating user is the access right with respect to the error eliminating target job. If it is judged that the access right with respect to some kind of job operation issued to the operating user is the access right with respect to the error eliminating target job (YES in step S315), the step S316 judges whether or not the valid time measured by the timer 110 from the time when the measurement is started has exceeded the preset valid time of the authentication with respect to the job operation. If it is judged that the preset valid time of the authentication with respect to the job operation has not been exceeded (NO in step S316), the step S307 displays the screen for selecting the error eliminating process on the operation and display part 103. Then, the error eliminating process is executed, and the error eliminating process is completed for the second time (step S313).

Suppose that no other error is generated (NO in step S321), the printing process is resumed and the printing process is executed, but an error is generated again within the valid time of the authentication with respect to the job operation. In this state, the image forming apparatus 100 is not in the logged in state (NO in step S305), and thus, the process advances to the step S314. Since it is still within the valid time of the authentication with respect to the job operation, it is judged that the access right with respect to some kind of job operation is issued to the operating user (YES in step S314), and the step S315 judges whether or not the access right with respect to the job operation issued to the operating user is the access right with respect to the error eliminating target job. If it is judged that the access right with respect to the job operation issued to the operating user is the access right with respect to the error eliminating target job (YES in step S315), the step 316 judges whether or not the preset valid time of the authentication with respect to the job operation has been exceeded, and the error eliminating process is executed (step S313).

[Third User Authentication Operation Upon Error Generation in FIG. 10]

Next, a description will be given of a third user authentication operation upon error generation in FIG. 10.

It is assumed for the sake of convenience that the third user authentication operation upon error generation is carried out in a state where the image forming apparatus 100 is presently logged in (YES in step S305), but the operating user who is presently logged in does not have the access right with respect to the error eliminating target job (NO in step S306). In this case, when the error is generated, the process shown in FIG. 10 advances to the step S314 to judge whether or not the access right with respect to some kind of job operation is issued to the operating user. At this stage, since the access right with respect to some kind of job operation is not yet issued to the operating user (NO in step S314), the authentication information input screen is displayed on the operation and display part 103 and the job authentication is inquired (step S317).

Next, when the user ID and password are input from the authentication input screen and the authentication is successful, so that it is judged that the operating user can acquire the access right with respect to the error eliminating target job (YES in step S319), the measurement of the valid time by the timer 110 is started (step S320), and the screen for selecting the error eliminating process is displayed on the operation and display part 103 (step S307). Then, the error eliminating process is executed, and the error eliminating process is completed for the first time (step S313). Further, if it is judged that one or more other errors are generated (YES in step S321), the error display screen is again displayed on the operation and display part 103 (step S301). It is then judged whether or not the image forming apparatus 100 is presently in the logged in state (step S305).

In this case, the image forming apparatus 100 is presently in the logged in state (YES in step S305), and the step S306 judges whether or not the operating user who is presently logged in has the access right with respect to the error eliminating target job. If the operating user who is presently logged in does not have the access right with respect to the error eliminating target job (NO in step S306), the step S314 judges whether or not the access right with respect to some kind of job operation is issued to the operating user. In this state, since the step S319 has judged when the error eliminating process is completed for the first time that the operating user has acquired the access right with respect to the error eliminating target job, it is judged that the access right with respect to some kind of job operation is issued to the operating user (YES in step S314). Next, the step S315 judges whether or not the access right with respect to some kind of job operation issued to the operating user is the access right with respect to the error eliminating target job. If it is judged that the access right with respect to some kind of job operation issued to the operating user is the access right with respect to the error eliminating target job (YES in step S315), the step S316 judges whether or not the valid time measured by the timer 110 from the time when the measurement is started has exceeded the preset valid time of the authentication with respect to the job operation. If it is judged that the preset valid time of the authentication with respect to the job operation has not been exceeded (NO in step S316), the step S307 displays the screen for selecting the error eliminating process on the operation and display part 103. Then, the error eliminating process is executed, and the error eliminating process is completed for the second time (step S313).

Suppose that no other error is generated (NO in step S321), the printing process is resumed and the printing process is executed, but an error is generated again within the valid time of the authentication with respect to the job operation. In this state, the image forming apparatus 100 is in the logged in state (YES in step S305), but the process advances to the step S314 because the operating user who is presently logged in does not have the access right with respect to the error eliminating target job (NO in step S306). Since it is still within the valid time of the authentication with respect to the job operation, it is judged that the access with respect to some kind of job operation is issued to the operating user (YES in step S314), and the step S315 judges whether or not the access right with respect to some kind of job operation issued to the operating user is the access right with respect to the error eliminating target job. If it is judged that the access right with respect to some kind of job operation issued to the operating user is the access right with respect to the error eliminating target job (YES in step S315), the step 316 judges whether or not the preset valid time of the authentication with respect to the job operation has been exceeded, and the error eliminating process is executed (step S313).

[User Authentication Operation Upon Generation of Job Reset]

Figure 13:
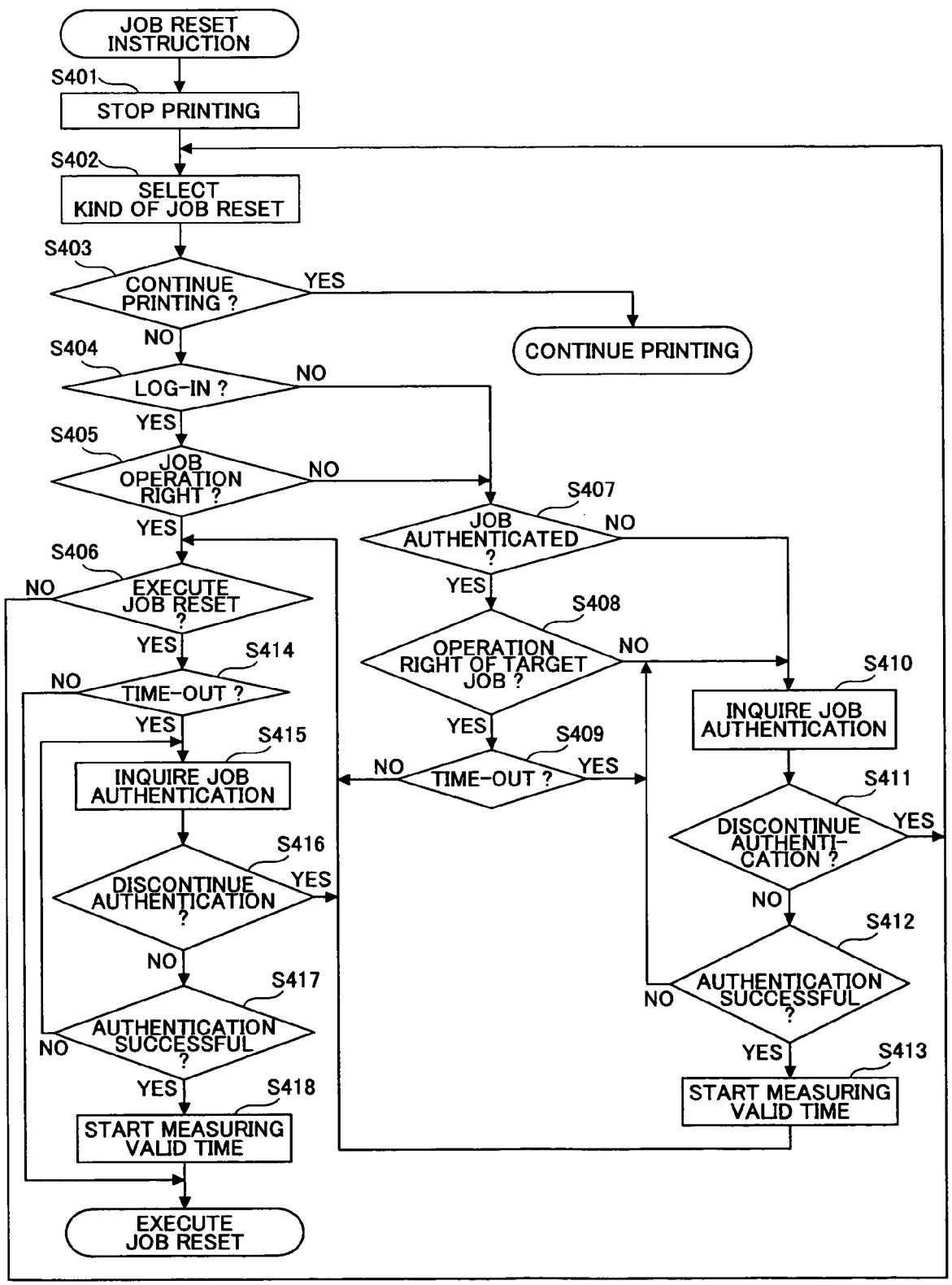
FIG. 13 is a flow chart for explaining an authentication process when a job reset is received by the image forming apparatus of the first embodiment of the present invention.

Next, a description will be given of an authentication operation of the image forming apparatus 100 when a job reset is made with respect to the job that is instructed from the host computer 120, by referring to FIG. 13. FIG. 13 is a flow chart for explaining the authentication process when the job reset is received by the image forming apparatus 100 of the first embodiment of the present invention.

Figure 14:
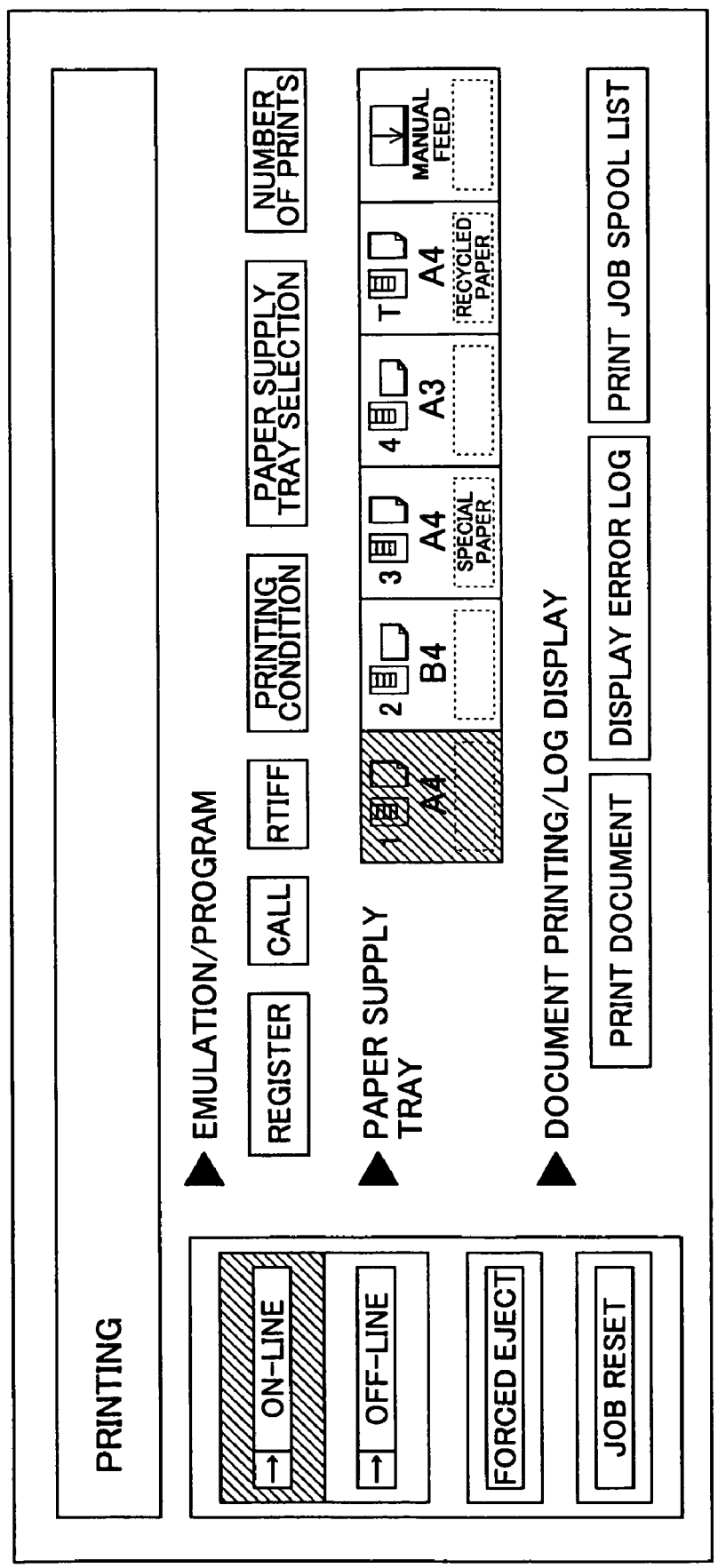
FIG. 14 is a diagram showing a screen that is displayed on an operation display part of the first or seventh embodiment of the present invention when the printing process is in a standby or execution.

FIG. 14 is a diagram showing a screen that is displayed on the operation display part 103 of the first embodiment of the present invention when the printing process is in a standby or execution. As shown in FIG. 14, the operation display part 103 is provided with a "printing condition" key for setting various printing conditions such as sorting and stapling, a "paper supply tray" key for selecting a paper supply tray that is to supply the printing paper, a "print number" key for setting the number of prints or copies to be made, an "online" key for permitting the printing of the printing data received via the network 140, an "offline" key for prohibiting the receipt of the printing data via the network 140, a "forced paper eject" key for forcibly printing images as stored in an image buffer within the image forming apparatus and ejecting the printed images, and a "job reset" key for canceling (or resetting) the job that is presently being executed so as to eliminate the error. In addition, when the printing process is in the standby or execution, the operation and display panel 103 is provided with a "document print" key, an "error log display" key, a "job spool list" key and the like. The "document print" key is selected when executing the printing process with respect to the stored printing data. The "error log display" key is selected when displaying a log of errors generated in the past on the operation and display part 103. The "job spool list" key is selected when displaying on the operation and display part 103 a list of jobs presently spooled in the image forming apparatus 100.

First, when the operating user selects the "job reset" key on the screen shown in FIG. 14 that is displayed on the operation and display part 103, the CPU 101 makes a printing stop request with respect to the printer part 104, so that the printing process is carried out with respect to the printing paper that is already being transported within the image forming apparatus 100 but the printing process is temporarily stopped when the ejection of this printing paper is completed such as when this printing paper is ejected to a stacker provided in an post-processing unit (step S401). For the sake of convenience, it is assumed that all of the printing data are printed until the printing process is stopped, and that the job reset process is not carried out when the printing paper is ejected.

Figure 15:
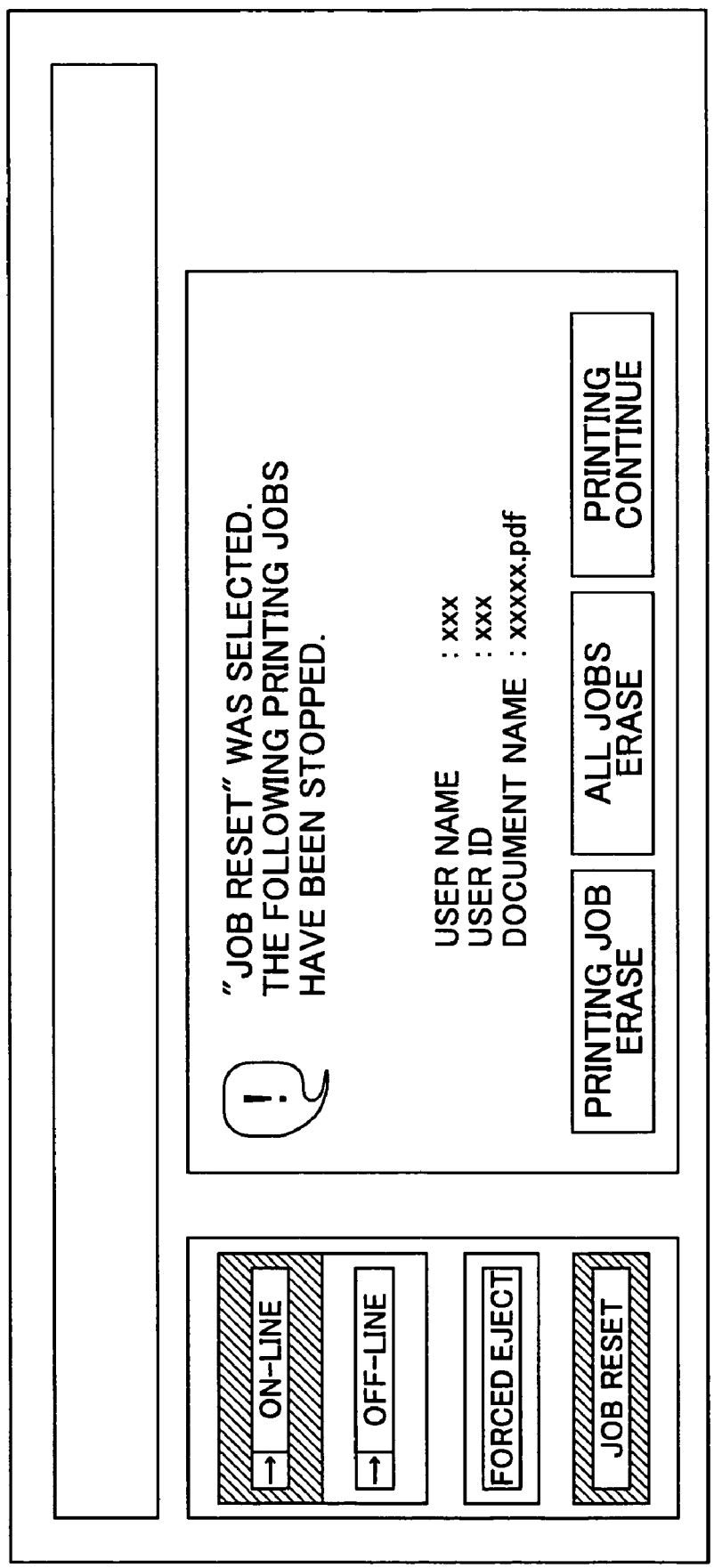
FIG. 15 is a diagram showing a job reset selection screen of the first embodiment of the present invention.

When the printing process stops in response to the printing stop request with respect to the printer part 104, the CPU 101 displays a job reset selection screen shown in FIG. 15 on the operation and display part 103. FIG. 15 is a diagram showing the job reset selection screen of the first embodiment of the present invention. As shown in FIG. 15, the job reset selection screen includes the "document name", the "user name" and "user ID" of the user who instructed the printing job of the printing process from the host computer 120, which printing job has been stopped by the selection of the "job reset" key on the screen shown in FIG. 14. The job reset selection screen further includes a "printing job erase" key, an "all jobs erase" key and a "printing continue" key. The "printing job erase" key is selected to erase the printing job that is temporarily stopped. The "all jobs erase" key is selected when erasing all jobs that are presently spooled in the data storage part 107. The "printing continue" key is selected when resuming the printing process of the printing job that is temporarily stopped.

The operating user selects one of the "printing job erase" key, the "all jobs erase" key and the "printing continue" key on the job reset selection screen shown in FIG. 15 that is displayed on the operation and display part 103 (step S402).

Then the CPU 101 judges whether or not the "printing continue" key on the operation and display panel 103 is selected by the operating user (step S403). If the CPU 101 judges that the "printing continue" key is selected (YES in step S403), the CPU 101 controls the printer part 104 to execute the printing process of the printing job that was temporarily stopped, so as to resume the printing operation.

If CPU 101 judges that the "printing job erase" key or the "all job erase" key on the operation and display part 103 is selected by the operating user (NO in step S403), the CPU 101 judges whether or not the image forming apparatus 100 is presently in the logged in state (step S404).

If the CPU 101 judges that the image forming apparatus 100 is presently in the logged in state (YES in step S404), the CPU 101 judges whether or not the operating user who is presently logged in to the image forming apparatus 100 has the access right with respect to the job that is the reset target, that is, the reset target job (step S405).

Figure 16:
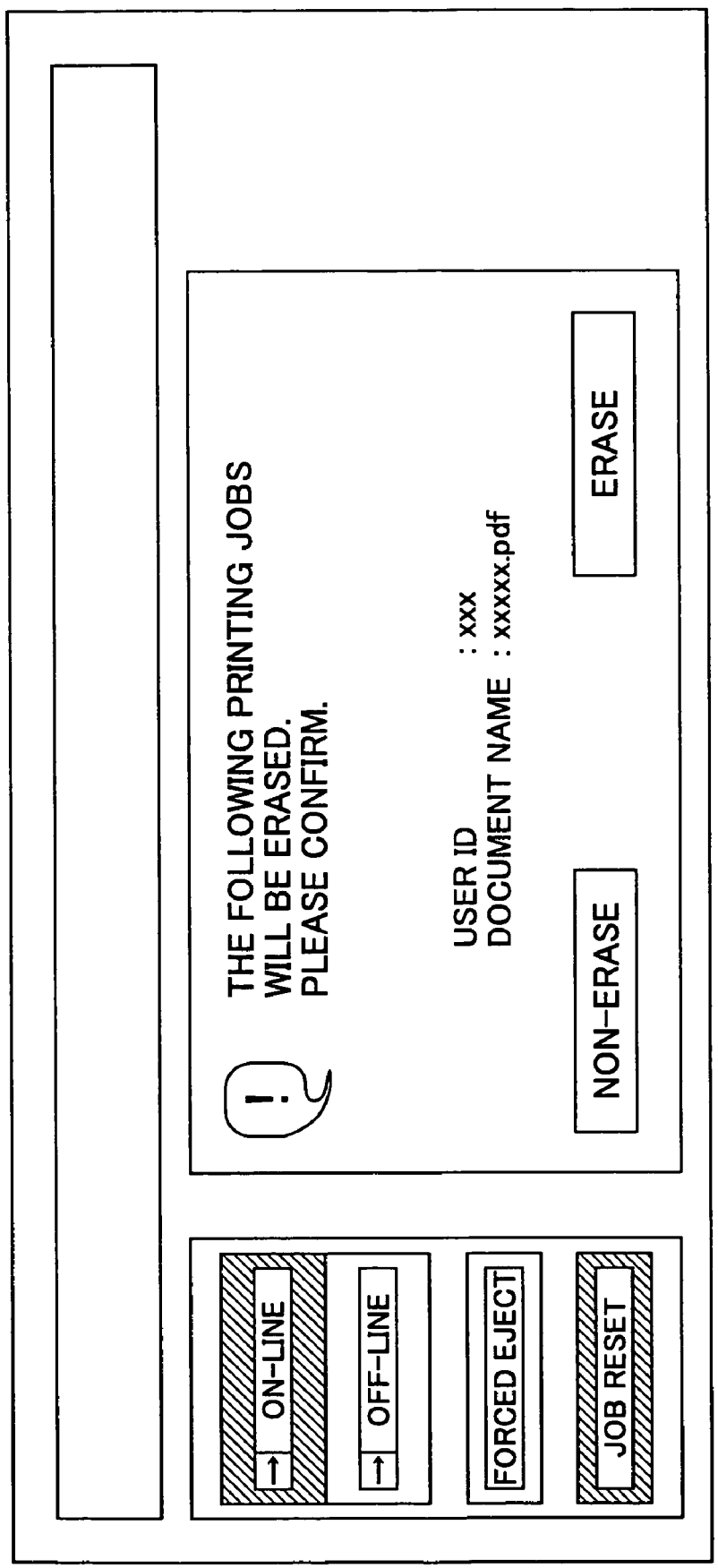
FIG. 16 is a diagram showing a job reset confirmation screen of the first embodiment of the present invention.

If the CPU 101 judges that the operating user who is presently logged in to the image forming apparatus 100 has the access right to the reset target job (YES in step S405), the CPU 101 displays a job reset confirmation screen shown in FIG. 16 on the operation and display part 103. FIG. 16 is a diagram showing the job reset confirmation screen of the first embodiment of the present invention. As shown in FIG. 16, the job reset confirmation screen includes the user ID of the user who instructed execution of the reset target job and the document name, for example.

The CPU 101 judges whether or not a "non-erase" key or an "erase" key on the job reset confirmation screen shown in FIG. 16 is selected. More particularly, the CPU 101 judges whether or not the "erase" key is selected and the instruction to execute a reset process with respect to the target job is input (step S406).

If the CPU 101 judges that the "erase" key is selected and the instruction to execute the reset process with respect to the target job is input (YES in step S406), the process advances to a step S414 other than a case where the CPU 101 judges that the image forming apparatus 100 is presently in the logged in state (YES in step S404) and also judges that the operating user who is presently logged in has the access right to the reset target job (YES in step S405). In the step S414, the CPU 101 judges whether or not a present valid time of the authentication with respect to the job operation, stored in the data storage part 107, is exceeded from a time when the measurement of a valid time is started by the timer 110.

If the CPU 101 judges that the preset valid time of the authentication with respect to the job operation, stored in the data storage part 107, is not exceeded from the time when the measurement of the valid time is started by the timer 110 (NO in step S414), the CPU 101 executes a job reset so as to delete the corresponding printing data and the like within the data storage part 107 and the memory 108, and to cancel the reset target job for which the instruction is received to execute the job reset. Thereafter, the CPU 101 resumes the printing operation in the image forming apparatus 100. In addition, if the CPU 101 judges that the preset valid time of the authentication with respect to the job operation, stored in the data storage part 107, is exceeded from the time when the measurement of the valid time is started by the timer 110 (YES in step S414), the CPU 101 erases the user ID and password that are temporarily stored in the memory 108 so as to cancel the access right with respect to the reset target job issued to the operating user, and thereafter displays the authentication information input screen shown in FIG. 11 on the operation and display part 103 to inquire the job authentication to the operating user (step S415). The CPU 101 judges whether or not the "discontinue" key is selected on the screen shown in FIG. 12 indicating that a discontinue instruction has been made with respect to the user authentication process (step S416). If the CPU 101 judges that the discontinue instruction with respect to the user authentication process has been made (YES in step S416), the CPU 101 again judges whether or not the "erase" key is selected and the instruction to execute a reset process with respect to the target job is input (step S406). On the other hand, if the CPU 101 judges that the discontinue instruction with respect to the user authentication process has not been made (NO in step S416), the CPU 101 judges whether or not the authentication is successful with respect to the authentication information that is input from the authentication information input screen shown in FIG. 11 and that the operating user can acquire the access right with respect to the reset target job. If the CPU 101 judges that the authentication is successful (YES in step S417), the CPU 101 starts the measurement of the valid time by the timer 110 (step S418), and the CPU 101 executes a job reset so as to erase the corresponding printing data and the like within the data storage part 107 and the memory 108, and to cancel the cancel the reset target job for which the instruction is received to execute the job reset.

If the CPU 101 judges that the "non-erase" key shown in FIG. 16 is selected and the instruction not to execute the reset process with respect to the target job is input (NO in step S406), the CPU 101 returns to the process of the step S402 so as to display the job reset selection screen shown in FIG. 15 on the operation and display part 103, so that the operating user may select the job reset.

The job reset confirmation screen shown in FIG. 16 is displayed on the operation and display part 103 when a "printing job erase" key is selected on the job reset selection screen shown in FIG. 15. When the "all jobs erase" key is selected on the job reset selection screen shown in FIG. 15, a screen similar to the job reset confirmation screen shown in FIG. 16 is displayed on the operation and display part 103 except that "following printing job" is replaced by "following all jobs" on the screen. When the "erase" key on the screen is selected by the operating user, the CPU 101 judges that the instruction to execute the job reset process has been input. When the "non-erase" key on the screen is selected by the operating user, the CPU 101 judges that the instruction not to execute the job reset process has been input.

Steps S407 through S413 shown in FIG. 13 carry out processes similar to those of the steps S314 through S320 shown in FIG. 10. After the CPU 101 starts the measurement of the valid time by the timer 110 in the step S413, process of the CPU 101 advances to the step S406. Further, in the case where the CPU 101 judges that the time elapsed from the time when the operating user acquired the access right with respect to the target job is within the preset valid time of the authentication with respect to the job-operation stored in the data storage part 107 (NO in step S409), the process of the CPU 101 advances to the step S406. For this reason, before the job reset instruction is made as shown in FIG. 13, a one-shot authentication is made when the error eliminating process shown in FIG. 10 is carried out, so as to execute the error eliminating process, and the printing is resumed. Thereafter, when the job reset instruction is made as shown in FIG. 13 within the preset valid time of the authentication with respect to the job operation stored in the data storage part 107, the job reset process is carried out without inquiring the authentication with respect to the job operation.

Summary of First Embodiment

Therefore, according to this embodiment, the image forming apparatus 100 carries out the authentication process by collating the authentication information that is added to the job instructed from the host computer 120 and the authentication information that is input from the operation and display part 103 of the image forming apparatus 100, and issues the access right with respect to the job to the operating user who operates the image forming apparatus 100 if the authentication is successful. Hence, when carrying out the error eliminating process with respect to the job or, carrying out a job operation such as the job reset process, the image forming apparatus 100 executes the authentication with respect to the job operation using the authentication information that is set for each job, thereby making it possible to maintain security with respect to the jobs.

In addition, in the case where the operating user who operates the image forming apparatus 100 directly does not have the access right with respect to the operating target job that is the target of the job operation, the CPU 101 in this embodiment carries out the authentication (one-shot authentication) with respect to the job operation, independently of the authentication at the time of the log-in, by collating the authentication information input by the operating user and the information stored in the data storage part 107. When the operating user acquires the access right with respect to the job operation and it becomes possible for the operating user to make an operation with respect to the job as a result of the one-shot authentication, the operating user makes the job operation using the operation and display part 103. Hence, even if there exists a user who is logged in to the image forming apparatus 100, the operating user who is presently logged in to the image forming apparatus 100 can make an operation with respect to the job to which this operating user does not have the access right, from the same operation and display part 103, without having to log out from the image forming apparatus 100.

In addition, according to this embodiment, it is possible to make a setting in the image forming apparatus 100 to permit or prohibit the printing of the job that does not include the job authentication information. As a result, even in the case of a job from a computer that cannot include the authentication information within the job that is transmitted due to specifications or the like, it is possible to it is possible to execute the printing process of such a job in the image forming apparatus 100. In this embodiment, such a job is treated as a guest job, and is added with the "public attribute". User information to be used may be registered in the data storage part 107, and the registered user information may be added to a job that is not added with the authentication information, so as to enable execution of the job as a job of a user indicated by the user information.

In this embodiment, even in a state where the operating user is not logged in to the image forming apparatus 100, the image forming apparatus 100 executes the authentication process for enabling the operating user to acquire the access right with respect to the job operation. Accordingly, in a case where the operating user only wishes to execute the job operation, it is possible to omit the troublesome and unnecessary operation of making a log-in or a log-out with respect to the image forming apparatus 100, to thereby realize a simplified operation for the operating user.

Moreover, when the "job reset" key on the operation and display part 103 is selected to instruct the job reset in this embodiment, the image forming apparatus 100 carries out the authentication process by temporarily stopping the job that is being executed. The image forming apparatus 100 executes the job reset process only when this authentication is successful. Accordingly, it is possible to suppress the execution of an unnecessary printing process while the authentication process is being executed.

Furthermore, in this embodiment, the image forming apparatus 100 sets the valid time of the access right with respect to the job operation, and validates the access right only during the valid time. Hence, if the operating user moves away from the image forming apparatus 100 for some reason after acquiring the access right, for example, it is possible to suppress a third person from making an unauthorized use of the image forming apparatus 100, and the security with respect to the job operation can be improved.

In this embodiment, when the valid time elapses, the image forming apparatus 100 automatically invalidates the access right. However, in a case where the image forming apparatus 100 is used in an environment such that a third person will not make an unauthorized use of the image forming apparatus 100 after the operating user acquires the access right, the image forming apparatus 100 may be constructed not to measure the valid time and not to judge whether or not the valid time has elapsed. Hence, when the operating user carries out the job operation with respect to the same job, it is unnecessary for the operating user to input the authentication information a plurality of times, to thereby realize a simple operation.

In this embodiment, if the preset valid time has not elapsed after the operating user acquires the access right, the CPU 101 may not require the operating user to input the authentication information again when information indicating that the job operation with respect to the same job will be executed is input from the operation and display part 103, so that the access right with respect to the job will continue to be set valid. In this case, if the authentication with respect to the job operation is made in units of jobs, the operating user will not be required to input the authentication information with respect to the job operation for each job, even when the printing is to be carried out consecutively with respect to the so-called small jobs which print one or several pages. As a result, the operating user does not have to carry out the troublesome operation of inputting the authentication information a plurality of times, to thereby realize a simple operation.

In addition, if the preset valid time has not elapsed after the operating user acquires the access right, the CPU 101 may not require the operating user to input the authentication information again when information indicating that the job operation will be executed is input from the operation and display part 103, even when a job to which there is no access right is interposed, so that the access right with respect to the job acquired by the operating user will continue to be set valid. In this case, the operating user is not required to input the authentication information again even if the jobs to which the operating user has the access right are not consecutive (that is, decimated, for example), and the operating user does not have to carry out the troublesome operation of inputting the authentication information a plurality of times, to thereby realize a simple operation.

Even after the preset valid time has elapsed after the operating user acquires the access right, the CPU 101 may not require the operating user to input the authentication information again when the information indicating that the job operation with respect to the same job will be executed is input from the operation and display part 103, so that the access right with respect to the job will continue to be set valid. In this case, even when an error caused by a plurality of causes is generated in the same job and a plurality of job operations are required, it is possible for the operating user to omit the troublesome operation of inputting the authentication information a plurality of times, to thereby realize a simple operation.

In this embodiment, the authentication information (user ID and password) of the operating user input at the time of the log-in, and the authentication information of the operating user input at the time of acquiring the access right with respect to the job operation, may be set the same, so that the image forming apparatus 100 can use the authentication information of the operating user input at the time of the log-in to execute the authentication process for issuing to the operating user the access right with respect to the job operation. In this case, the image forming apparatus 100 can reduce the amount of management information for the job operation. In addition, the operating user who is logged in to the image forming apparatus 100 does not need to input the authentication information again in order to acquire the access right with respect to the job operation, and the operation for acquiring the access right with respect to the job operation can be simplified.

Second Embodiment

Next, a description will be given of a second embodiment of the present invention.

In the first embodiment of the present invention, when the job reset request is input from the operation and display part 103, the image forming apparatus 100 temporarily stops the printing operation and carries out processes such as judging whether or not the operating user has the access right. In addition, if it is judged that the operating user has the access right, the image forming apparatus 100 permits the job reset with respect to the operating user, and thereafter resumes the printing operation.

On the other hand, in this second embodiment, when the job reset request is input from the operation and display part 103, a judgement is made to determine whether or not a user who is presently logged in to the image forming apparatus 100 exists, while continuing the printing operation that is presently being executed in the image forming apparatus 100. A description will be given of the operation of the second embodiment of the present invention. In the following description, a description and illustration of the structure and operation of the second embodiment that are similar to those of the first embodiment will be omitted, unless otherwise indicated.

[User Authentication Operation Upon Generation of Job Reset]

Figure 17:
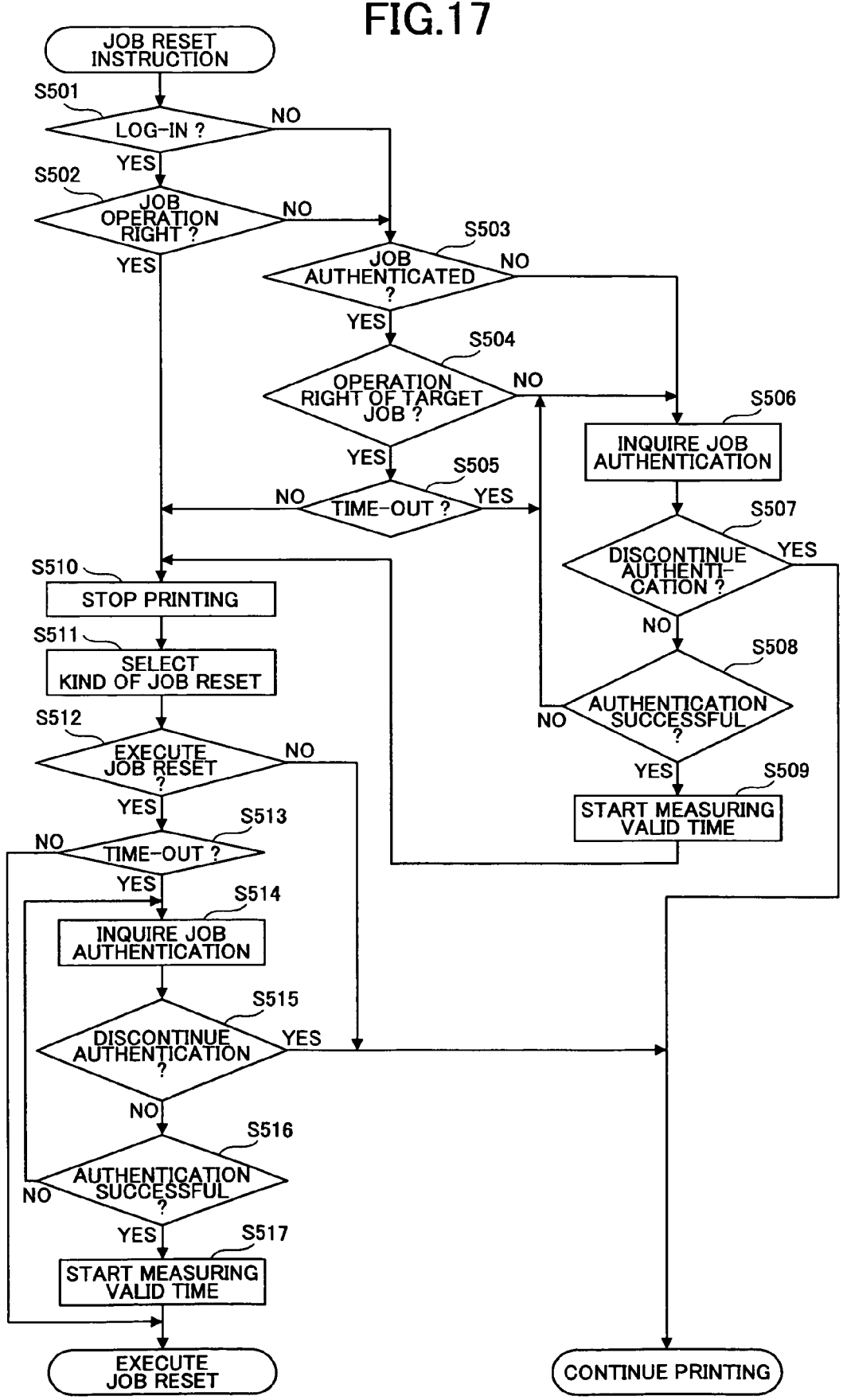
FIG. 17 is a flow chart for explaining an authentication process when a job reset is generated in the image forming apparatus of a second embodiment of the present invention.

First, a description will be given of an authentication operation when a job reset is made with respect to the job that is instructed from the host computer 120, by referring to FIG. 17. FIG. 17 is a flow chart for explaining the authentication process when the job reset is generated in the image forming apparatus 100 of the second embodiment of the present invention.

When a job reset request is input from the operation and display part 103, the CPU 101 judges whether or not the image forming apparatus 100 is presently in the logged in state, while continuing the printing operation that is presently being executed in the image forming apparatus 100 (step S501).

If the CPU 101 judges that the image forming apparatus 100 is presently in the logged in state (YES in step S501), the CPU 101 judges whether or not the authentication information of the operating user who is presently logged in has the access right with respect to the job that is the target of the reset, that is, the reset target job (step S502). The following process may be carried out by the step S502 to judge whether or not the authentication information has the access right to the reset target job.

If it is judged that the authentication information of the operating user who is presently logged in and the authentication information of the reset target job are the same, it is judged that the authentication information of the operating user who is presently logged in has the access right with respect to the reset target job. On the other hand, if it is judged that the authentication information of the operating user who is presently logged in and the authentication information of the reset target job are not the same, it is judged that the authentication information of the operating user who is presently logged in does not have the access right with respect to the reset target job. In addition, if it is recognized that the public attribute is set to the reset target job, it is judged that all operating users have the access right with respect to the reset target job.

If the CPU 101 judges that the operating user who is presently logged in has the access right with respect to the reset target job (YES in step S502), the CPU 101 temporarily stops the printing process of the image forming apparatus 100. Hence, the image forming apparatus 100 stops the job that is printing for the first time after the job reset request is started (step S510).

When the printing process of the image forming apparatus 100 stops, the CPU 101 displays the job reset selection screen shown in FIG. 15 on the operation and display part 103. When the operating user inputs an instruction (printing job erase, all jobs erase or printing continue) from the job reset selection screen shown in FIG. 15 that is displayed on the operation and display part 103 (step S511). The CPU 101 then judges whether or not the instruction input from the operation and display part 103 is a job reset instruction which instructs execution of the printing job erase or all jobs erase (step S512). If the CPU 101 judges that the instruction input from the operation and display part 103 is the job reset instruction which instructs execution of the printing job erase or all jobs erase (YES in step S512), the CPU 101 displays the job reset confirmation screen shown in FIG. 16 on the operation and display part 103.

If the CPU 101 judges that the "erase" key shown in FIG. 16 is selected and the instruction to execute the reset process of the target job has been input (YES in step S512), the CPU 101 carries out a step S513 other than the case where the CPU 101 judges that the image forming apparatus 100 is presently in the logged in state (YES in step S501) and that the operating user who is presently logged in has the access right with respect to the reset target job (YES in step S502). In the step S513, the CPU 101 judges whether or not the preset valid time of the authentication with respect to the job operation stored in the data storage part 107 is exceeded from the time when the measurement of the valid time by the timer 110 is started.

If the CPU 101 judges that the preset valid time of the authentication with respect to the job operation stored in the data storage part 107 has not been exceeded from the time when the measurement of the valid time by the timer 110 is started (NO in step S513), the CPU 101 executes the job reset and deletes the corresponding printing data and the like within the data storage part 107 and the memory 108, so as to cancel the reset target job that is the target of the job reset of the input instruction. If other jobs are spooled in the image forming apparatus 100, these other jobs are executed, and the printing operation is resumed. In addition, if the CPU 101 judges that the preset valid time of the authentication with respect to the job operation stored in the data storage part 107 has been exceeded from the time when the measurement of the valid time by the timer 110 is started (YES in step S513), the CPU 101 erases the user ID and password that are temporarily stored in the memory 108, and cancels the access right with respect to the reset target job issued to the operating user, before displaying the authentication information input screen shown in FIG. 11 on the operation and display part 103 so as to inquire the job authentication of the operating user (step S514). If the CPU 101 judges that the authentication is successful with respect to the authentication information that is input from the authentication information input screen shown in FIG. 11, the CPU 101 judges that the operating user can acquire the access request with respect to the reset target job (YES in step S516). In this case, the CPU 101 starts the measurement of the valid time by the timer 110 (step S517), and the CPU 101 executes the job reset to delete the corresponding printing data and the like within the data storage part 107 and the memory 108 and to cancel the reset target job that is the target of the job reset of the input instruction. If other jobs are spooled in the image forming apparatus 100, these other jobs are executed, and the printing process is resumed.

If the CPU 101 judges that the "non-erase" key shown in FIG. 16 is selected and the instruction not to execute the reset process of the target job has been input (NO in step S512) or, the CPU 101 judges that an instruction to discontinue the user authentication process has been input (YES in step S515), the CPU 101 resumes the printing process that was temporarily stopped.

Steps S501 through S509 shown in FIG. 17 carry out processes similar to those of the steps S404, S405 and S407 through S413 of the first embodiment shown in FIG. 13.

Therefore, in the image forming apparatus 100 of this second embodiment, processes such as the process to judge whether or not the image forming apparatus 100 is presently in the logged in state and the process to judge whether or not the operating user who is logged in can acquire the access right are carried out when the job reset request is received, and the printing operation is stopped only at the time when the permission is given to the operating user to carry out the job reset. Hence, it is unnecessary to stop the job that is being executed, when carrying out the authentication process for the job operation. Consequently, even in a case where it takes time to carry out the authentication process, it is possible to effectively utilize the image forming apparatus 100 without deteriorating the printing efficiency of the image forming apparatus 100.

Third Embodiment

Next, a description will be given of a third embodiment of the present invention.

In the first embodiment, after issuing the access right to the operating user as a result of the authentication process, the CPU 101 judges whether or not the preset valid time is exceeded, prior to executing the error eliminating process or the job reset process.

On the other hand, in this third embodiment, the CPU 101 does not judge whether or not the preset valid time is exceeded after issuing the access right to the operating user, and instead, executes the error eliminating process or the job reset process. A description will be given of the operation of the third embodiment of the present invention. In the following description, a description and illustration of the structure and operation of the third embodiment that are similar to those of the first or second embodiment will be omitted, unless otherwise indicated.

[User Authentication Operation Upon Generation of Error]

Figure 18:
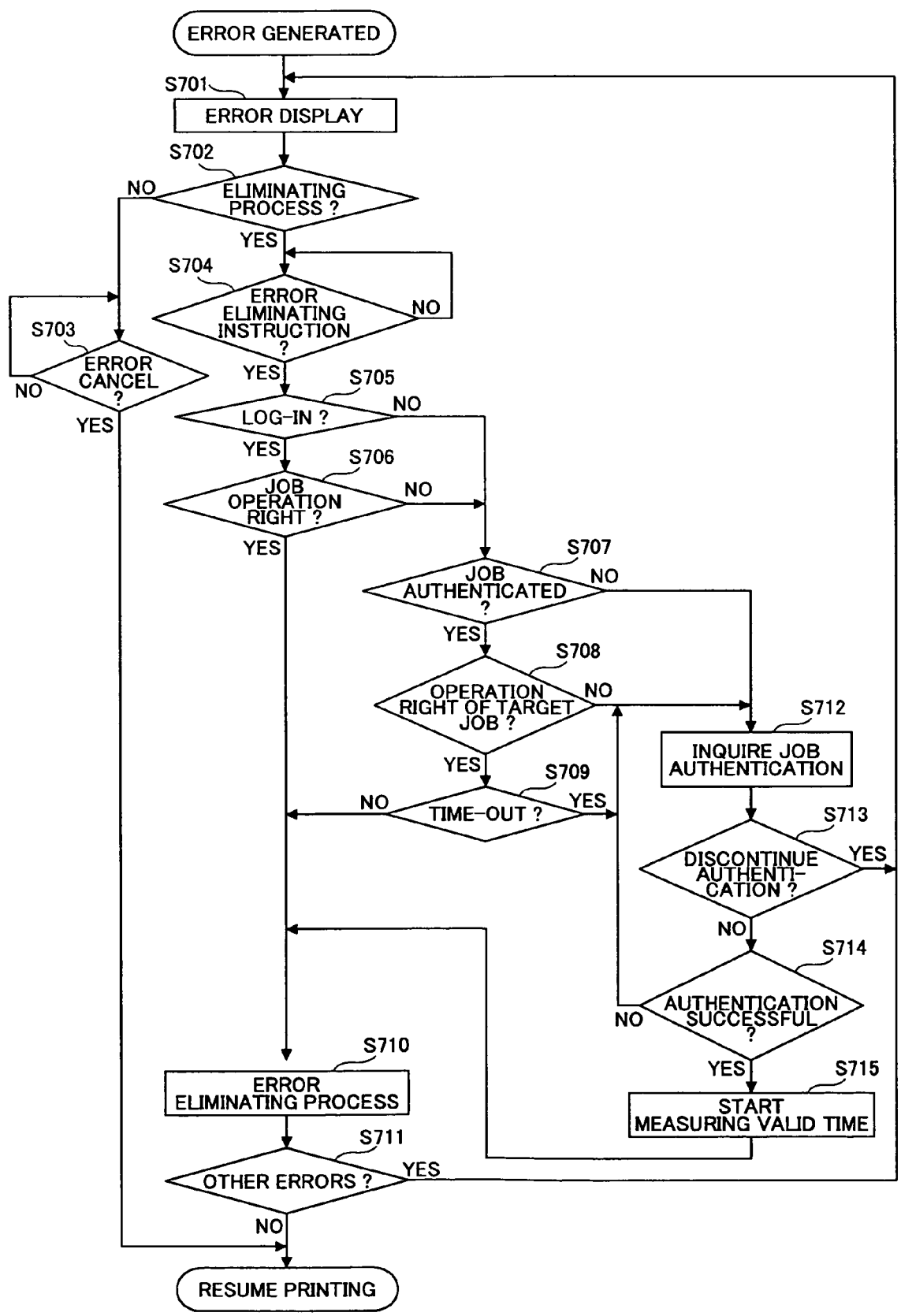
FIG. 18 is a flow chart for explaining an authentication process when an error is generated in the image forming apparatus of a third embodiment of the present invention.

First, a description will be given of an authentication operation when an error is generated in the image forming apparatus 100, by referring to FIG. 18. FIG. 18 is a flow chart for explaining the authentication process when the error is generated in the image forming apparatus 100 of the third embodiment of the present invention.

In the authentication process shown in FIG. 18 of the third embodiment when the error is generated, when the CPU 101 starts the measurement of the valid time by the timer 110 after the authentication is successful (step S715), the CPU 101 does not carry out the process of judging whether or not at the present the preset valid time has elapsed from the time when the access right is issued to the operating user, and carries out an error eliminating process (select/execute) instead (step S710). Hence, unlike the first embodiment, it is unnecessary to input the authentication information again, to thereby realize a simplified operation. Other processes of the third embodiment are similar to those of the first embodiment.

[User Authentication Operation Upon Generation of Job Reset]

Figure 19:
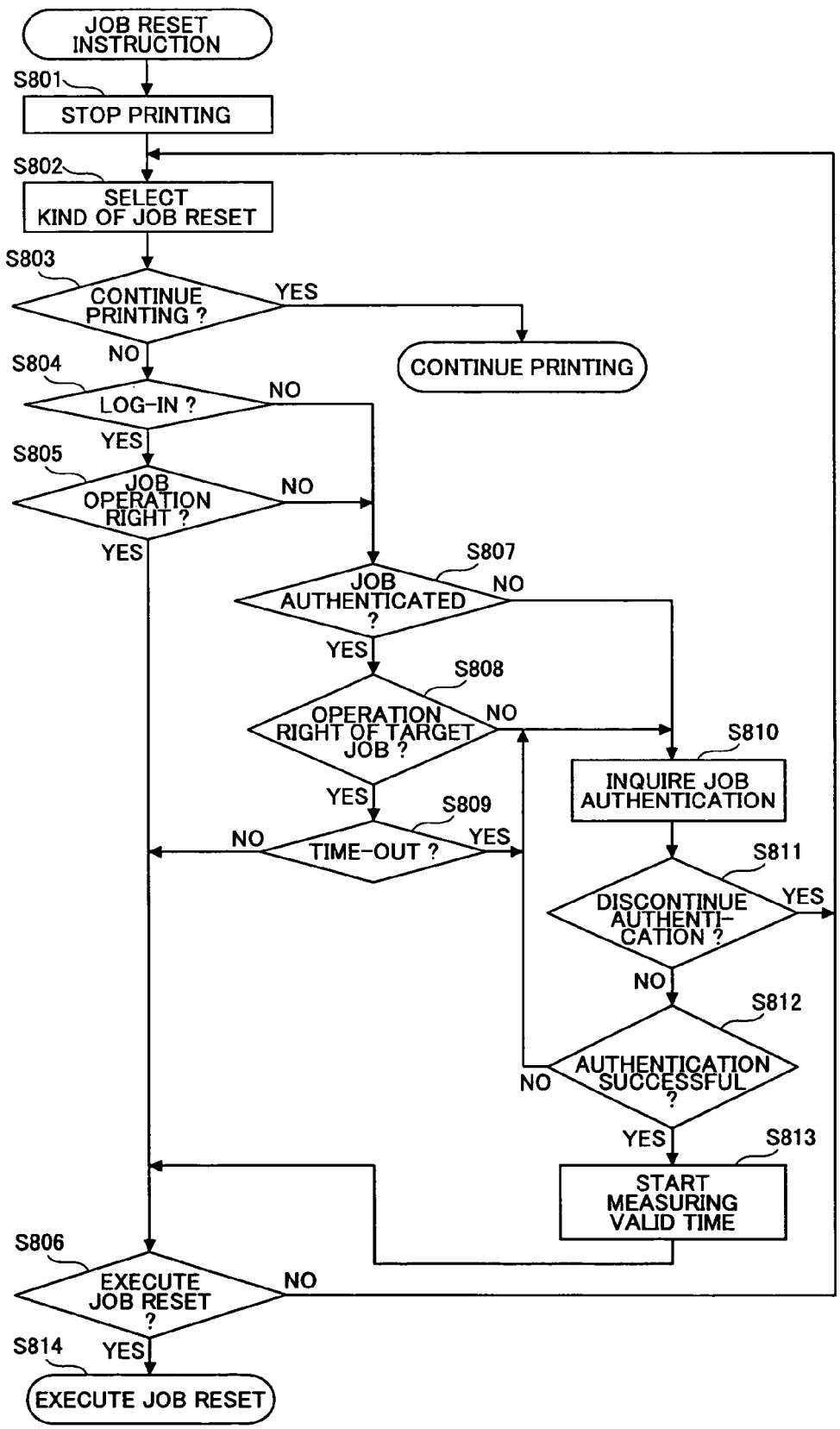
FIG. 19 is a flow chart for explaining an authentication process when a job reset is generated in the image forming apparatus of the third embodiment of the present invention.

Next, a description will be given of the authentication operation upon generation of a job reset in the image forming apparatus 100 of this third embodiment, by referring to FIG. 19. FIG. 19 is a flow chart for explaining the authentication process when the job reset is generated in the image forming apparatus 100 of the third embodiment of the present invention.

In the authentication process shown in FIG. 19 of the third embodiment when the job reset is generated, when the CPU 101 starts the measurement of the valid time by the timer 110 after the authentication is successful (step S813), the CPU 101 does not carry out the process of judging whether or not at the present the preset valid time has elapsed from the time when the access right is issued to the operating user, and carries out a job reset process instead (step S814). Hence, unlike the first embodiment, it is unnecessary to input the authentication information again, to thereby realize a simplified operation. Other processes of the third embodiment are similar to those of the first embodiment.

Therefore, according to the third embodiment, the CPU 101 does not judge whether or not the preset valid time is exceeded, until the error eliminating process or the job reset process ends after the access right is issued. For this reason, the operating user does not need to input the authentication information again even when the preset valid time is exceeded during the execution of the error eliminating process or the job reset process, to thereby realize a simple operation.

In the third embodiment, the process of judging whether or not the preset valid time is exceeded is not carried out before the job operation is completed after the access right is issued in the operation of the first embodiment. However, it is of course possible to similarly not carry out the process of judging whether or not the preset valid time is exceeded prior to the completion of the job operation after the access right is issued, in the operation of the second embodiment.

Fourth Embodiment

Next, a description will be given of a fourth embodiment of the present invention.

In the first embodiment, the CPU 101 judges whether or not the preset valid time is exceeded, after the access right is issued to the operating user as a result of the authentication, and before executing the error eliminating process or the job reset process.

On the other hand in this fourth embodiment, the error eliminating process or the job reset process is executed after the access right is issued, without judging whether or not the preset valid time is exceeded. A description will now be given of the operation of this fourth embodiment. In the following description, a description and illustration of the structure and operation of the fourth embodiment that are similar to those of the first or second embodiment will be omitted, unless otherwise indicated.

[User Authentication Operation Upon Generation of Error]

Figure 20:
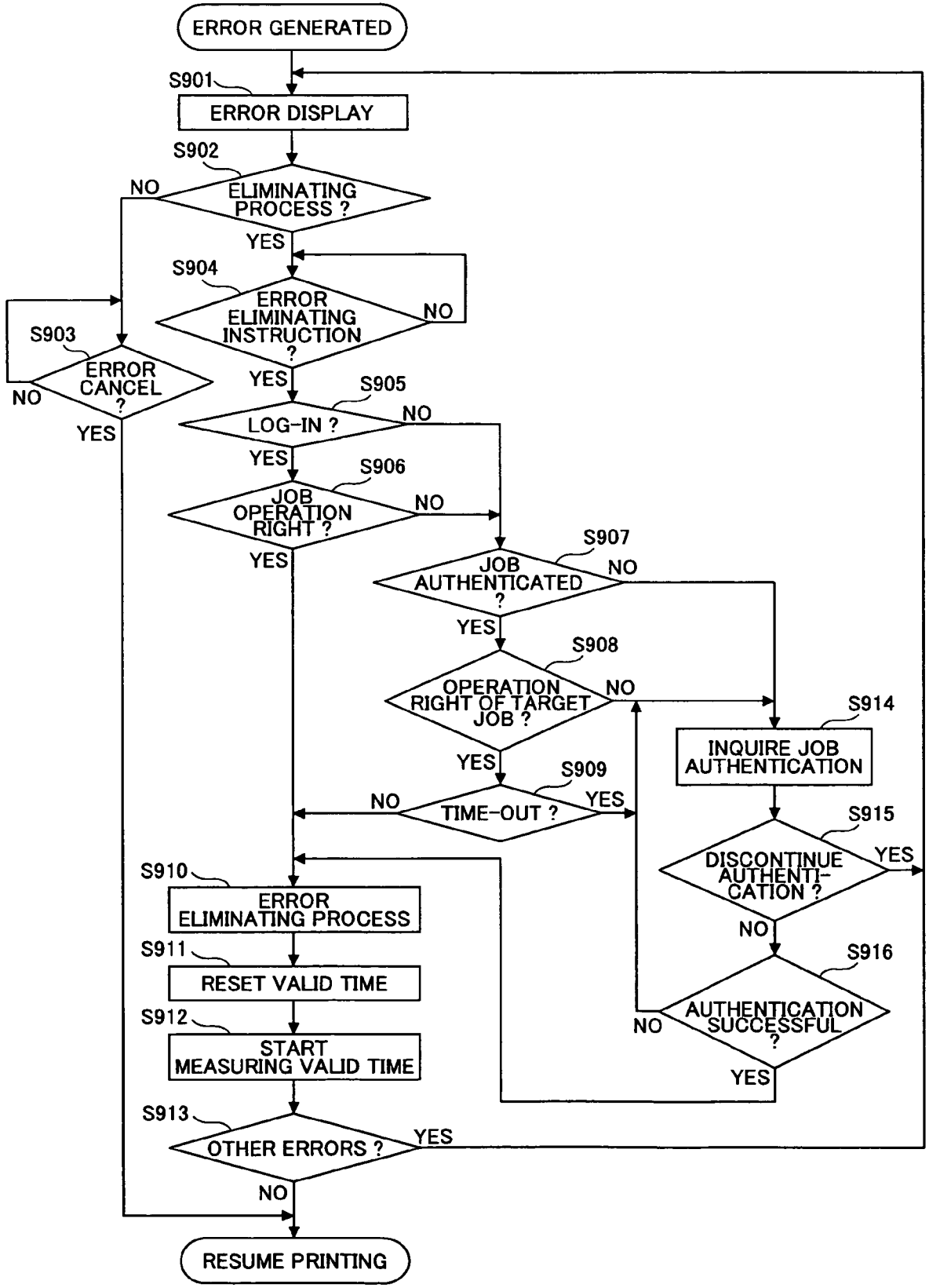
FIG. 20 is a flow chart for explaining an authentication process when an error is generated in the image forming apparatus of a fourth embodiment of the present invention.

First, a description will be given of an authentication operation when an error is generated in the image forming apparatus 100, by referring to FIG. 20. FIG. 20 is a flow chart for explaining the authentication process when the error is generated in the image forming apparatus 100 of the fourth embodiment of the present invention.

In the authentication process shown in FIG. 20 of the fourth embodiment when the error is generated, after the CPU 101 judges that the authentication is successful (YES in step S916), the CPU 101 carries out the error eliminating process (selection/execution) in a step S910. Then, after the error eliminating process is executed, the CPU 101 once resets the valid time measured by the timer 110 to zero (step S911), and again starts the measurement of the valid time by the timer 110 (step S912). Steps S901 through S906 shown in FIG. 20 carry out processes similar to those of the steps S301 through S306 shown FIG. 10, and steps S907 through S909 and S914 through S916 carry out processes similar to the steps S314 through S319 shown in FIG. 10.

[User Authentication Operation Upon Generation of Job Reset]

Figure 21:
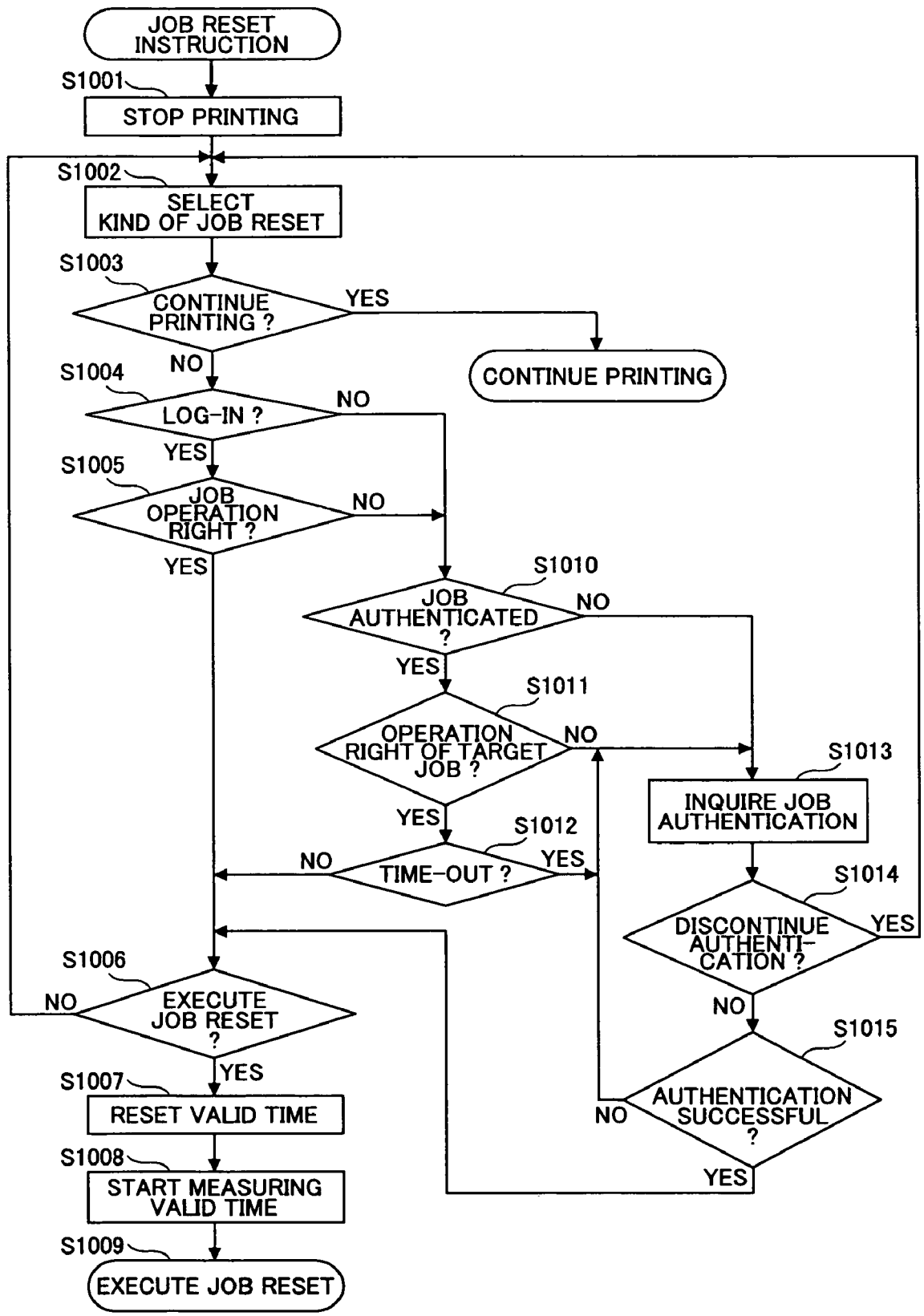
FIG. 21 is a flow chart for explaining an authentication process when a job reset is generated in the image forming apparatus of the fourth embodiment of the present invention.

Next, a description will be given of the authentication operation upon generation of a job reset in the image forming apparatus 100 of this fourth embodiment, by referring to FIG. 21. FIG. 21 is a flow chart for explaining the authentication process when the job reset is generated in the image forming apparatus 100 of the fourth embodiment of the present invention.

In the authentication process shown in FIG. 21 of the fourth embodiment when the job reset is generated, after the CPU 101 judges that the authentication is successful (YES in step S1015), if the CPU 101 recognizes the instruction to execute the job reset process (YES in step S1006), the CPU 101 once resets the valid time measured by the timer 110 to zero (step S1007), again starts the measurement of the valid time by the timer 110 (step S1008), and executes the job reset process (step S1009). Steps S1001 through S1006 shown in FIG. 21 carry out processes similar to those of the steps S401 through S406 shown in FIG. 13, and steps S1010 through S1015 carry out processes similar to those of the steps S407 through S412 shown in FIG. 13.

Therefore, according to this fourth embodiment, after executing the job operation, the CPU 101 once resets the measured valid time and again starts the measurement of the valid time. As a result, in a case where the job operation is required a plurality of times, the job operations may take time and the valid time may be exceeded, but the operating user can omit the troublesome operation of inputting the authentication information again, to thereby realize a simple operation.

In this fourth embodiment, the process of judging whether or not the valid time is exceeded is not executed after the access right is issued and before the job operation is completed in the operation of the first embodiment. However, the process of judging whether or not the valid time is exceeded may similarly be not executed after the access right is issued and before the job operation is completed, in the operation of the second or third embodiment described above.

Fifth Embodiment

Next, a description will be given of a fifth embodiment of the present invention.

In the fifth embodiment, it is assumed for the sake of convenience that when the operating user who is not yet logged in to the image forming apparatus 100 carries out the job authentication, this operating user also logs in to the image forming apparatus 100. A description will now be given of the operation of this fifth embodiment. In the following description, a description and illustration of the structure and operation of the fifth embodiment that are similar to those of the first or second embodiment will be omitted, unless otherwise indicated.

[User Authentication Operation Upon Generation of Error]

Figure 22:
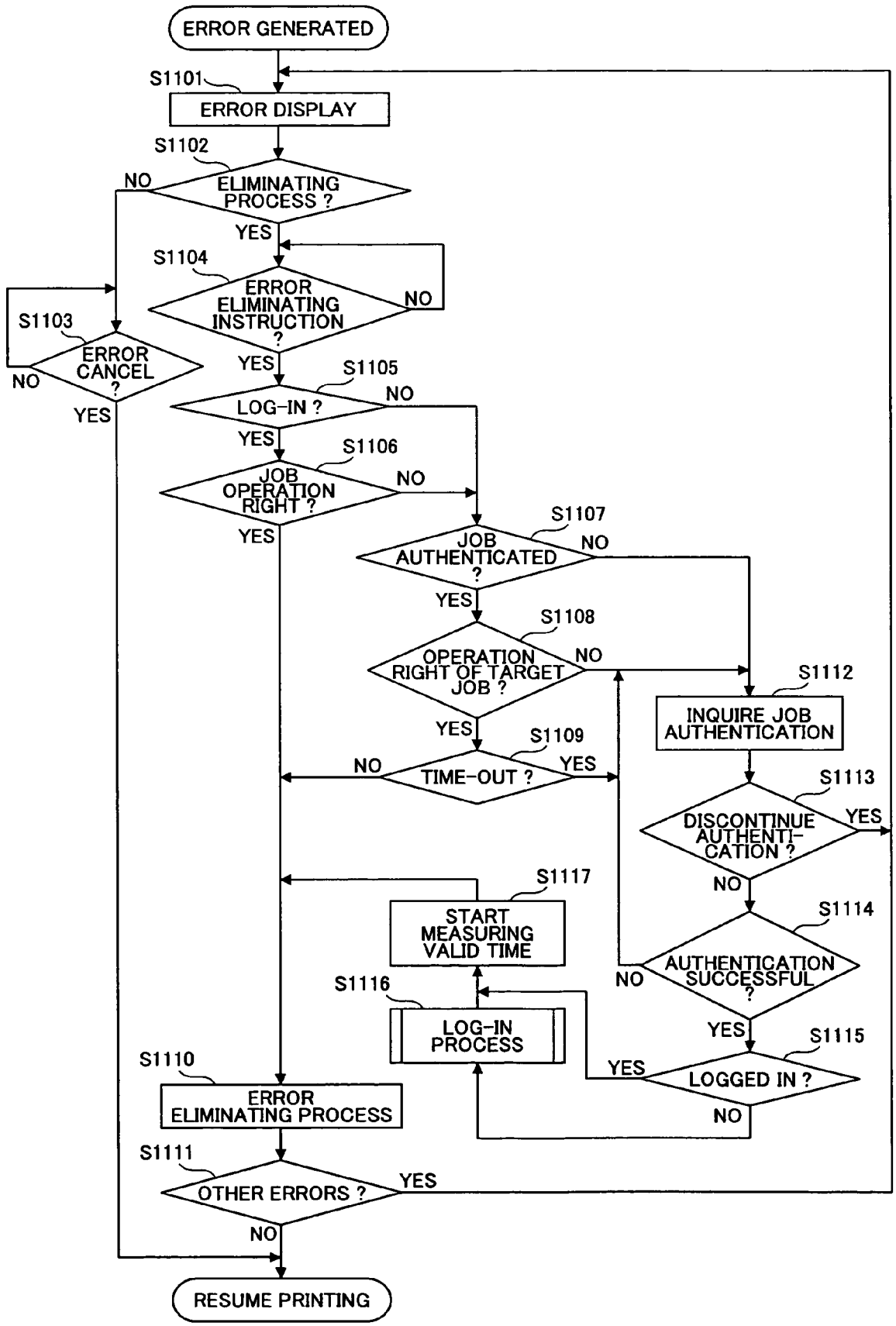
FIG. 22 is a flow chart for explaining an authentication process when an error is generated in the image forming apparatus of a fifth embodiment of the present invention.

First, a description will be given of an authentication operation when an error is generated in the image forming apparatus 100, by referring to FIG. 22. FIG. 22 is a flow chart for explaining the authentication process when the error is generated in the image forming apparatus 100 of the fifth embodiment of the present invention.

In the authentication process shown in FIG. 22 of the fifth embodiment when the error is generated, the CPU 101 carries out a job authentication based on the user ID and password that are input (S1114), and if the job authentication is successful YES in step S1114), the CPU 101 judges whether or not a user who is already logged in to the image forming apparatus 100 exists (step S1115).

If the CPU 101 judges that the user who is already logged in to the image forming apparatus 100 exists (YES in step S1115), the CPU 101 starts the measurement of the valid time by the timer 110 (Step S1117). In addition, if the CPU 101 judges that no user is yet logged in to the image forming apparatus 100 (NO in step S1115), the CPU 101 carries out a log-in process using the user ID and password for which the user authentication was successful in the step S1114 (step S1116). If the CPU 101 judges that the user ID and password for which the job authentication was successful are stored in correspondence with each other in the data storage part 107, the CPU 101 enables the operating user to log in to the image forming apparatus 100. Other processes are similar to those of the first embodiment, and a description thereof will be omitted.

[User Authentication Operation Upon Generation of Job Reset]

Figure 23:
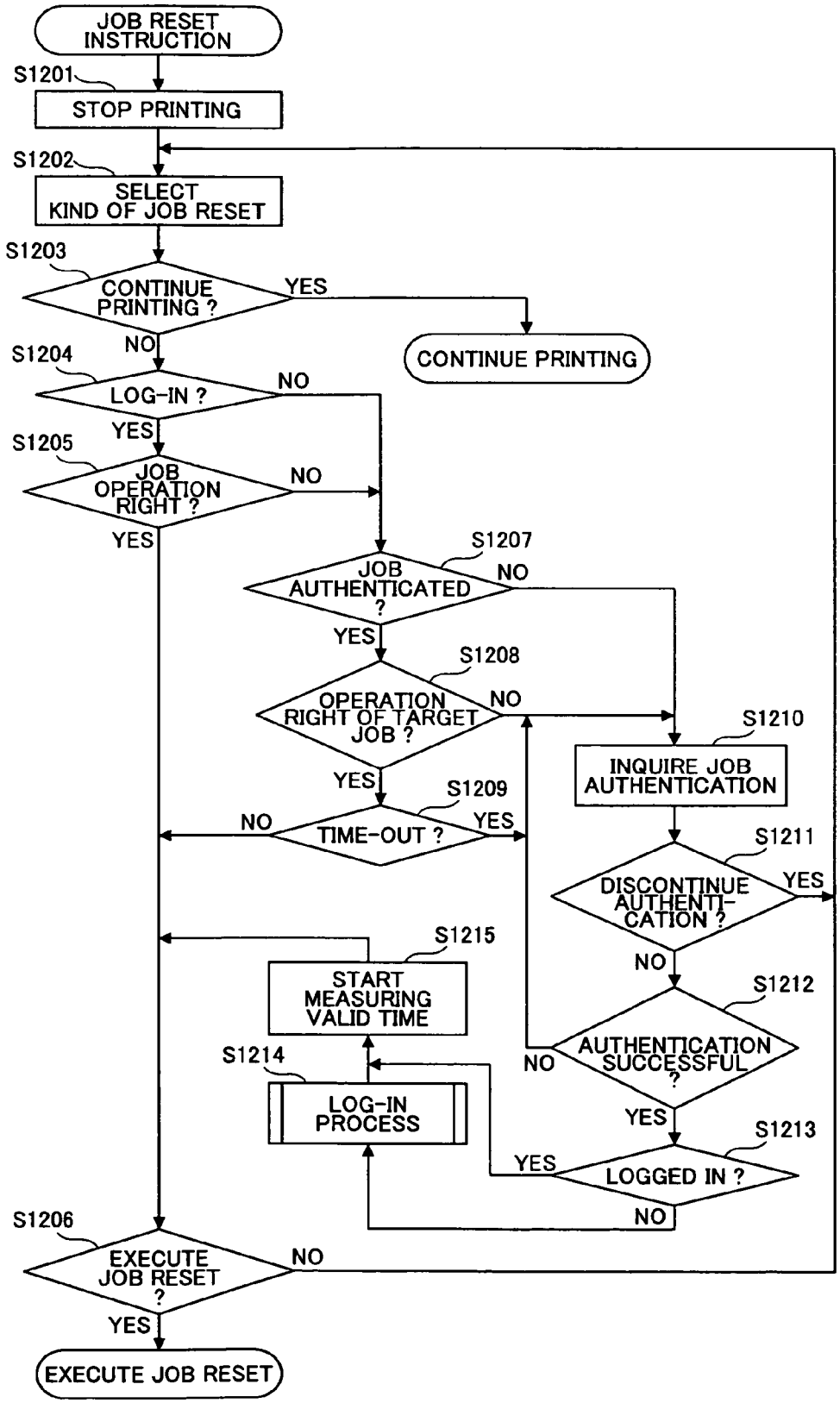
FIG. 23 is a flow chart for explaining an authentication process when the error is generated in the image forming apparatus of the fifth embodiment of the present invention.

Next, a description will be given of the authentication operation upon generation of a job reset in the image forming apparatus 100 of this fifth embodiment, by referring to FIG. 23. FIG. 23 is a flow chart for explaining the authentication process when the job reset is generated in the image forming apparatus 100 of the fifth embodiment of the present invention.

In the authentication process shown in FIG. 23 of the fifth embodiment when the job reset is generated, the CPU 101 carries out a job authentication based on the user ID and password that are input (step S1212), and if the job authentication is successful (YES in step S1212), the CPU 101 judges whether or not a user who is already logged in to the image forming apparatus 100 exists (step S1213).

If the CPU 101 judges that the user who is already logged in to the image forming apparatus 100 exists (YES in step S1213), the CPU 101 starts measurement of the valid time by the timer 110 (step S1215). In addition, if the CPU 101 judges that no user is yet logged in to the image forming apparatus 100 (NO in step S1213), the CPU 101 carries out the log-in process using the user ID and password for which the user authentication was successful in the step S1212 (step S1214). If the CPU 101 judges that the user ID and password for which the job authentication was successful are stored in correspondence with each other in the data storage part 107, the CPU 101 enables the operating user to log in to the image forming apparatus 100. Other processes are similar to those of the first embodiment, and a description thereof will be omitted.

Therefore, according to this fifth embodiment, if it is judged that the job authentication based on the authentication information input from the operation and display part 103 is successful, the image forming apparatus 100 automatically executes the log-in process with respect to the user for whom the job authentication was successful. As a result, even in a case where the image forming apparatus 100 consecutively carries out the jobs of the same user, for example, the operating user can omit the troublesome operation of inputting the authentication information again for the log-in and job authentication, to thereby realize a simple operation.

In this fifth embodiment, the log-in process is executed after issuing the access right in the operation of the first embodiment. However, the log-in process may be similarly executed after issuing the access right in the operation of any of the second through fourth embodiments described above.

Sixth Embodiment

Next, a description will be given of a sixth embodiment of the present invention.

Figure 24:
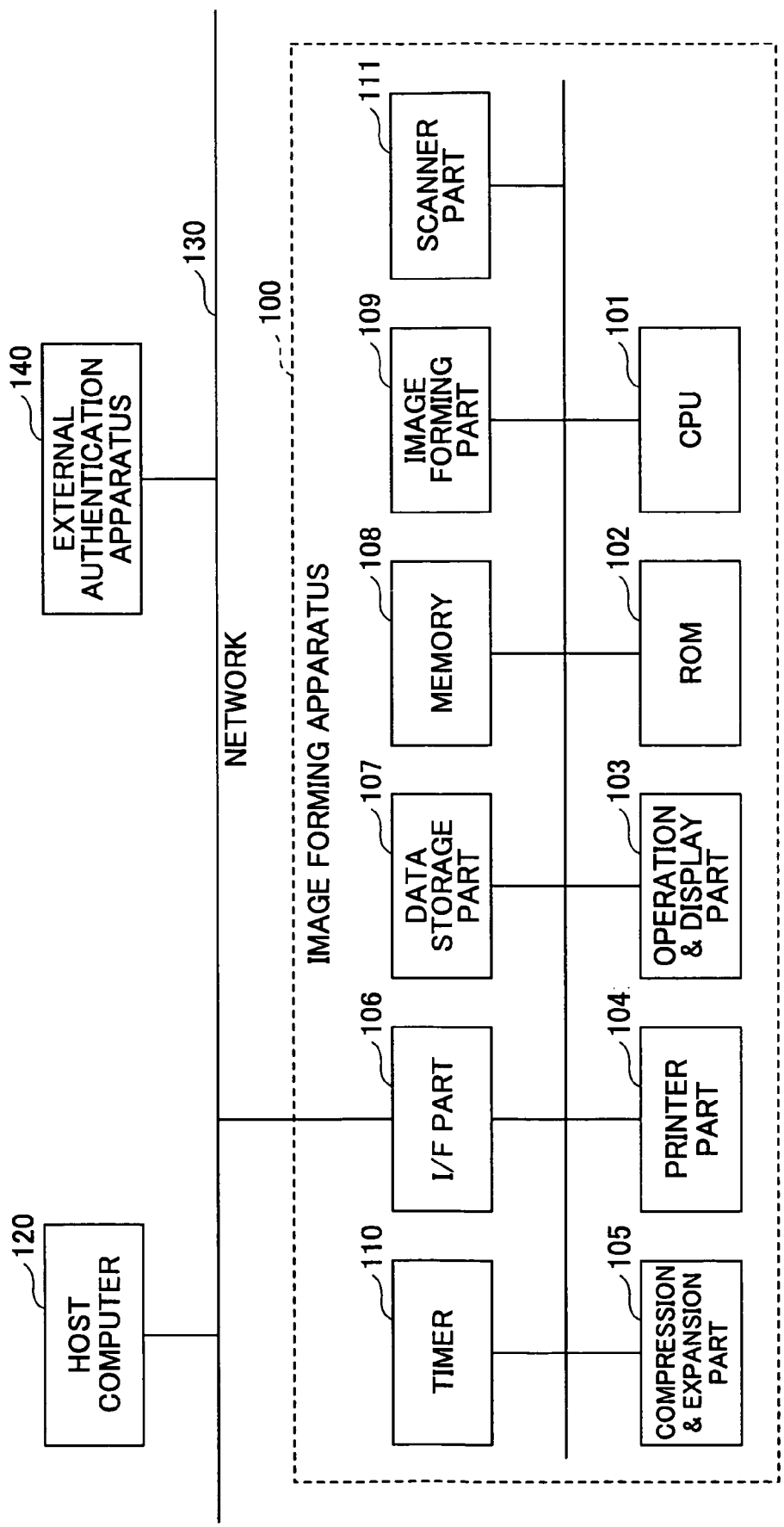
FIG. 24 is a system block diagram showing a sixth embodiment of the information processing system according to the present invention.

FIG. 24 is a system block diagram showing the sixth embodiment of the information processing system according to the present invention. In FIG. 24, those parts which are the same as those corresponding parts in FIG. 2 are designated by the same reference numerals, and a description thereof will be omitted. The image processing system shown in FIG. 24 is provided with an external authentication apparatus 140 in addition to the constituent elements of the first through fifth embodiments of the present invention described above.

The external authentication apparatus 140 is formed by an information processing apparatus, such as a personal computer, that is connected to the network 130. The external authentication apparatus 140 stores the user management information that is stored in the data storage part 107 of the image forming apparatus 100 of the embodiments described above.

First, at the time of the job authentication, when the user ID and password of the operating user are input from the operation and display part 103, the I/F part 106 transmits to the external authentication apparatus 140 the user ID and password of the operating user that are input, and the user ID of the execution instructing user who instructed execution of the job for which the operating user is requesting the job operation.

When the external authentication apparatus 140 receives the user ID and password of the operating user and the user ID of the execution instructing user, the external authentication apparatus 140 judges whether or not the user ID and password of the operating user are stored in correspondence with the user ID of the execution instructing user in the user management information that is stored within the image forming apparatus 100. If the external authentication apparatus 140 judges that the user ID and password of the operating user are stored in correspondence with the user ID of the execution instructing user in the user management information, the external authentication apparatus 140 transmits information indicating that the authentication was successful to the image forming apparatus 100. On the other hand, if the external authentication apparatus 140 judges that the user ID and password of the operating user are not stored in correspondence with the user ID of the execution instructing user in the user management information, the external authentication apparatus 140 transmits information indicating that the authentication was unsuccessful to the image forming apparatus 100.

The image forming apparatus 100 judges whether or not the authentication result indicates that the authentication was successful, when the information indicating the authentication result is received from the external authentication apparatus 140. If the authentication result (or authentication information) indicates that the authentication was successful, the image forming apparatus 100 starts measurement of the valid time by the timer 110. On the other hand, if the authentication result indicates that the authentication was unsuccessful, the image forming apparatus 100 requests the operating user to again input the user ID and password. Other processes of this sixth embodiment are similar to those of the first through fifth embodiments described above, and a description thereof will be omitted.

In the first through fifth embodiments, the image forming apparatus 100 stores the user management information and carries out the job authentication. On the other hand, in this sixth embodiment, the external authentication apparatus 140 stores the user management information and carries out the job authentication, and transmits the authentication result to the image forming apparatus 100. Accordingly, the image forming apparatus 100 of this sixth embodiment does not need to store the information for the authentication, and the required storage region of the image forming apparatus 100 can be reduced.

Seventh Embodiment

Next, a description will be given of a seventh embodiment of the present invention. In this seventh embodiment, an equipment manager may make a setting so that it is unnecessary to carry out an authentication related to the job operation that is being executed. Accordingly, when an error is generated during execution of a job and the image forming apparatus 100 stops, it is possible to prevent the image forming apparatus 100 from becoming non-usable during a time when the person having the right to make an operation with respect to the target job is not present. The operation with respect to the target job in this case includes only the operation related to the target job for the purposes of carrying out the job reset process or the error eliminating process, such as canceling a function, making forced printing, changing number of prints to be made, specifying stapling, specifying punching and the like. The job for which a person has no access right includes jobs and the like of other people.

In this seventh embodiment, when the printing data is received via the I/F part 106, the image forming part 109 analyzes the printing data and forms the image data, similarly to the embodiments described above. The authentication information added to the printing data is extracted and subjected to the user authentication based on the user management information (FIGS. 3 and 8) stored in the data storage part 107 or, in the external authentication apparatus 140 that is connected via the network 130, so that the printing process is carried out with respect to the printing information of the user who has the right of use. The printing information may have a structure similar to that of the job shown in FIG. 4 described above.

Figure 28:
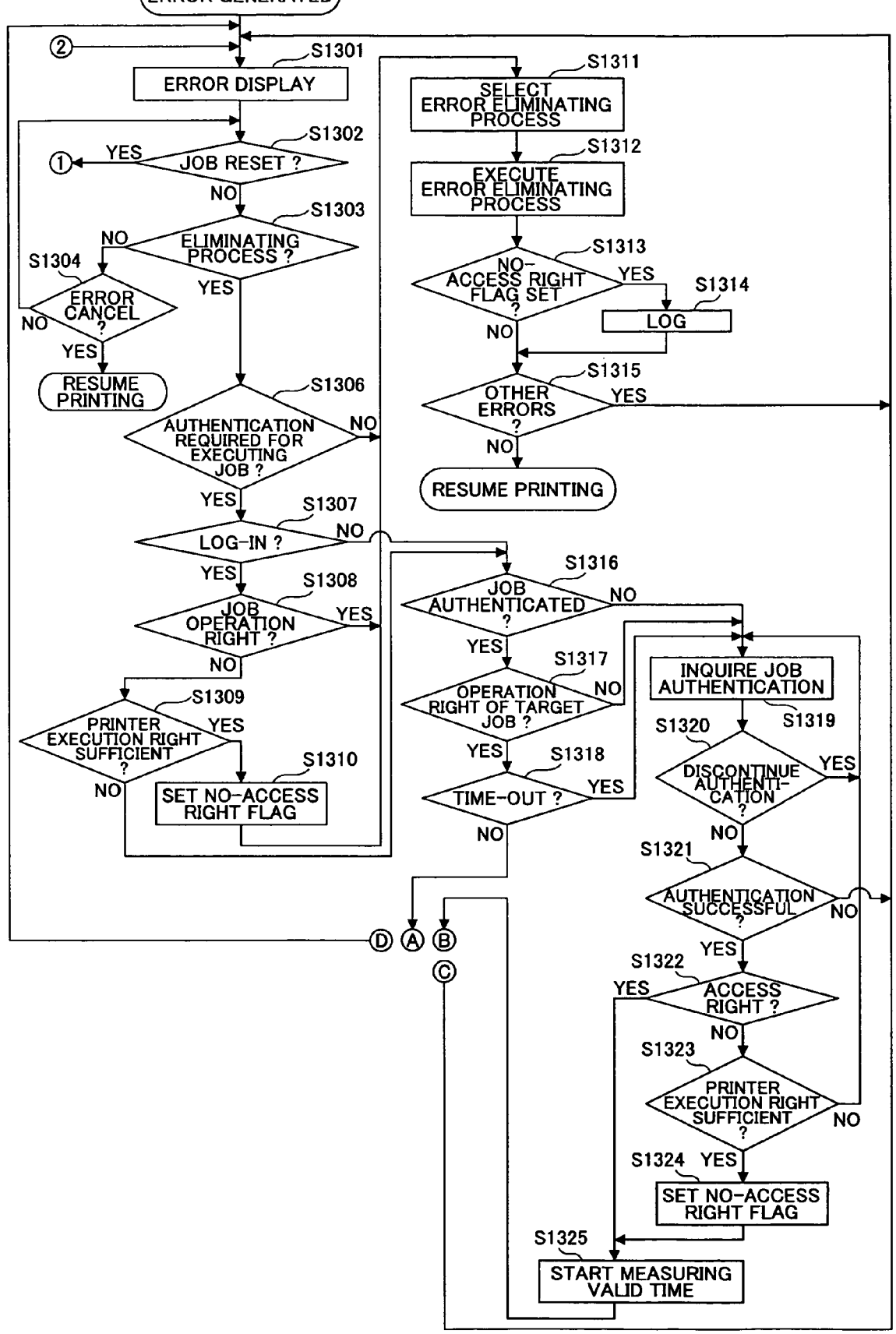
FIG. 28 is a flow chart for explaining an authentication process when an error is generated in the image forming apparatus of the seventh embodiment of the present invention.
Figure 29:
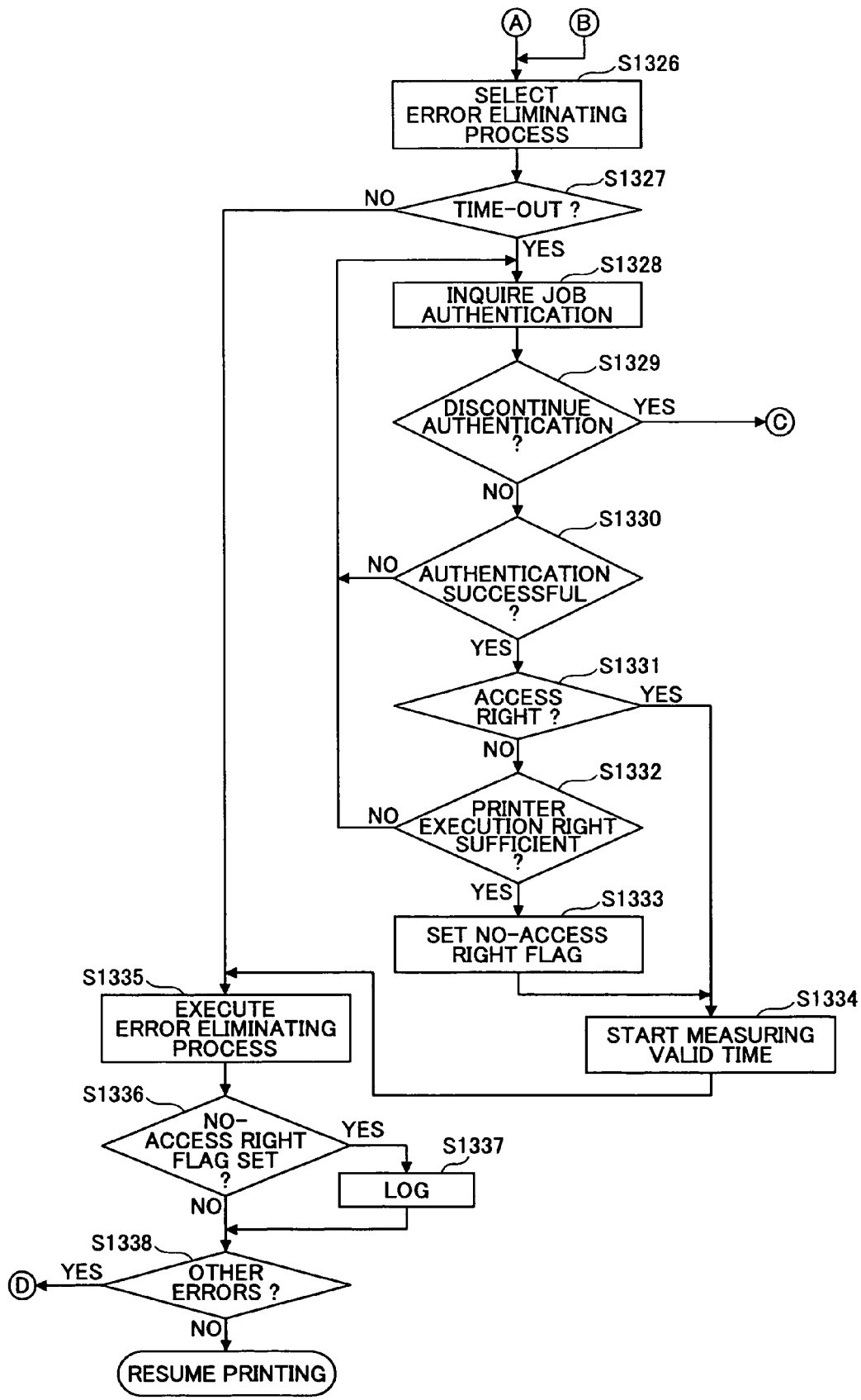
FIG. 29 is a flow chart for explaining the authentication process when the error is generated in the image forming apparatus of the seventh embodiment of the present invention.
Figure 30:
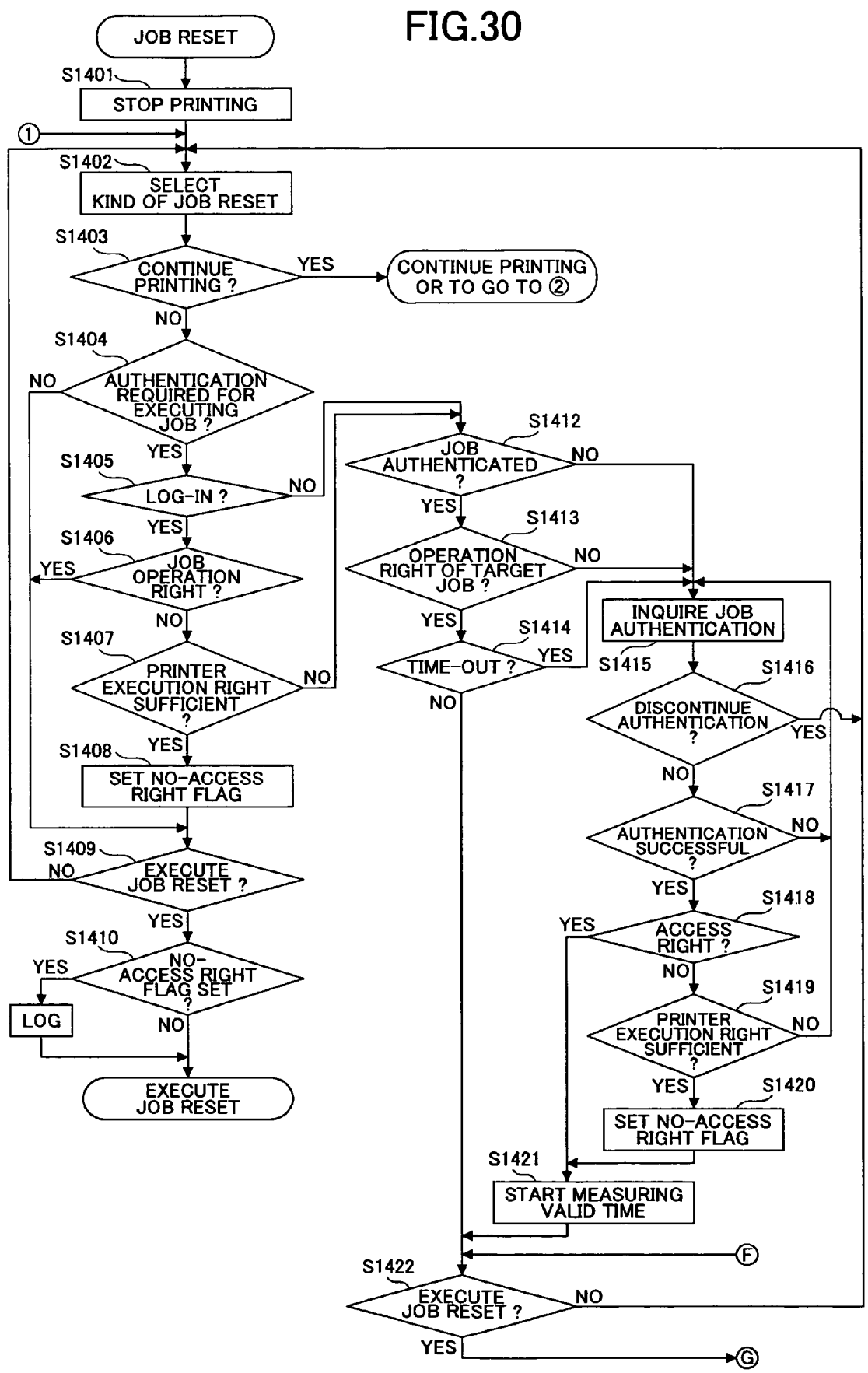
FIG. 30 is a flow chart for explaining the authentication process when a job reset is generated in the image forming apparatus of the seventh embodiment of the present invention.
Figure 31:
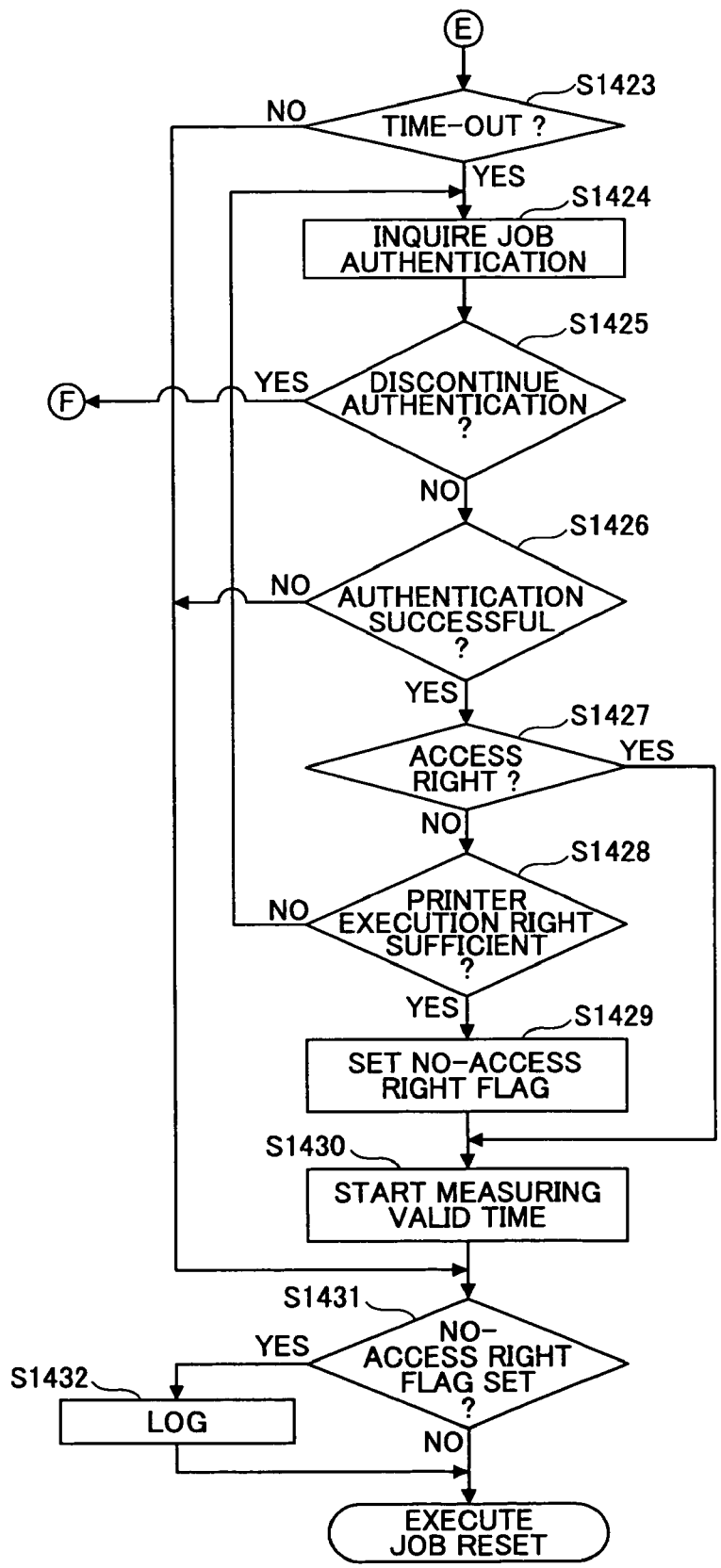
FIG. 31 is a flow chart for explaining the authentication process when the job reset is generated in the image forming apparatus of the seventh embodiment of the present invention.

Next, a description will be given of the operation of this seventh embodiment of the present invention. FIGS. 28 and 29 are flow charts for explaining an authentication process when an error is generated in the image forming apparatus 100 of the seventh embodiment of the present invention, and FIGS. 30 and 31 are flow charts for explaining an authentication process when a job reset is generated in the image forming apparatus 100 of the seventh embodiment of the present invention. When the error is generated in the image forming apparatus 100, an error display screen is displayed on the operation and display part 103 (step S1301). FIGS. 26 and 27 are diagrams showing the error display screen. FIG. 26 shows the display screen for a case where the kinds of paper of paper supply trays specified in the seventh embodiment of the present invention differ, and FIG. 27 shows the display screen for a case where no staple needles exist in the seventh embodiment of the present invention.

In this state, when the "job reset" key is selected when the error is generated, this is judged by a step S1302 shown in FIG. 28 and the process advances to a step S1402 shown in FIG. 30. The operation at the time of the job reset will be described later in conjunction with FIGS. 30 and 31.

The error, such as a paper jam, having a cause that can be eliminated even by a person not having the access right to the job, will hereinafter be referred to as an error having an error eliminating solution. Such an error having the error eliminating solution is judged in a step S1303 shown in FIG. 28, and the execution of the error eliminating solution is waited. When the error eliminating solution is executed, the printing process is resumed from a step S1304.

When an error eliminating solution by an operation is selected (YES in step S1303), the item selected as the error eliminating solution is collated with the authentication check level related to the job operation shown in FIG. 25, included in the apparatus settings shown in FIG. 3 that are stored in the data storage part 107, so as to judge the check level. FIG. 25 is a diagram showing a table that stores the authentication check levels related to the job operation in progress. In FIG. 25, the authentication check level "1" indicates the job authentication, the authentication check level "2" indicates the right to use the apparatus, and the authentication check level "3" indicates no authentication.

The authentication check level information shown in FIG. 25 may be preset by the equipment manager using the operation and display part 103 shown in FIG. 2. For the sake of convenience, a description will be given for a case where the forced printing function is selected, but the process may be similarly carried out for other error eliminating processes.

If the authentication check level is "3" (no authentication) for the forced printing, it is judged that the job authentication is unnecessary during execution (NO in step S1306), and the error eliminating process is selected (step S1311) by selecting the tray for use by the error eliminating process in this particular case, and the error eliminating process is executed (step S1312) so as to execute the forced printing in this particular case.

If it is judged that some kind of authentication is required (authentication check level "1" or "2") with respect to the job that is being executed (YES in step S1306), a judgement is made to determine whether or not the image forming apparatus 100 is in the logged in state (S1307). If the image forming apparatus 100 is in the logged in state (YES in step S1307), a judgement is made to determine whether or not the user who is logged in to the image forming apparatus 100 has the operation right to carry out an operation with respect to the target job (step S1306).

If the user has the operation right (YES in step S1306), the process advances to a step S1311 and the error eliminating process is carried out. If the user who is logged in to the image forming apparatus 100 does not have the operation right with respect to the target job (NO in step S1308), a judgement is made based on the table shown in FIG. 25 to determine whether or not the setting is such that the error eliminating process can be carried out solely by the execution right with respect to the image forming apparatus 100 (step S1309).

The judgement made in the step S1309 also uses information indicating whether or not the user who is logged in has the execution right with respect to the printer. The judgement result in the step S1309 becomes NO if the user who is logged in does not have the execution right with respect to the printer. The execution range of each user may be obtained by referring to the user management information shown in FIG. 7 which may be provided in the form of an address directory table.

If the error eliminating process can be carried out solely by the execution right with respect to the image forming apparatus 100 (YES in step S1309), a no-access right flag is set (step S1310), and the error eliminating process is selected (step S1311). The error eliminating process is as described above. However, if the no-access right flag is set (that is, turned ON), this is detected by a step S1313 and a log of the access is recorded. When the log is recorded, it is possible to notify the job owner that the function was cancelled by a user having no access right.

If an error other than the eliminated error exists (YES in step. S1315), the next error display screen is displayed (step S1301). The printing process is resumed when the error no longer exists.

In a case where there is no user who is logged in to the image forming apparatus 100 or an authentication is required to carry out the job operation (operation with respect to the target job, the process advances to a step S1316. The step S1316 judges whether or not the authentication has been made with respect to the job operation. If the authentication has been made with respect to the job operation (YES in step S1316), a judgement is made to determine whether or not the authentication information includes the operation right with respect to the target job (step S1317).

If the authentication information includes the operation right with respect to the target job (YES in step S1317), a judgement is made to determine whether or not the preset valid time is exceeded (step S1318). If the authentication is valid (YES in step S1318), the error eliminating process is selected (FIG. 29, step S1326).

If the authentication is invalid, the authentication information input screen shown in FIG. 11 is displayed on the operation and display part 103 (step S1319). If the "discontinue (or cancel)" key is selected on the authentication information input screen in this state or, the "discontinue (or cancel)" key is selected while displaying the input authentication information on the authentication information input screen, the judgement result in the step S1320 becomes YES, and the error display screen is displayed again (step S1301).

If the authentication is unsuccessful (NO in step S1321), the authentication information input screen is displayed again (step S1319). If the authentication is successful (YES in step S1321), a judgement is made to determine whether or not the user has the operation right with respect to the target job (step S1322). If the user has the operation right with respect to the target job (YES in step S1322), the measurement of the valid time of the authentication is started (step S1325), and the error eliminating process is selected (FIG. 29, step S1326). If the user does not have the operation right with respect to the target job (NO in step S1322), a judgement is made to determine whether or not the setting is such that the job operation can be carried out solely by the execution right with respect to the image forming apparatus 100 (step S1323).

If the job operation can be carried out solely by the execution right with respect to the image forming apparatus 100 (YES in step S1323), the no-access right flag is set (step S1324), the measurement of the valid time of the authentication is started (step S1325), and the error eliminating process is selected (FIG. 29, step S1326).

If it is judged that the job operation cannot be carried out solely by the execution right with respect to the image forming apparatus 100 (NO in step S1323), the authentication information input screen is displayed again (step S1319). When the error eliminating process is selected (FIG. 29, step S1326), the valid time of the authentication is checked (FIG. 29, step S1327), and the reacquisition of the authentication is requested if necessary (FIG. 29, steps S1328 through step S1334). The processes carried out by these steps S1328 through S1334 are similar to those of the steps S1319 through S1325.

The series of processes carried out after executing the error eliminating process (steps S1335 through step S1338) are similar to the processes of the steps S1312 through S1315.

FIGS. 31 and 32 are flow charts for explaining the authentication process when the job reset is generated in the image forming apparatus 100 of the seventh embodiment of the present invention. When the "job reset" key is selected on the screen shown in FIG. 14 during the printing process, the printing process is stopped (FIG. 30, step S1401), and the job reset selection screen shown in FIG. 15 is displayed (step S1402).

If the "job reset" key is selected on the display screen shown in FIG. 26 when the error is generated, the process advances from the step S1302 shown in FIG. 28 to the step S1402 shown in FIG. 30, so as to display the job reset selection screen.

When the "printing continue" key is selected on the job reset selection screen (YES in step S1403), the printing process is continued or the error display screen is displayed (FIG. 28, step S1301). If the "job reset" key is selected on the job reset selection screen (NO in step S1403), a judgement is made to determine, based on the table shown in FIG. 25, whether or not the job authentication is required for the job being executed (step S1404).

If no job authentication is required (NO in step S1404), the job reset confirmation screen is displayed (step S1409). On the other hand, if the job authentication is required (YES in step S1404), a judgement is made to determine whether or not the image forming apparatus 100 is in the logged in state (step S1405). If the image forming apparatus 100 is in the logged in state (YES in step S1405), a judgement is made to determine whether or not the user who is logged in has the execution right with respect to the target job (step S1406). If the user who is logged in has the execution right with respect to the target job (YES in step S1406), the job reset confirmation screen is displayed (step S1409).

If the use who is logged in does not have the execution right with respect to the target job (NO in step S1406), a judgement is made to determine whether or not the error eliminating process can be carried out solely by the execution right with respect to the image forming apparatus 100 (step S1407). If the error eliminating process can be carried out solely by the execution right with respect to the image forming apparatus 100 (YES in step S1407), the no-access right flag is set (step S1408), and the job reset confirmation screen is displayed (step S1409).

The processes of the steps S1404 through S1408 are similar to those of the steps S1303 through 1310 shown in FIG. 28. When the "execute" key is selected on the job reset confirmation screen (YES in step S1409), the no-access right flag is checked (step S1410). If the no-access right flag is set (YES in step S1410), the log of the access related to the process is recorded (step S1411), and the job reset process is carried-out.

The processes of recording of the log and making the notification with respect to the job owner may be carried out similarly to the steps S1313 and S1314 shown in FIG. 28.

If the image forming apparatus 100 is not in the logged in state or, the user who is logged in does not have the execution right with respect to the target job, a step S1412 checks whether or not the job authentication is obtained. The processes of steps S1412 through S1432 shown in FIGS. 30 and 31 that are carried out thereafter are similar to those of the steps S1316 through S1337 shown in FIGS. 28 and 29, and a description thereof will be omitted.

Therefore, according to this seventh embodiment, when an error is generated during execution of a job from a user and the image forming apparatus 100 stops, it is possible to prevent the image forming apparatus 100 from becoming non-usable during a time when the user having the right to make an operation with respect to the target job is not present, by enabling the error to be eliminated by a user having no right to make the operation with respect to the target job. As a result, it is possible to reduce the down time of the image forming apparatus 100. In addition, by requiring the job authentication only when the printing process of the image forming apparatus 100 is started, it is possible to place priority on the operability of the job operation that is being executed and to reduce the load of the operation for the user wishing to omit the authentication.

In addition, by making the authentication unnecessary only for the job reset, it is possible to reduce the operations required for the job reset. Moreover, since the job reset can also be made with respect to the job in which the error is generated, it is possible to reduce the down time of the image forming apparatus 100 by enabling the job that is the cause of the error to be cancelled even when the user who instructed the job is not present in a state where the image forming apparatus 100 is stopped by the error generated by the job.

In the state where the image forming apparatus 100 is stopped by the error generated by the job that is being executed under the instruction of the user, the error eliminating process with respect to the job can be carried out even when the user is not present, so that the down time of the image forming apparatus 100 is reduced and prints can be obtained. Furthermore, by restricting the job reset to only while the error is generated, it is possible to prevent the job from being cancelled by a random (intentional or unintentional) job reset. It is also possible to prevent the job operation from being carried out by a third person who does not have the right to use the image forming apparatus 100. It is possible to suppress tampering by a third person since the log of the operation can be recorded.

It is possible to know that some kind of operation is made at the image forming apparatus 100 where the print instruction was made, and it is possible to carry out an efficient printing by starting a reprinting or the like if necessary, for example. The operation with respect to the job having the public attribute can be protected from the user having no right to use the image forming apparatus 100, and it is possible to limit the operation to that which cannot be carried out immediately by a person having the operation right with respect to the job, so as to suppress unlimited operation. Hence, it is possible to suppress the random operation by limiting the operation to that which cannot be carried out immediately by a person having the operation right with respect to the job.

In each of the embodiments described above, the image forming apparatus 100 develops the job received from the host computer 120 in the memory 108, and carries out the process such as printing without storing the job within the image forming apparatus 100. However, it is possible to temporarily store the job received from the host computer 120 within the image forming apparatus 100, and thereafter carry out the process such as printing with respect to the stored job.

The various processes and operations of each of the embodiments described above may be carried out by executing one or more computer programs stored in the image forming apparatus 100, the host computer 120 or the external authentication apparatus 140. The computer program may be stored in a computer-readable storage medium such as an optical recording medium, a magnetic recording medium, a magneto-optical recording medium or a semiconductor memory, and loaded into the respective apparatus from the computer-readable storage medium. The computer program may also be loaded into the respective apparatus from an external equipment via the network 130 or the like.

Further, the present invention is not limited to these embodiments, but various variations and modifications may be made without departing from the scope of the present invention.

What is claimed is:

1. An image forming apparatus comprising:
   an authentication information input part configured to input job authentication information for permitting a first operation with respect to a registered printing job;
   a log-in authentication information input part configured to input log-in authentication information for permitting a second operation from an operation part; and
   a control part configured to permit the first operation with respect to the printing job if the log-in authentication information input from the log-in authentication information input part and information related to the printing job agree with each other, and to request input of the job authentication information if the log-in authentication information and the information related to the printing job do not agree with each other, to thereby permit the first operation with respect to the printing job if the job authentication information input from the authentication information input part and the information related to the printing job agree with each other.

2. The image forming apparatus as claimed in claim 1, wherein the printing job may or may not be added with right information for determining whether or not to permit the first operation with respect to the printing job, and the control part permits the first operation with respect to the printing job based on the right information when the right information is added to the printing job.

3. The image forming apparatus as claimed in claim 2, further comprising:
   an image forming part configured to form an image of the printing job; and
   a determining part configured to determine whether or not to form an image by the image forming part with respect to a printing job not added with the right information,
   wherein the control part controls the image forming part to form the image with respect to the printing job that is not added with the right information if the determining part determines that the image is to be formed by the image forming part.

4. The image forming apparatus as claimed in claim 1, wherein the control part permits the first operation with respect to the printing job if the job authentication information agrees with the information related to the printing job and no log-in authentication information has been input which agrees with the information related to the printing job, and sets the image forming apparatus into a logged in state using the job authentication information as the log-in authentication information.

5. The image forming apparatus as claimed in claim 1, wherein the control part does not request input of the job authentication information if the second operation from the operation part is input after job authentication information is input by the authentication information input part which agrees with the information related to the printing job.

6. The image forming apparatus as claimed in claim 1, wherein the control part does not request input of the job authentication information if the second operation from the operation part is input at a valid time that is within a preset valid time after job authentication information is input by the authentication information input part which agrees with the information related to the printing job.

7. The image forming apparatus as claimed in claim 6, wherein the valid time is measured from a time when the job authentication information agrees with the information related to the printing job.

8. The image forming apparatus as claimed in claim 6, wherein the valid time is measured every time the second operation from the operation part is input after the the job authentication information agrees with the information related to the printing job.

9. The image forming apparatus as claimed in claim 6, wherein the control part does not request input of the job authentication information and permits the first operation with respect to a plurality of consecutive printing jobs, the first operation of which is permissible by the control part if the job authentication information agrees with the information related to the printing job, if the second operation from the operation part is input at the valid time that is within the preset valid time after job authentication information is input by the authentication information input part which agrees with the information related to the printing job.

10. The image forming apparatus as claimed in claim 6, wherein the control part does not request input of the job authentication information and permits the first operation with respect to a plurality of consecutive printing jobs, the first operation of which is permissible by the control part if the job authentication information agrees with the information related to the printing job, even when a printing job, the first operation of which is not permissible by the control part if the job authentication information agrees with the information related to the printing job, is interposed between the printing jobs, if the second operation from the operation part is input at the valid time that is within the preset valid time after job authentication information is input by the authentication information input part which agrees with the information related to the printing job.

11. The image forming apparatus as claimed in claim 1, further comprising:
   a managing part configured to manage information for certifying agreement of the job authentication information input by the authentication information input part with the information related to the printing job,
   wherein the control part certifies the agreement based on the information managed by the managing part.

12. The image forming apparatus as claimed in claim 1, further comprising:
   a transmitting part configured to transmit a request for input of the job authentication information by the authentication information input part to an authentication apparatus via a communication network; and
   a receiving part configured to receive an authentication result of the job authentication information from the authentication apparatus,
   wherein the control part certifies the agreement of the job authentication information with the information related to the printing job based on the authentication result of the job authentication information received by the receiving part.

13. The image forming apparatus as claimed in claim 1, wherein the control part requires no agreement with respect to a job operation that is being executed by an operation executing part, in response to an external setting that is made in advance.

14. The image forming apparatus as claimed in claim 13, wherein the external setting relates to a job reset.

15. The image forming apparatus as claimed in claim 13, wherein the external setting relates to a function cancel for canceling an error.

16. The image forming apparatus as claimed in claim 13, wherein the external setting relates to a job reset while an error is generated.

17. The image forming apparatus as claimed in claim 13, wherein the external setting enables the job operation by an execution right with respect to the image forming apparatus.

18. The image forming apparatus as claimed in claim 13, wherein the external setting enables the job reset, of the job operation that is being executed, by an execution right with respect to the image forming apparatus.

19. The image forming apparatus as claimed in claim 13, wherein the external setting enables a function cancel for canceling an error, of the job operation that is being executed, by an execution right with respect to the image forming apparatus.

20. The image forming apparatus as claimed in claim 13, wherein the external setting enables a job reset while an error is generated, of the job operation that is being executed, by an execution right with respect to the image forming apparatus.

21. The image forming apparatus as claimed in claim 13, further comprising:
   a part configured to record a log of an operation that is carried out without an execution right with respect to the job.

22. The image forming apparatus as claimed in claim 13, further comprising:
   a part configured to notify, to a job owner, the job operation that is carried out without the execution right with respect to the job.

23. The image forming apparatus as claimed in claim 13, wherein the external setting relates to the job operation that is being executed and has a public attribute.

24. The image forming apparatus as claimed in claim 23, wherein the control part requires no agreement with respect to the job operation that is being executed, by an execution right with respect to the image forming apparatus, in response to an external setting that is made in advance, only when a predetermined time elapses from a time when an error is generated.

25. The image forming apparatus as claimed in claim 1, wherein the control part requires no agreement with respect to a job operation that is being executed by an operation executing part, in response to an external setting that is made in advance, only when a predetermined time elapses from a time when an error is generated.

26. The image forming apparatus as claimed in claim 1, wherein the log-in authentication using the log-in authentication information and the operation authentication of the predetermined operation with respect to the registered printing job are mutually independent.

27. The image forming apparatus as claimed in claim 1, further comprising:
   an image forming part configured to form an image based on the printing job, wherein
   the control part requests input of the job authentication information for permitting the first operation with respect to a printing job that is being executed by the image forming part when the second operation is made from the operation part in a logged in state, if the log-in authentication information input from the log-in authentication information input part and the authentication information related to the printing job agree with each other.

28. The image forming apparatus as claimed in claim 27, wherein the control part requests input of the job authentication information for permitting the first operation with respect to the printing job that is being executed by the image forming part if the log-in authentication information input from the log-in authentication information input part and information related to the printing job do not agree with each other and permits the first operation with respect to the printing job if the job authentication information input by the authentication information input part agrees with the information related to the printing job.

29. The image forming apparatus as claimed in claim 27, wherein the control part requests input of the job authentication information after temporarily stopping the printing job that is being executed by the image forming part when the second operation from the operation part is input.

30. The image forming apparatus as claimed in claim 27, wherein the control part requests input of the job authentication information when the second operation from the operation part is input, and permits the first operation with respect to the printing job after temporarily stopping the printing job that is being executed by the image forming part if the job authentication information input by the authentication information input part agrees with the information related to the printing job.

31. The image forming apparatus as claimed in claim 27, wherein the control part does not request input of the job authentication information for permitting the second operation from the operation part until the first operation with respect to the printing job that is being executed after having been permitted by the control part is completed.

32. An information processing apparatus connectable to an external apparatus via a communication network, comprising:

a log-in authentication information input part configured to input log-in authentication information for permitting an input operation in the information processing apparatus;

a log-in authenticating part configured to determine whether or not to permit the input operation in the information processing apparatus, based on the log-in authentication information that is input;

a receiving part configured to receive image data for which a printing request is received along with the image data from the external apparatus;

an execution right judging part configured to judge whether or not the image data has an executable right in the information processing apparatus, based on the image data that is received;

a process executing part configured to execute a process of the image data if the execution right judging part judges that the image data has the executable right in the information processing apparatus;

an access authentication information input part configured to input an access authentication information for authenticating an access to the image data;

an access authenticating part configured to determine whether or not to approve issuing an access right with respect to the image data for which the process is being executed by the process executing part, based on the access authentication information that is input, if the log-in authentication information does not agree with information related to the image data.

33. The information processing apparatus as claimed in claim 32, wherein the receiving part receives the image data including control data written with control contents with respect to the process of the image data, and the execution right judging part judges whether or not the received image data has the executable right in the information processing apparatus, based on authentication information included in the control data.

34. The information processing apparatus as claimed in claim 33, wherein the execution right judging part judges that the received image data has an executable right in the information processing apparatus only if permitted according to execution rights set in the information processing apparatus when no authentication information is included in the control data.

35. The information processing apparatus as claimed in claim 33, wherein the access authenticating part approves issuing the access right to the image data when the access authentication information that is input matches the authentication information included in the control data.

36. The information processing apparatus as claimed in claim 33, wherein the access authenticating part issues an access right with respect to the image data to all users having an execution right in the information processing apparatus when no authentication information is included in the control data.

37. The information processing apparatus as claimed in claim 32, wherein the access authenticating part judges whether or not to approve issuing the access right to the received image data for each image data, based on the log-in authentication information that is input by the log-in authentication information input part.

38. The information processing apparatus as claimed in claim 32, wherein the access authenticating part determines whether or not to permit the input operation in the information processing apparatus, based on the access authentication information that is input by the access authentication information input part.

39. The information processing apparatus as claimed in claim 32, wherein the process executing part stops the process of the image data when the issuing of the access right is approved by the access authenticating part.

40. The information processing apparatus as claimed in claim 32, wherein the process executing part stops the process of the image data in response to an access request.

41. The information processing apparatus as claimed in claim 40, wherein the access authenticating part permits access to the image data with respect to which the issuing of the access right is approved and which is requested by an access request if the access request is received again.

42. The information processing apparatus as claimed in claim 32, further comprising:
a measuring part to measure time,
wherein the access authenticating part invalidates the access right issued to the image data if the time measured by the measuring part exceeds a preset time.

43. The information processing apparatus as claimed in claim 42, wherein the measuring part starts measuring the time when the access authenticating part approves the issuing of the access right.

44. The information processing apparatus as claimed in claim 42, wherein the measuring part starts to measure the time when an access is made with respect to the image data with respect to which the access right is issued.

45. The information processing apparatus as claimed in claim 42, wherein the access authenticating part permits access to a plurality of consecutive image data having the access right from a time when the access right is issued until the time measured by the measuring part reaches a preset time.

46. The information processing apparatus as claimed in claim 42, wherein the access authenticating part permits access to a plurality of decimated image data having the access right from a time when the access right is issued until the time measured by the measuring part reaches a preset time.

47. The information processing apparatus as claimed in claim 32, wherein the access authenticating part permits access to the image data from a time when the access right is issued until a time when an access is made to the image data with respect to which the access right is issued.

48. The information processing apparatus as claimed in claim 32, wherein the control part requires no access right with respect to a job operation that is being executed to permit the input operation to be carried out, in response to an external setting that is made in advance.

49. The information processing apparatus as claimed in claim 48, wherein the external setting relates to a job reset.

50. The information processing apparatus as claimed in claim 48, wherein the external setting relates to a function cancel for canceling an error.

51. The information processing apparatus as claimed in claim 48, wherein the external setting relates to a job reset while an error is generated.

52. The information processing apparatus as claimed in claim 48, wherein the external setting enables the job operation by an execution right in the information processing apparatus.

53. The information processing apparatus as claimed in claim 48, wherein the external setting enables the job reset, of the job operation that is being executed, by an execution right in the information processing apparatus.

54. The information processing apparatus as claimed in claim 48, wherein the external setting enables a function cancel for canceling an error, of the job operation that is being executed, by an execution right in the information processing apparatus.

55. The information processing apparatus as claimed in claim 48, wherein the external setting enables a job reset while an error is generated, of the job operation that is being executed, by an execution right in the information processing apparatus.

56. The information processing apparatus as claimed in claim 48, further comprising:
   a part configured to record a log of an input operation that is carried out without an execution right with respect to the job.

57. The information processing apparatus as claimed in claim 48, further comprising:
   a part configured to notify, to a job owner, the input operation that is carried out without the execution right with respect to the job.

58. The information processing apparatus as claimed in claim 48, wherein the external setting relates to a job operation that is being executed and has a public attribute.

59. The information processing apparatus as claimed in claim 48, wherein the control part requires no access right with respect to a job operation that is being executed to permit the input operation to be carried out, in response to an external setting that is made in advance, only when a predetermined time elapses from a time when an error is generated.

60. The information processing apparatus as claimed in claim 48, wherein the control part requires no access right with respect to a job operation that is being executed, by an execution right in the information processing apparatus, in response to an external setting that is made in advance, only when a predetermined time elapses from a time when an error is generated.

61. The information processing apparatus of claim 32, further comprising:
   an image forming part configured to form an image based on the image data, wherein
   the control part requests input of the access authentication information for approving the access right with respect to the image data if the log-in authentication information input from the log-in authentication information input part and information related to the printing job agree with each other.

62. The image forming apparatus of claim 32, wherein the input operation is carried out to at least one of modify, cancel and reset the process being executed by the process executing part.

63. An information processing system comprising:
   an external apparatus configured to transmit image data for which execution is requested; and
   an information processing apparatus configured to execute a process of the image data received from the external apparatus,
   said information processing apparatus comprising:
      a log-in authentication information input part configured to input log-in authentication information for permitting an input operation in the information processing apparatus;
      a log-in authenticating part configured to determine whether or not to permit the input operation in the information processing apparatus, based on the log-in authentication information that is input;
      a receiving part configured to receive image data for which a printing request is received along with the image data from the external apparatus;
      an execution right judging part configured to judge whether or not the image data has an executable right in the information processing apparatus, based on the image data that is received;
      a process executing part configured to execute a process of the image data if the execution right judging part judges that the image data has the executable right in the information processing apparatus;
      an access authentication information input part configured to input an access authentication information for authenticating an access to the image data;
      an access authenticating part configured to determine whether or not to approve issuing an access right with respect to the image data for which the process is being executed by the process executing part, based on the access authentication information that is input, if the log-in authentication information does not agree with information related to the image data.

64. The information processing system as claimed in claim 63, further comprising:
   an authentication apparatus coupled to the information processing apparatus,
   said authentication apparatus comprising:
      an authentication information receiving part configured to receive the access authentication information from the information processing apparatus;
      a received information authenticating part configured to judge whether or not to approve issuing an access right with respect to each image data that is received, based on the access authentication information that is received; and
      an authentication result transmitting part configured to transmit an authentication result obtained by the received information authenticating part to the information processing apparatus,
   wherein said access authenticating part determines whether or not to approve issuing an access right with respect to each image data, based on the authentication result received from the authentication apparatus.

65. The information processing system as claimed in claim 63, wherein the control part requires no access right with respect to a job operation that is being executed to permit the input operation to be carried out, in response to an external setting that is made in advance.

66. The information processing system of claim 63, wherein the information processing apparatus further comprises:
   an image forming part configured to form an image based on the image data, wherein
   the control part requests input of the access authentication information for approving the access right with respect to the image data if the log-in authentication information input from the log-in authentication information input part and information related to the printing job agree with each other.

67. An authentication method for an image forming apparatus comprising an authentication information input part configured to input job authentication information for permitting a first operation with respect to a printing job that is registered, a log-in authentication information input part configured to input a log-in authentication information for permitting a second operation from an operation part, an image forming part configured to form an image of the printing job, and a control part, said authentication method comprising:

permitting, by the control part, the first operation with respect to the printing job if the log-in authentication information agrees with information related to the printing job;

requesting, by the control part, input of the job authentication information if the log-in authentication information does not agree with the information related to the printing job; and permitting, by the control part, the first operation with respect to the printing job if the job authentication information input by the authentication information input part agrees with the information related to the printing job.

68. The authentication method as claimed in claim 67, further comprising:

requiring, by the control part, no authentication with respect to a job operation that is being executed, in response to an external setting that is made in advance.

69. The authentication method of claim 67, further comprising:

requesting, by the control part, input of the job authentication information for permitting the first operation with respect to a printing job that is being executed by the image forming part if the second operation is made from the operation part in the logged in state and the log-in authentication information agrees with the information related to the printing job.

70. An authentication method for an information processing apparatus comprising a receiving part configured to receive image data for which a printing request is received from an external apparatus, an authentication information input part configured to input an access authentication information for authenticating an access to the image data, a log-in authentication information input part configured to input a log-in authentication information for permitting an operation from an operation part and causing the information processing apparatus to enter a logged in state, and an authenticating part, said authentication method comprising:

judging, by the authenticating part, whether or not the image data received by the image data receiving part has an executable right, based on the image data, and executing a process of the image data if the image data is judged as having the executable right; and determining, by the authenticating part, whether or not to approve issuing an access right to the image data with respect to which the process is being executed, based on the access authentication information that is input, if the log-in authentication information does not agree with information related to the image data.

71. The authentication method as claimed in claim 70, further comprising:

requiring, by the control part, no agreement with respect to a job operation that is being executed, in response to an external setting that is made in advance.

72. The authentication method of claim 70, further comprising:

determining, by the authenticating part, whether or not to approve issuing the access right to the image data with respect to which the process is being executed, based on the access authentication information that is input, when the access authentication information is input by the authentication information input part when the information processing apparatus is in the logged in state and the log-in authentication information agrees with information related to the image data.

73. A computer-readable storage medium which stores an authentication program for causing a computer to carry out an authentication in an image forming apparatus comprising an authentication information input part configured to input job authentication information for permitting a first operation with respect to a printing job that is registered, a log-in authentication information input part configured to input a log-in authentication information for permitting a second operation from an operation part and causing the image forming apparatus to enter a logged in state, an image forming part configured to form an image of the printing job, and a control part, said authentication program comprising:

a procedure causing the computer to request, by the control part, input of the job authentication information for permitting the first operation with respect to the printing job if the log-in authentication information does not agree with information related to the printing job; and a procedure causing the computer to permit, by the control part, the first operation with respect to the printing job when the job authentication information input by the authentication information input part agrees with the information related to the printing job.

74. The computer-readable storage medium as claimed in claim 73, wherein the authentication program further comprises:

a procedure causing the computer to require, by the control part, no authentication with respect to a job operation that is being executed, in response to an external setting that is made in advance.

75. The computer-readable storage medium of claim 73, wherein the authentication program further comprises:

a procedure causing the computer to request, by the control part, input of the job authentication information for permitting the input operation with respect to a printing job that is being executed by the image forming part if the input operation from the operation part is input in the logged in state and the log-in authentication information agrees with information related to the printing job.

76. A computer-readable storage medium which stores an authentication program for causing a computer to carry out an authentication in an information processing apparatus comprising a receiving part configured to receive image data for which a printing request is received from an external apparatus, an authentication information input part configured to input an access authentication information for authenticating an access to the image data, a log-in authentication information input part configured to input a log-in authentication information for permitting an input operation from an operation part and causing the information processing apparatus to enter a logged in state, and an authenticating part, said authentication program comprising:

a procedure causing the computer to judge, by the authenticating part, whether or not the image data received by the image data receiving part has an executable right, based on the image data, and to execute a process of the image data if the image data is judged as having the executable right; and a procedure causing the computer to determine, by the authenticating part, whether or not to approve issuing an access right to the image data with respect to which the process is being executed, based on the access authentication information that is input, if the log-in authentication information does not agree with information related to the image data.

77. The computer-readable storage medium as claimed in claim 76, wherein the authentication program further comprises:
  a procedure causing the computer to require, by the authenticating part, no authentication with respect to a job operation that is being executed, in response to an external setting that is made in advance.

78. The computer-readable storage medium of claim 76, wherein the authentication program further comprises:
  a procedure causing the computer to determine, by the authenticating part, whether or not to approve issuing an access right to the image data with respect to which the process is being executed, based on the access authentication information that is input, when the access authentication information is input by the authentication information input part when the information processing apparatus is in the logged in state and the log-in authentication information agrees with information related to the image data.

* * * * *